US012122420B2

(12) United States Patent
Carillo Peña et al.

(10) Patent No.: US 12,122,420 B2
(45) Date of Patent: Oct. 22, 2024

(54) COMPUTER VISION SYSTEM

(71) Applicant: Movidius Ltd., Schiphol-Rijk (NL)

(72) Inventors: Dexmont Alejandro Carillo Peña, Dublin (IE); Luis Manuel Rodríguez Martin de la Sierra, Daimiel (ES); Carlos Marquez Rodriguez-Peral, Daimiel (ES); Luca Sarti, Dublin (IE); David Macdara Moloney, Dublin (IE); Sam Caulfield, Dublin (IE); Jonathan David Byrne, Ashbourne (IE)

(73) Assignee: Intel Corporation, Santa Clara, CA (US)

( * ) Notice: Subject to any disclaimer, the term of this patent is extended or adjusted under 35 U.S.C. 154(b) by 597 days.

(21) Appl. No.: 17/272,324

(22) PCT Filed: Aug. 29, 2019

(86) PCT No.: PCT/US2019/048939
§ 371 (c)(1),
(2) Date: Feb. 28, 2021

(87) PCT Pub. No.: WO2020/047338
PCT Pub. Date: Mar. 5, 2020

(65) Prior Publication Data
US 2021/0213973 A1 Jul. 15, 2021

Related U.S. Application Data

(60) Provisional application No. 62/724,446, filed on Aug. 29, 2018.

(51) Int. Cl.
*B60W 60/00* (2020.01)
*G06N 3/045* (2023.01)
(Continued)

(52) U.S. Cl.
CPC ......... *B60W 60/0011* (2020.02); *G06N 3/045* (2023.01); *G06T 7/70* (2017.01);
(Continued)

(58) Field of Classification Search
None
See application file for complete search history.

(56) References Cited

U.S. PATENT DOCUMENTS 11,878,246 B1   1/2024  Smith et al.
2015/0294143 A1  10/2015  Wells et al.
(Continued)

FOREIGN PATENT DOCUMENTS

CN   111814679 A   10/2020
CN   115456970 A   12/2022
(Continued)

OTHER PUBLICATIONS

Trumble et al ("Total Capture: 3D Human Pose Estimation Fusing Video and Inertial Sensors", British Machine Vision Conference (BMVC) 2017, Sep. 4, 2017, pp. 1-13, XP055883131, retrieved from the Internet on Jun. 4, 2023) (Year: 2017).*
(Continued)

*Primary Examiner* — Leon Viet Q Nguyen
(74) *Attorney, Agent, or Firm* — Akona IP PC

(57) ABSTRACT

A raycaster performs a raycasting algorithm, where the raycasting algorithm takes, as an input, a sparse hierarchical volumetric data structure. Performing the raycasting algorithm includes casting a plurality of rays from a reference point into the 3D volume, and, for each of the plurality of rays, traversing the ray to determine whether voxels in the set of voxels are intersected by the ray and are occupied, where the ray is to be traversed according to an approximate traversal algorithm.

20 Claims, 50 Drawing Sheets

(51) Int. Cl.
  *G06T 7/70* (2017.01)
  *G06T 15/06* (2011.01)

(52) U.S. Cl.
  CPC .... *G06T 15/06* (2013.01); *G06T 2207/20081* (2013.01); *G06T 2207/20084* (2013.01); *G06T 2207/30252* (2013.01); *G06T 2210/36* (2013.01)

(56) References Cited

U.S. PATENT DOCUMENTS

| | | | |
|---|---|---|---|
| 2016/0292908 | A1 | 10/2016 | Obert |
| 2018/0046649 | A1 | 2/2018 | Mutto et al. |
| 2018/0197624 | A1 | 7/2018 | Robaina et al. |
| 2019/0026942 | A1* | 1/2019 | Zhang .................... G06T 15/205 |
| 2019/0145775 | A1* | 5/2019 | Cui .......................... G06T 7/246 701/446 |
| 2019/0385328 | A1* | 12/2019 | Grosse-Kunstleve ........................ H04N 23/57 |
| 2020/0364554 | A1* | 11/2020 | Wang ......................... G06T 7/11 |
| 2021/0223858 | A1* | 7/2021 | Barak ................... A63F 13/428 |
| 2024/0005781 | A1 | 1/2024 | Feng et al. |

FOREIGN PATENT DOCUMENTS

| | | |
|---|---|---|
| CN | 116612182 A | 8/2023 |
| CN | 117392301 A | 1/2024 |
| JP | 2004026031 A | 1/2004 |
| JP | 2004041713 B | 3/2006 |
| JP | 2006154961 A | 1/2009 |
| TW | 202223571 A | 6/2022 |
| TW | 1817847 B | 10/2023 |
| WO | 2018035507 A1 | 2/2018 |
| WO | 2018090308 A1 | 5/2018 |
| WO | 2018134587 A1 | 7/2018 |
| WO | 2021231406 A1 | 11/2021 |
| WO | 2021253089 A1 | 12/2021 |

OTHER PUBLICATIONS

EPO Extended European Search Report in EP Application Serial No. 19856241.5 dated Apr. 29, 2022 (11 pages).
Trumble, Matthew et al., "Total Capture: 3D Human Pose Estimation Fusing Video and Inertial Sensors," British Machine Vision Conference (BMVC) 2017, Sep. 4, 2017 (13 pages).
PCT International Preliminary Report on Patentability issued in PCT/US2019/048939, dated Mar. 2, 2021; 12 pages.
Clark, Ronald, et al., "VINET: Visual Inertial Odometry as a Sequence-to-Sequence Learning Problem," arXIV: 1701.08376V2 [cs.CV], pp. 1-7, Apr. 2, 2017 (7 pages).
Johns, Edward et al., "Pairwise Decomposition of Image Sequences for Active Multi-View Recognition," The IEEE Conference on Computer Vision and Pattern Recognition (CVPR), pp. 3813-3822, Jun. 26, 2016 (12 pages).
Liuhao, Ge et al., "Real-Time 3D Hand Pose Estimation with 3D Convolutional Neural Networks," IEEE Transactions on Pattern Analysis and Machine Intelligence, Apr. 16, 2018 (15 pages).
PCT International Search Report and Written Opinion in PCT International Application Serial No. PCT/US2019/048939 dated Feb. 11, 2020 ([16 pages).
Dosovitskiy et al., FlowNet: Learning Optical Flow with Convolutional Networks, 2015 IEEE International Conference on Computer Vision, 13 pages.
English Translation for JP2004-026031A, 9 pages.
Rambach et al., Learning to Fuse: A Deep Learning Approach to Visual-Inertial Camera Post Estimation, 2016 IEEE International Symposium on Mixed and Augmented Reality, 9 pages.
English Translation for JP2004-041713A, 63 pages.
English Translation of JP2006154961A, 20 pages.

* cited by examiner

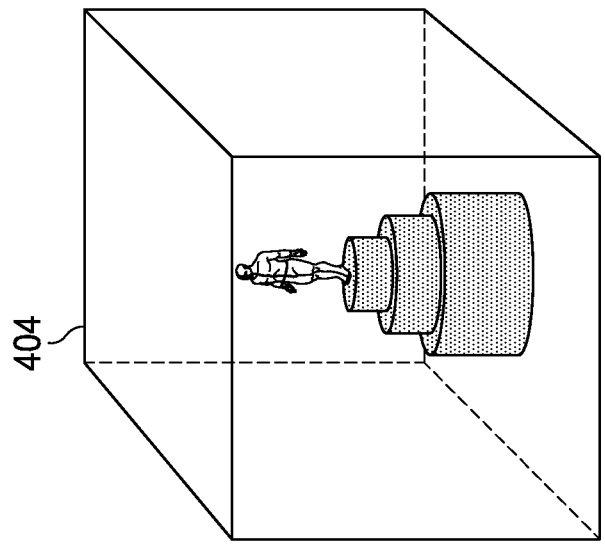
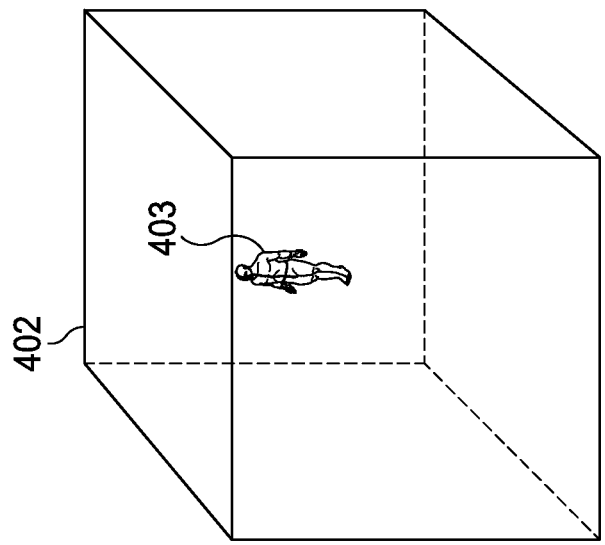
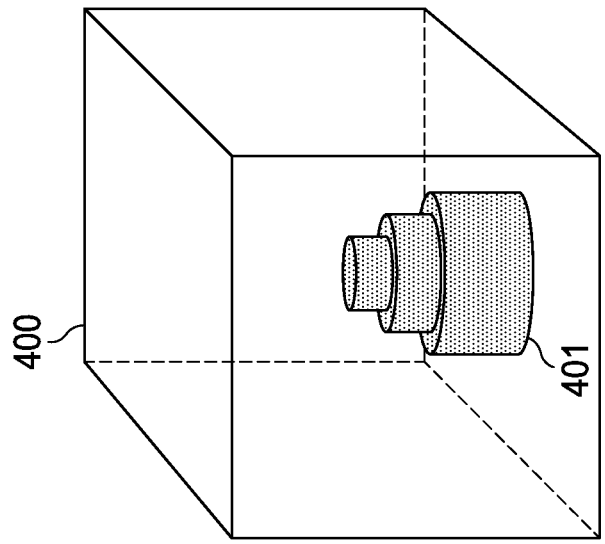
FIG. 4

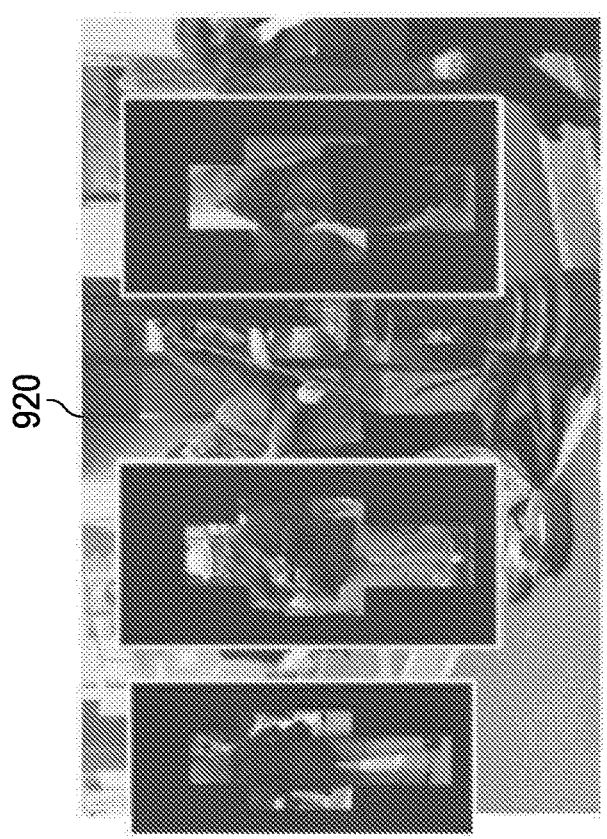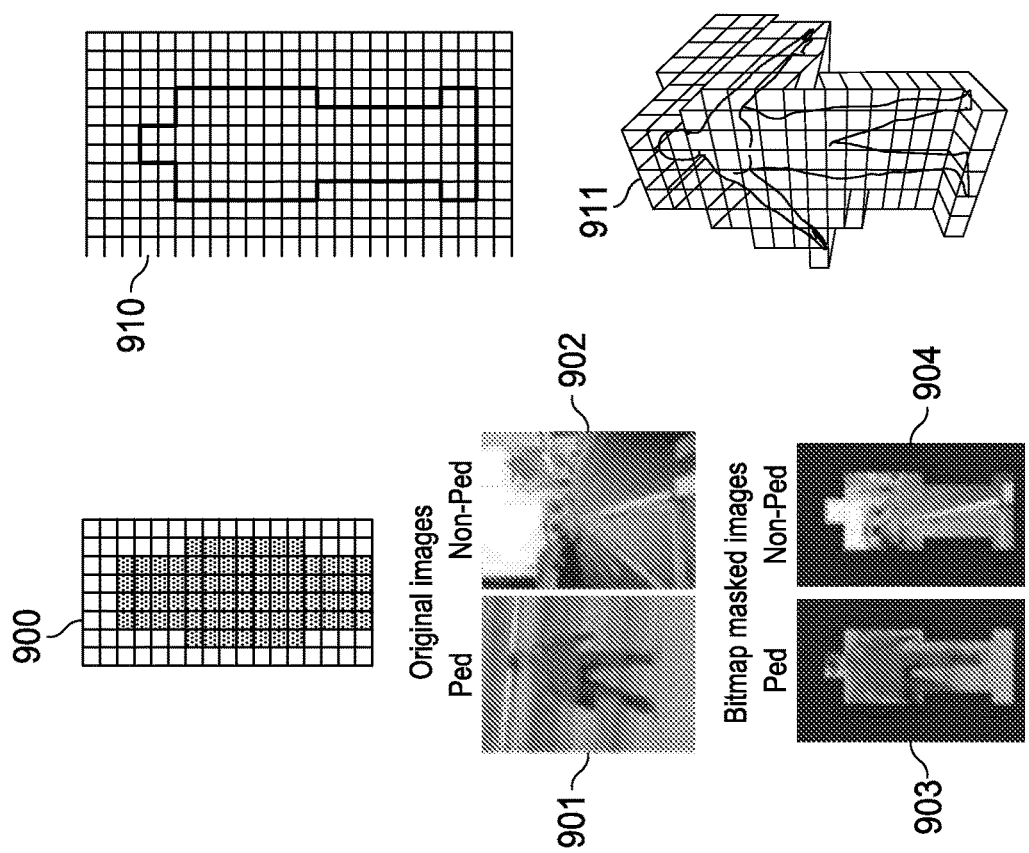
FIG. 9

| AlexNet | # weights | # zeros (avg) | # zeros (min) | # zeros (max) | % zeros |
|---|---|---|---|---|---|
| Relu1 | 8192 | 1859.3 | 912 | 4425 | 23% |
| Relu2 | 8192 | 4459.2 | 3700 | 4873 | 54% |
| Relu3 | 4096 | 3465.6 | 3079 | 3722 | 85% |

Note: results obtained using 10,000 CIFAR-10 test-images

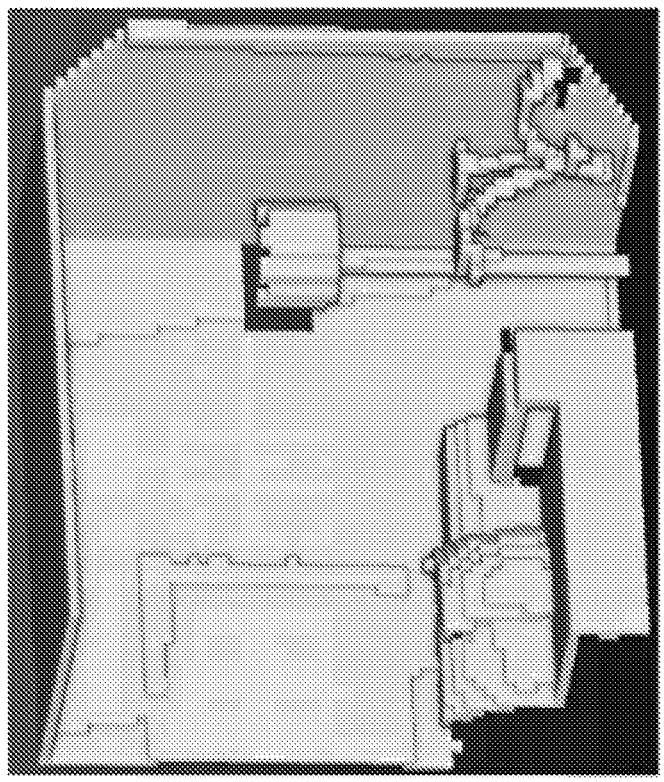
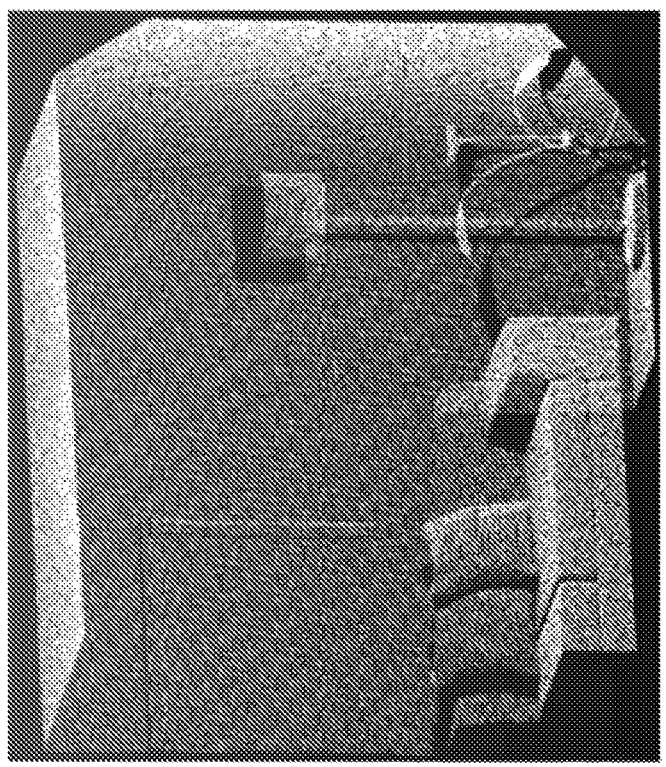
FIG. 25

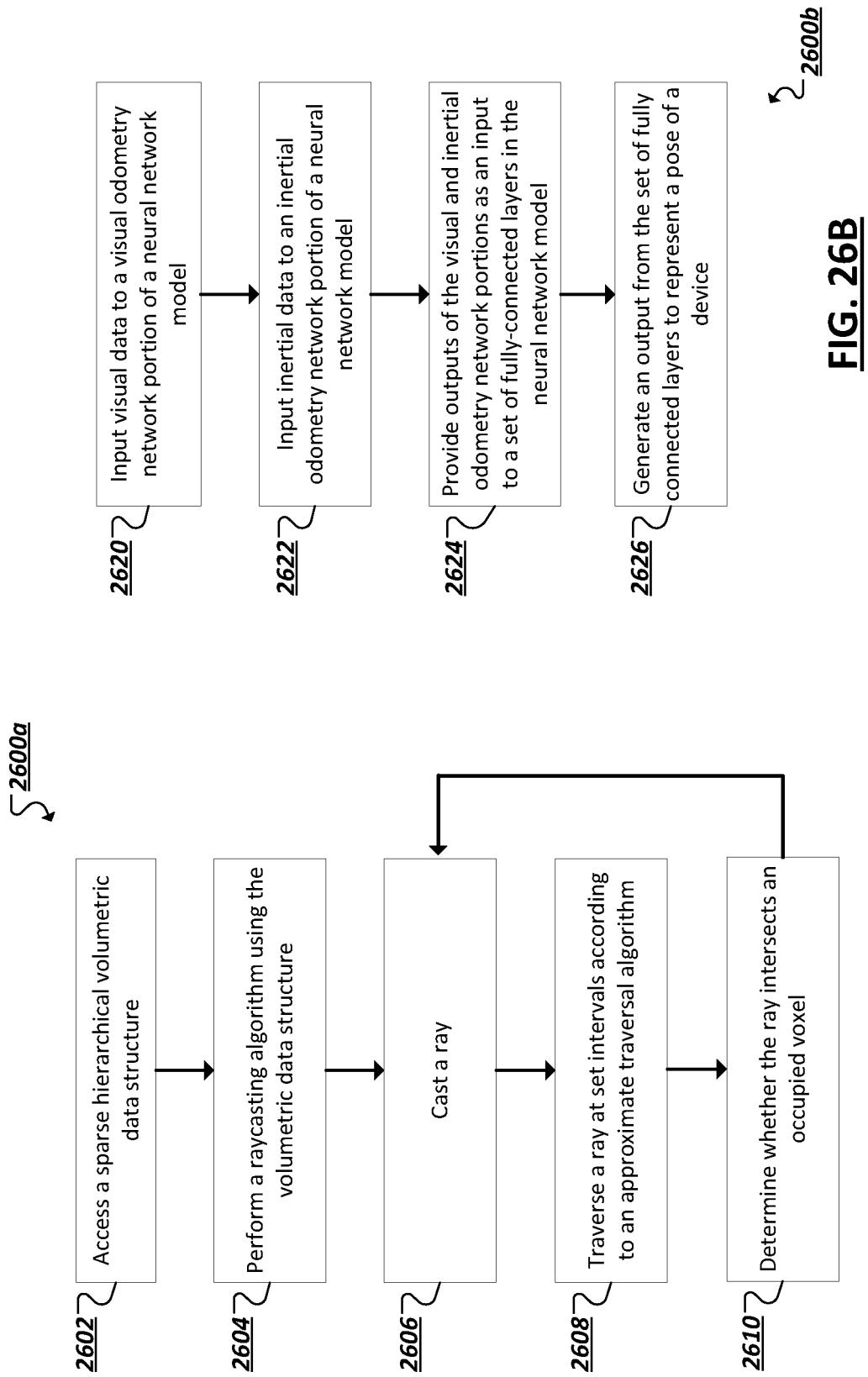

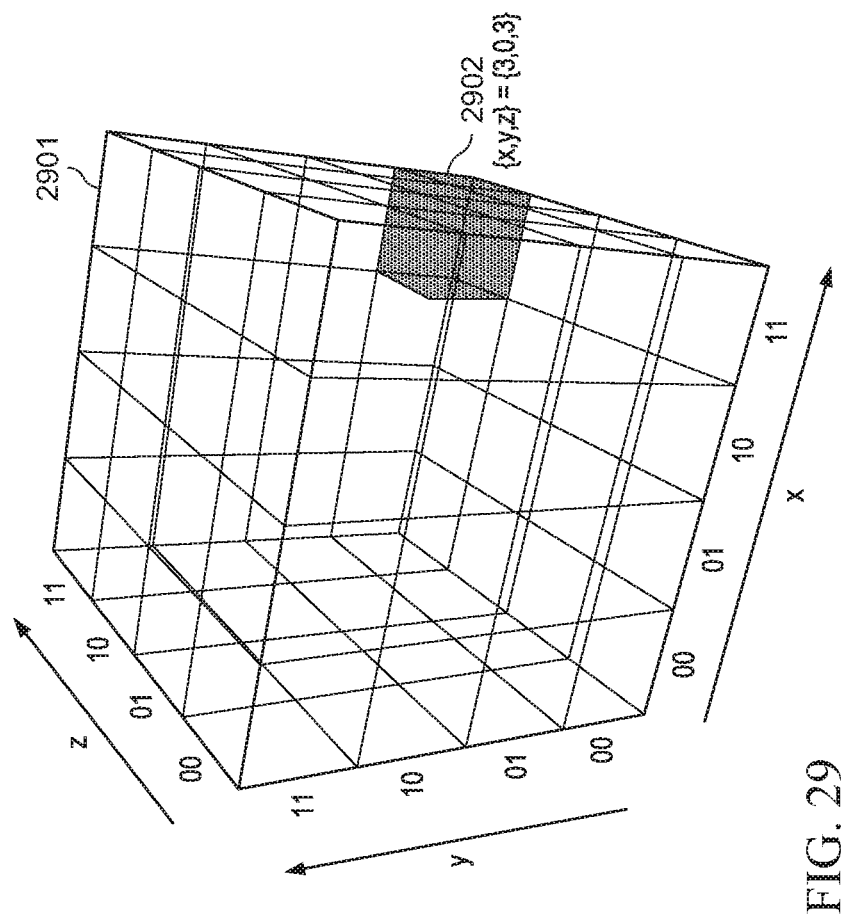
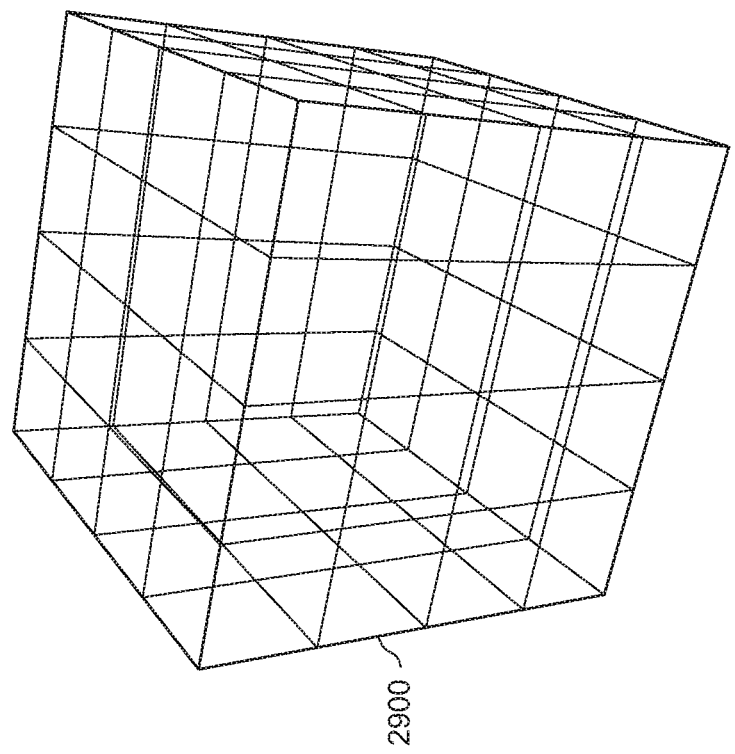
FIG. 29

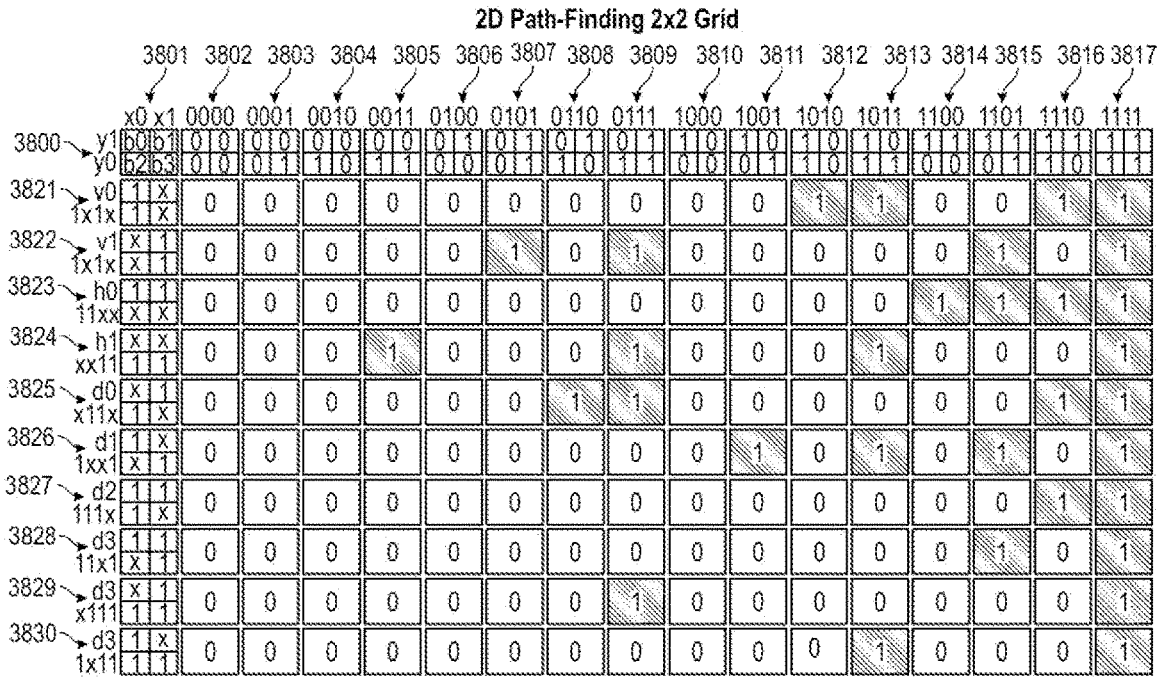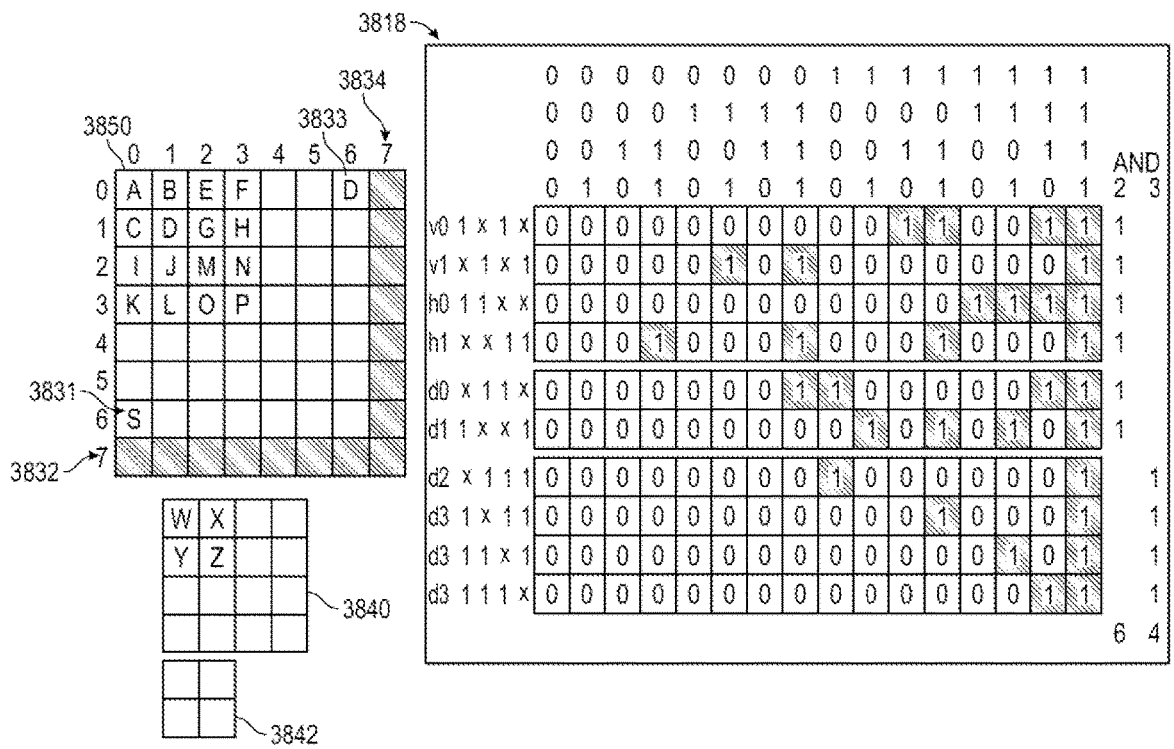
FIG. 38

COMPUTER VISION SYSTEM

RELATED APPLICATIONS

This application is national stage application under 35 U.S.C. § 371 of PCT International Application Serial No. PCT/US2019/048939 FILED ON Aug. 29, 2019 and entitled COMPUTER VISION SYSTEM. which application claims benefit to U.S. Provisional Patent Application Ser. No. 62/724,446, filed Aug. 29, 2018. The disclosures of the prior applications are considered part of and are hereby incorporated by reference in their entirety in the disclosure of this application.

TECHNICAL FIELD

This disclosure relates in general to the field of computer systems and, more particularly, to hash tables for use in computer vision applications.

BACKGROUND

The worlds of computer vision and graphics are rapidly converging with the emergence of Augmented Reality (AR), Virtual Reality (VR) and Mixed-Reality (MR) products such as those from MagicLeap™, Microsoft™ HoloLens™, Oculus™ Rift™, and other VR systems such as those from Valve™ and HTC™. The incumbent approach in such systems is to use a separate graphics processing unit (GPU) and computer vision subsystem, which run in parallel. These parallel systems can be assembled from a pre-existing GPU in parallel with a computer vision pipeline implemented in software running on an array of processors and/or programmable hardware accelerators.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

FIG. 4 illustrates a composite view of a scene in accordance with some embodiments;

FIG. 9 illustrates operation elimination by 2D convolutional neural networks in accordance with some embodiments;

FIG. 25 shows voxelization of an example point cloud;

FIGS. 26A-26C are flowcharts illustrating example techniques for enhancing computer vision processing;

FIG. 29 illustrates the organization of a voxel cube in accordance with some embodiments;

FIG. 38 shows the example acceleration of 2D Path-Finding on a 2D 2×2 bitmap in accordance with some embodiments;

DETAILED DESCRIPTION OF EXAMPLE EMBODIMENTS

Figure 1:
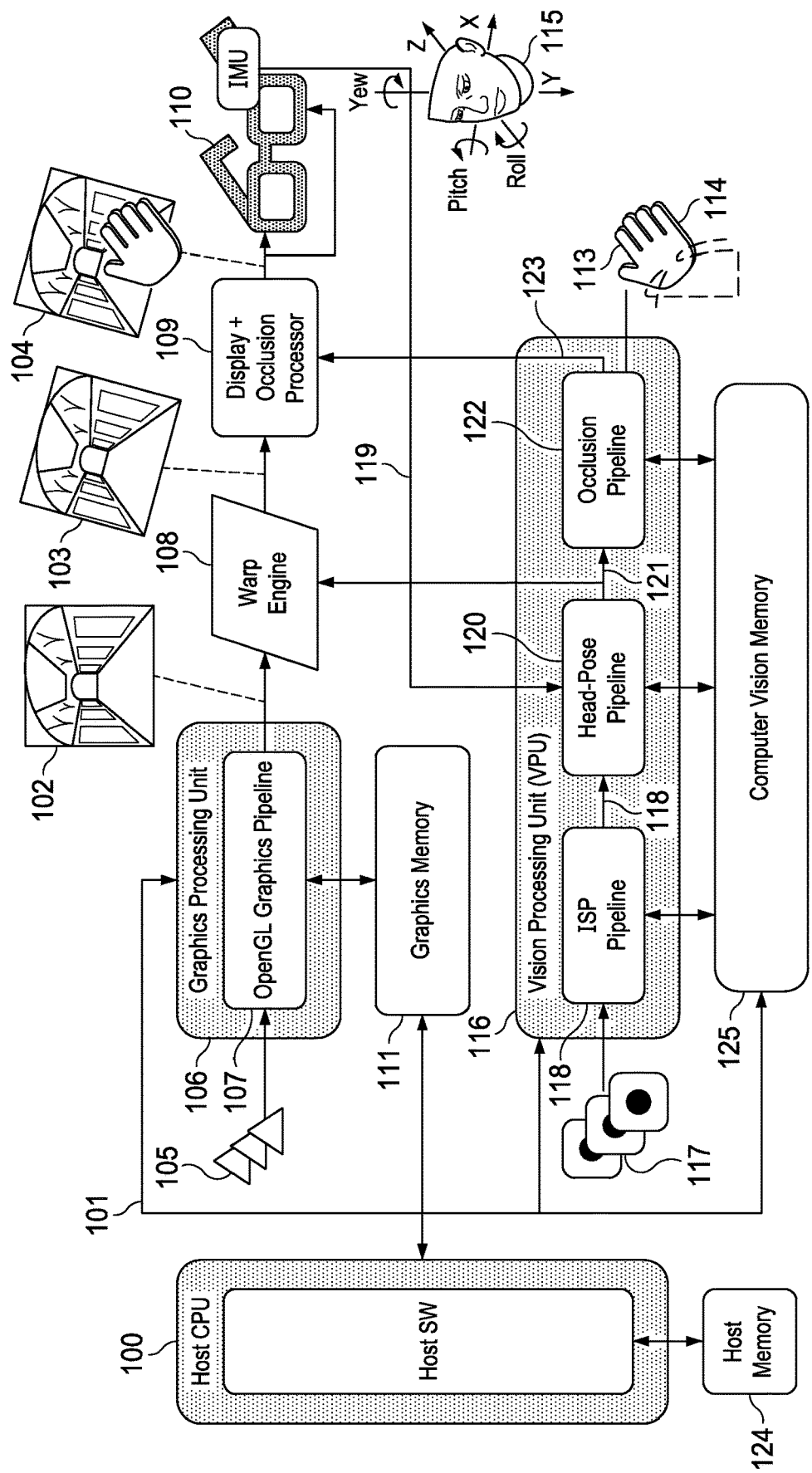
FIG. 1 illustrates a conventional augmented or mixed reality rendering system.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments provided below are exemplary, and that it is contemplated that there are other systems and methods that are within the scope of the disclosed subject matter.

A variety of technologies are emerging based on and incorporating augmented reality, virtual reality, mixed reality, autonomous devices, and robots, which may make use of data models representing volumes of three-dimensional space and geometry. The description of various real and virtual environments using such 3D or volumetric data has traditionally involved large data sets, which some computing systems have struggled to process in a desirable manner. Further, as devices, such as drones, wearable devices, virtual reality systems, etc., grow smaller, the memory and processing resources of such devices may also be constrained. As an example, AR/VR/MR applications may demand high-frame rates for the graphical presentations generated using supporting hardware. However, in some applications, the GPU and computer vision subsystem of such hardware may need to process data (e.g., 3D data) at high rates, such as up to 130 fps (7 msecs), in order to produce desirable results (e.g., to generate a believable graphical scene with frame rates that produce a believable result, prevent motion sickness of the user due to excessive latency, among other example goals. Additional application may be similarly challenged to satisfactorily process data describing large volumes, while meeting constraints in processing, memory, power, application requirements of the corresponding system, among other example issues.

In some implementations, computing systems may be provided with logic to generate and/or use sparse volumetric data, defined according to a format. For instance, a defined volumetric data-structure may be provided to unify computer vision and 3D rendering in various systems and applications. A volumetric representation of an object may be captured using an optical sensor, such as a stereoscopic camera or depth camera, for example. The volumetric representation of the object may include multiple voxels. An improved volumetric data structure may be defined that enables the corresponding volumetric representation to be subdivided recursively to obtain a target resolution of the object. During the subdivision, empty space in the volumetric representation, which may be included in one or more of the voxels, can be culled from the volumetric representation (and supporting operations). The empty space may be an area of the volumetric representation that does not include a geometric property of the object.

Accordingly, in an improved volumetric data structure, individual voxels within a corresponding volume may be tagged as "occupied" (by virtue of some geometry being present within the corresponding volumetric space) or as "empty" (representing that the corresponding volume consists of empty space). Such tags may additionally be interpreted as designating that one or more of its corresponding subvolumes is also occupied (e.g., if the parent or higher-level voxel is tagged as occupied) or that all of its subvolumes are empty space (i.e., in the case of the parent, or higher-level voxel being tagged empty). In some implementations, tagging a voxel as empty may allow the voxel and/or its corresponding subvolume voxels to be effectively removed from the operations used to generate a corresponding volumetric representation. The volumetric data structure may be according to a sparse tree structure, such as according to a sparse sexaquaternary tree (SST) format. Further, such an approach to a sparse volumetric data structure may utilize comparatively less storage space than is traditionally used to store volumetric representations of objects. Additionally, compression of volumetric data may increase the viability of transmission of such representations and enable faster processing of such representations, among other example benefits.

The volumetric data-structure can be hardware accelerated to rapidly allow updates to a 3D renderer, eliminating delay that may occur in separate computer vision and graphics systems. Such delay can incur latency, which may induce motion sickness in users among other additional disadvantages when used in AR, VR, MR, and other applications. The capability to rapidly test voxels for occupancy of a geometric property in an accelerated data-structure allows for construction of a low-latency AR, VR, MR, or other system, which can be updated in real time.

In some embodiments, the capabilities of the volumetric data-structure may also provide intra-frame warnings. For example, in AR, VR, MR, and other applications, when a user is likely to collide with a real or synthetic object in an imaged scene, or in computer vision applications for drones or robots, when such devices are likely to collide with a real or synthetic object in an imaged scene, the speed of processing provided by the volumetric data structure allows for warning of the impending collision.

Embodiments of the present disclosure may relate to the storage and processing of volumetric data in applications such as robotics, head-mounted displays for augmented and mixed reality headsets as well as phones and tablets.

Embodiments of the present disclosure represent each volumetric element (e.g., voxel) within a group of voxels, and optionally physical quantities relating to the voxel's geometry, as a single bit. Additional parameters related to a group of 64 voxels may be associated with the voxels, such as corresponding red-green-blue (RGB) or other coloration encodings, transparency, truncated signed distance function (TSDF) information, etc. and stored in an associated and optional 64-bit data-structure (e.g., such that two or more bits are used to represent each voxel). Such a representation scheme may realize a minimum memory requirement. Moreover, representing voxels by a single bit allows for the performance of many simplified calculations to logically or mathematically combine elements from a volumetric representation. Combining elements from a volumetric representation can include, for example, OR-ing planes in a volume to create 2D projections of 3D volumetric data, and calculating surface areas by counting the number of occupied voxels in a 2.5D manifold, among others. For comparisons XOR logic may be used to compare 64-bit sub-volumes (e.g., 4^3 sub-volumes), and volumes can be inverted, where objects can be merged to create hybrid objects by ORing them together, among other examples.

FIG. 1 illustrates a conventional augmented or mixed reality system consisting of parallel graphics rendering and computer-vision subsystems with a post-rendering connection apparatus to account for changes due to rapid head movement and changes in the environment which can produce occlusions and shadows in the rendered graphics. In one example implementation, a system may include a host processor 100 supported by host memory 124 to control the execution of a graphics pipeline, computer vision pipeline, and post-rendering correction apparatus by interconnection via bus 101, on-chip network on-chip, or other interconnection. The interconnection allows the host processor 100 running appropriate software to control the execution of the graphics processing unit (GPU) 106, associated graphics memory 111, computer vision pipeline 116, and associated computer vision memory 124. In one example, rendering of graphics using the GPU 106 via an OpenGL graphics shader 107 (e.g., operating on a triangle list 105) may take place at a slower rate than the computer vision pipeline. As a result, post rendering correction via a warp engine 108 and display/occlusion processor 109 may be performed to account for changes in head pose and occluding scene geometry that may have occurred since the graphics was rendered by the GPU 106. The output of the GPU 106 is time-stamped so that it can be used in conjunction with the correct control signals 121 and 123 from the head pose pipeline 120 and occlusion pipeline 123 respectively to produce the correct graphics output to take account of any changes in head pose 119 and occluding geometry 113, among other examples.

In parallel with the GPU 106, a plurality of sensors and cameras (e.g., including active and passive stereo cameras for depth and vision processing 117) may be connected to the computer vision pipeline 116. The computer vision pipeline 116 may include one or more of at least three stages, each of which may contain multiple stages of lower level processing. In one example, the stages in the computer vision pipeline 116 may be the image signal processing (ISP) pipeline 118, head-pose pipeline 120, and occlusion pipeline 122. The ISP pipeline 118 may take the outputs of the input camera sensors 117 and condition them so they can be used for subsequent head-pose and occlusion processing. The head-pose pipeline 120 may take the output of the ISP pipeline 118 and use it together with the output 119 of the inertial measurement unit (IMU) in the headset 110 to compute a change in head-pose since the corresponding output graphics frame was rendered by the GPU 106. The output 121 of the head-pose pipeline (HPP) 120 may be applied to the warp engine 108 along with a user specified mesh to distort the GPU output 102 so that it matches the updated head-pose position 119. The occlusion pipeline 122 may take the output of head-pose pipeline 121 and look for new objects in the visual field such as a hand 113 (or other example object) entering the visual field which should produce a corresponding shadow 114 on the scene geometry. The output 123 of the occlusion pipeline 122 may be used by the display and occlusion processor 109 to correctly overlay the visual field on top of the output 103 of the warp engine 108. The display and occlusion processor 109 produces a shadow mask for synthetic shadows 114 using the computed head-pose 119, and the display and occlusion processor 109 may composite the occluding geometry of the hand 113 on top of the shadow mask to produce a graphical shadow 114 on top of the output 103 of the warp engine 108 and produce the final output frame(s) 104 for display on the augmented/mixed reality headset 110, among other example use cases and features.

Figure 2:
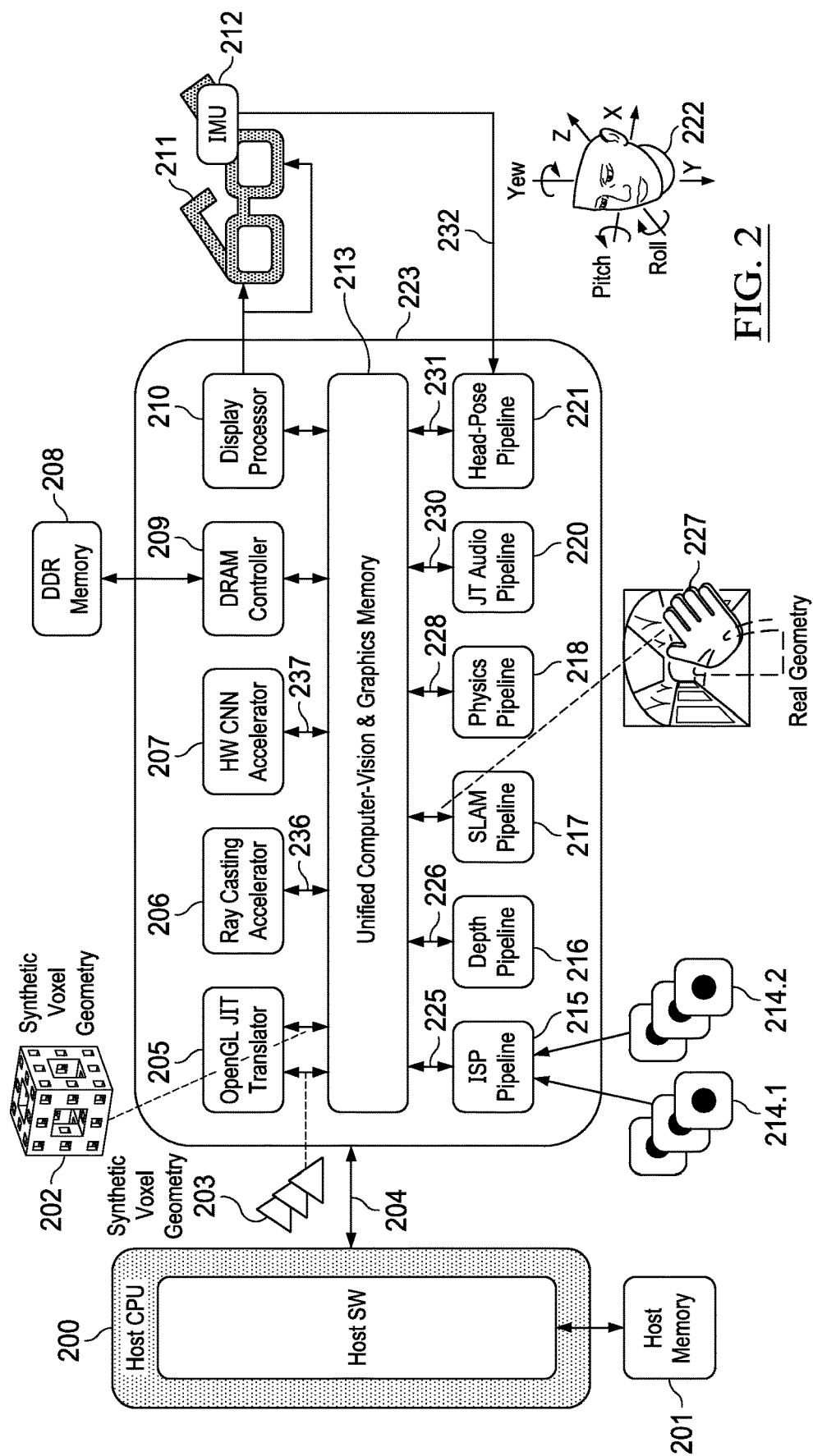
FIG. 2 illustrates a voxel-based augmented or mixed reality rendering system in accordance with some embodiments.

FIG. 2 illustrates a voxel-based augmented or mixed reality rendering system in accordance with some embodiments of the present disclosure. The apparatus depicted in FIG. 2 may include a host system composed on host CPU 200 and associated host memory 201. Such a system may communicate via a bus 204, on-chip network or other communications mechanism, with the unified computer vision and graphics pipeline 223 and associated unified computer vision and graphics memory 213 containing the real and synthetic voxels to be rendered in the final scene for display on a head-mounted augmented or mixed reality display 211. The AR/MR display 211 may also contain a plurality of active and passive image sensors 214 and an inertial measurement unit (IMU) 212, which is used to measure changes to head pose 222 orientation.

In the combined rendering pipeline, synthetic geometry may be generated starting from a triangle list 204 which is processed by an OpenGL JiT (Just-in-Time) translator 205 to produce synthetic voxel geometry 202. The synthetic voxel geometry may be generated, for instance, by selecting a main plane of a triangle from a triangle list. 2D rasterization of each triangle in the selected plane may then be performed (e.g., in the X and Z direction). The third coordinate (e.g., Y) may be created as an attribute to be interpolated across the triangle. Each pixel of the rasterized triangle may result in the definition of a corresponding voxel. This processing can be performed by either a CPU or GPU. When performed by a GPU, each rasterized triangle may be read back from the GPU to create a voxel where the GPU drew a pixel, among other example implementations. For instance, a synthetic voxel may be generated using a 2D buffer of lists, where each entry of the list stores the depth information of a polygon rendered at that pixel. For instance, a model can be rendered using an orthographic viewpoint (e.g., top-down). For example, every (x, y) provided in an example buffer may represent the column at (x, y) in a corresponding voxel volume (e.g., from (x,y,0) to (x,y,4095)). Each column may then be rendered from the information as 3D scanlines using the information in each list.

Continuing with the example of FIG. 2, in some implementations the synthetic voxel geometry 202 may be combined with measured geometry voxels 227 constructed using a simultaneous localization and mapping (SLAM) pipeline 217. The SLAM pipeline may use active sensors and/or passive image sensors 214 (e.g., 214.1 and 214.2) which are first processed using an image signal processing (ISP) pipeline 215 to produce an output 225, which may be converted into depth images 226 by a depth pipeline 216. Active or passive image sensors 214 (214.1 and 214.2) may include active or passive stereo sensors, structured light sensors, time-of-flight sensors, among other examples. For instance, the depth pipeline 216 can process either depth data from a structured light or time-of-flight sensor 214.1 or alternately a passive stereo sensors 214.2. In one example implementation, stereo sensors 214.2 may include a passive pair of stereo sensors, among other example implementations.

Depth images generated by the depth pipeline 215 may be processed by a dense SLAM pipeline 217 using a SLAM algorithm (e.g., Kinect Fusion) to produce a voxelized model of the measured geometry voxels 227. A ray-tracing accelerator 206 may be provided that may combine the measured geometry voxels 227 (e.g., real voxel geometry) with the synthetic voxel geometry 202 to produce a 2D rendering of the scene for output to a display device (e.g., a head mounted display 211 in a VR or AR application) via a display processor 210. In such an implementation, a complete scene model may be constructed from real voxels of measured geometry voxels 227 and synthetic geometry 202. As a result, there is no requirement for warping of 2D rendered geometry (e.g., as in FIG. 1). Such an implementation may be combined with head-pose tracking sensors and corresponding logic to correctly align the real and measured geometry. For instance, an example head-pose pipeline 221 may process head-pose measurements 232 from an IMU 212 mounted in the head mounted display 212 and the output 231 of the head-pose measurement pipeline may be taken into account during rendering via the display processor 210.

In some examples, a unified rendering pipeline may also use the measured geometry voxels 227 (e.g., a real voxel model) and synthetic geometry 202 (e.g., a synthetic voxel model) in order to render audio reverberation models and model the physics of a real-world, virtual, or mixed reality scene. As an example, a physics pipeline 218 may take the measured geometry voxels 227 and synthetic geometry 202 voxel geometry and compute the output audio samples for left and right earphones in a head mounted display (HMD) 211 using the ray casting accelerator 206 to compute the output samples 230 using acoustic reflection coefficients built into the voxel data-structure. Similarly, the unified voxel model consisting of 202 and 227 may also be used to determine physics updates for synthetic objects in the composite AR/MR scene. The physics pipeline 218 takes the composite scene geometric as inputs and computes collisions using the ray-casting accelerator 206 before computing updates 228 to the synthetic geometry 202 for rendering and as a basis for future iterations of the physics models.

In some implementations, a system, such as the system shown in FIG. 2, may be additionally provided with one or more hardware accelerators to implement and/or utilize convolutional neural networks (CNNs) that can process either RGB video/image inputs from the output of the ISP pipeline 215, volumetric scene data from the output of the SLAM pipeline 217, among other examples. Neural network classifiers can run either exclusively using the hardware (HW) convolutional neural network (CNN) accelerator 207 or in a combination of processors and HW CNN accelerator 207 to produce an output classification 237. The availability of a HW CNN accelerator 207 to do inference on volumetric representations may allow groups of voxels in the measured geometry voxels 227 to be labelled as belonging to a particular object class, among other example uses.

Labeling voxels (e.g., using a CNN and supporting hardware acceleration) may allow those objects to which those voxels belong to be recognized by the system as corresponding to the known object and the source voxels can be removed from the measured geometry voxels 227 and replaced by a bounding box corresponding to the object and/or information about the object's origin, object's pose, an object descriptor, among other example information. This may result in a much more semantically meaningful description of the scene that can be used, for example, as an input by a robot, drone, or other computing system to interact with objects in the scene, or an audio system to look up the sound absorption coefficient of objects in the scene and reflect them in the acoustic model of the scene, among other example uses.

One or more processor devices and hardware accelerators may be provided to implement the pipelines of the example system shown and described in FIG. 2. In some implementations, all of the hardware and software elements of the combined rendering pipeline may share access to a DRAM controller 209 which in turn allows data to be stored in a shared DDR memory device 208, among other example implementations.

Figure 3:
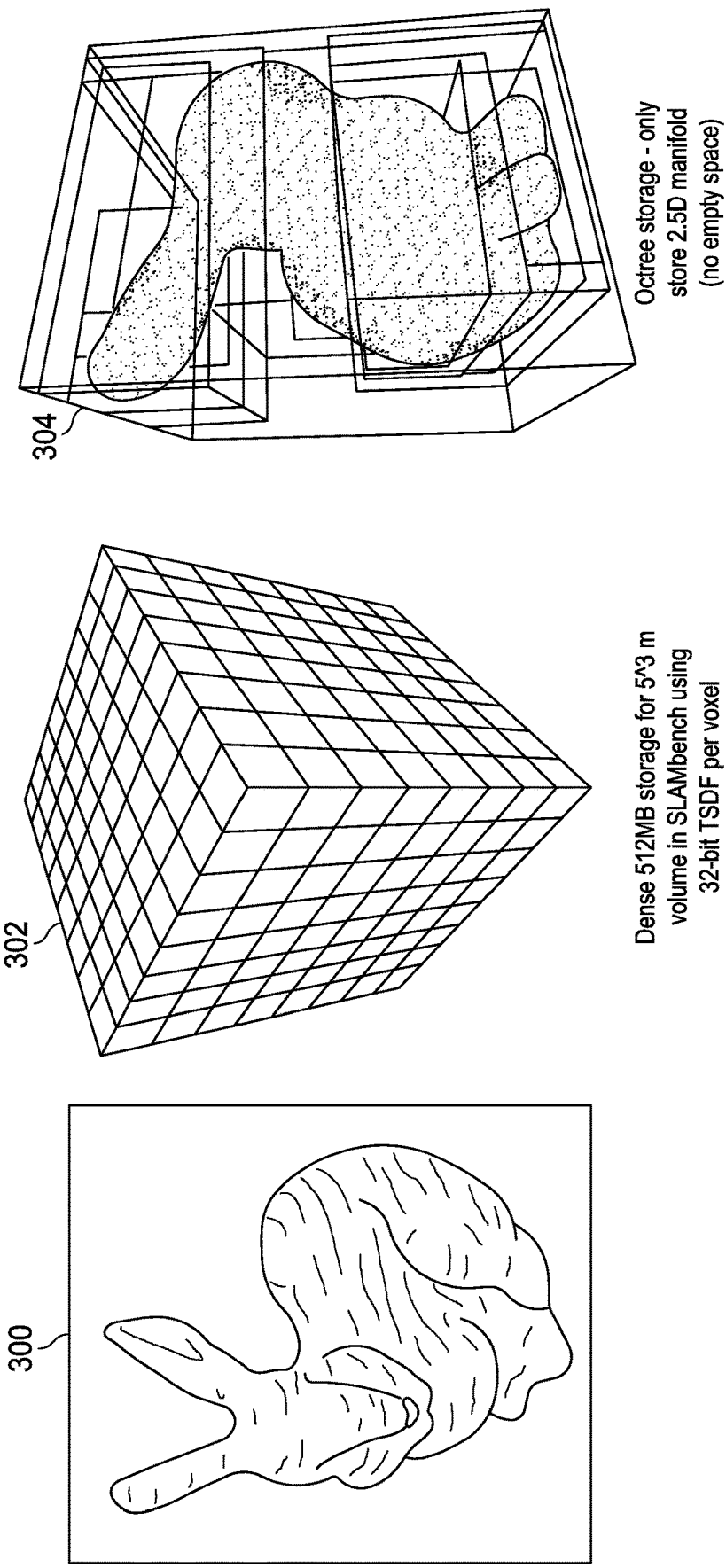
FIG. 3 illustrates the difference between dense and sparse volumetric representations in accordance with some embodiments.

FIG. 3 is presented to illustrate a difference between dense and sparse volumetric representations in accordance with some embodiments. As shown in the example of FIG. 3, a real world or synthetic object 300 (e.g., a statue of a rabbit) can be described in terms of voxels either in a dense manner as shown in 302 or in a sparse manner as shown in 304. The advantage of the dense representation such as 302 is uniform speed of access to all voxels in the volume, but the downside is the amount of storage that may be required. For example, for a dense representation, such as a $512^3$ element volume (e.g., corresponding to a 5 m in 1 cm resolution for a volume scanned using a Kinect sensor), 512 Mbytes to store a relatively small volume with a 4 Byte truncated signed distance function (TSDF) for each voxel. An octree representation 304 embodying a sparse representation, on the other hand, may store only those voxels for which there is actual geometry in the real-world scene, thereby reducing the amount of data needed to store the same volume.

Figure 5:
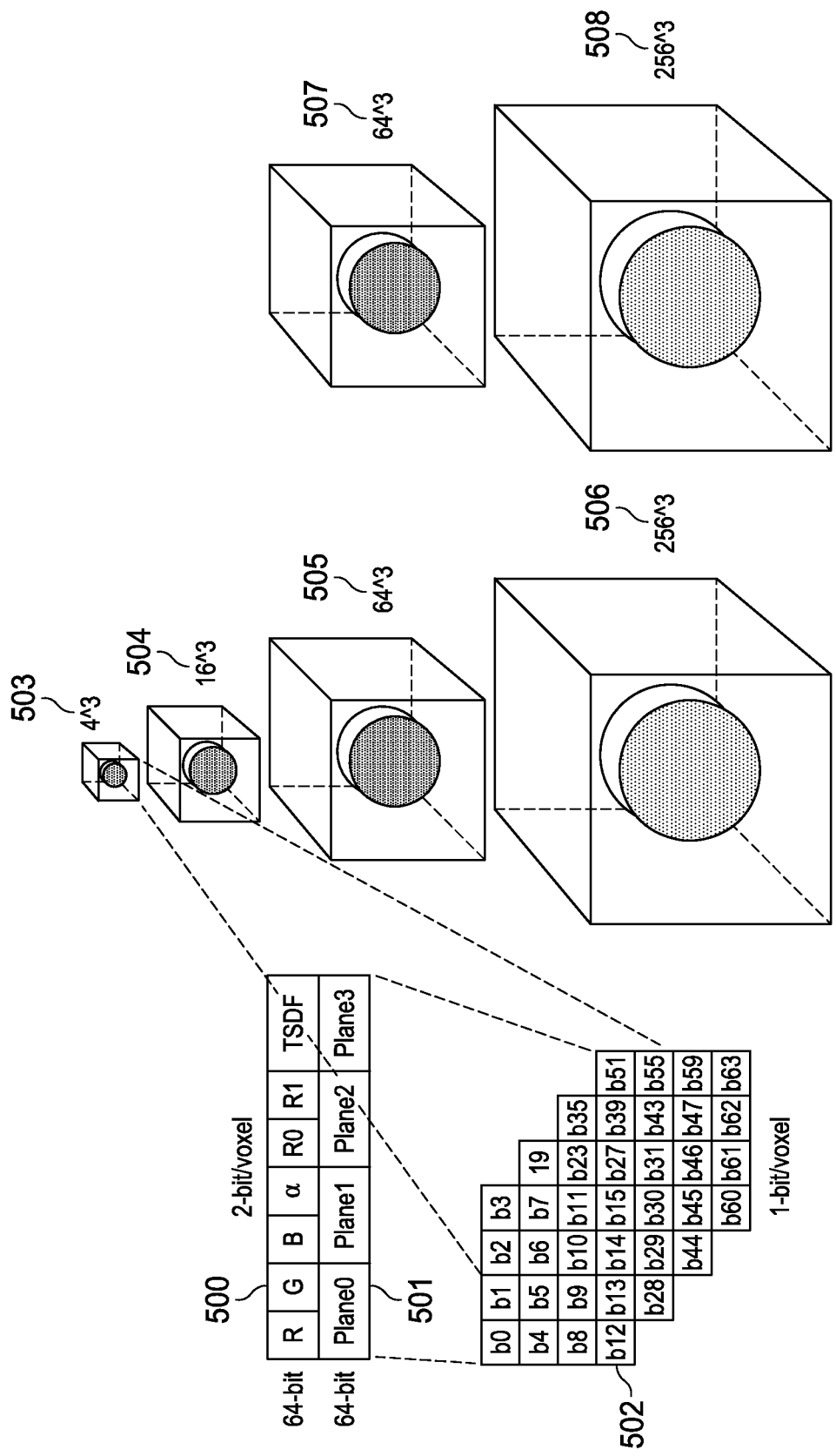
FIG. 5 illustrates the level of detail in an example element tree structure in accordance with some embodiments.

Turning to FIG. 4, a composite view of an example scene is illustrated in accordance with some embodiments. In particular, FIG. 4 shows how a composite view of a scene 404 can be maintained, displayed or subject to further processing using parallel data structures to represent synthetic voxels 401 and real world measured voxels 403 within equivalent bounding boxes 400 and 402 respectively for the synthetic and real-world voxel data. FIG. 5 illustrates the level of detail in a uniform $4^3$ element tree structure in accordance with some embodiments. In some implementations, as little as 1 bit may be utilized to describe each voxel in the volume using an octree representation, such as represented in the example of FIG. 5. However, a disadvantage of octree-based techniques may be the number of indirect memory accesses utilized to access a particular voxel in the octree. In the case of a sparse voxel octree, the same geometry may be implicitly represented at multiple levels of detail advantageously allowing operations such as ray-casting, game-physics, CNNs, and other techniques to allow empty parts of a scene to be culled from further calculations leading to an overall reduction in not only storage required, but also in terms of power dissipation and computational load, among other example advantages.

In one implementation, an improved voxel descriptor (also referred to herein as "volumetric data structure") may be provided to organize volumetric information as a $4^3$ (or 64-bit) unsigned integer, such as shown in 501 with a memory requirement of 1 bit per voxel. In this example, 1-bit per voxel is insufficient to store a truncated signed distance function value (compared with TSDFs in SLAMbench/KFusion which utilize 64-bits). In the present example, an additional (e.g., 64-bit) field 500 may be included in the voxel descriptor. This example may be further enhanced such that while the TSDF in 64-bit field 500 is 16-bits, an additional 2-bits of fractional resolution in x, y and z may be provided implicitly in the voxel descriptor 501 to make the combination of the voxel TSDF in 64-bit field 500 and voxel location 501 equivalent to a much higher resolution TSDF, such as used in SLAMbench/KFusion or other examples. For instance, the additional data in the 64-bit field 500 (voxel descriptor) may be used to store subsampled RGB color information (e.g., from the scene via passive RGB sensors) with one byte each, and an 8-bit transparency value alpha, as well as two 1-byte reserved fields R1 and R2 that may be application specific and can be used to store, for example, acoustic reflectivity for audio applications, rigidity for physics applications, object material type, among other examples.

As shown in FIG. 5, the voxel descriptor 501 can be logically grouped into four 2D planes, each of which contain 16 voxels 502. These 2D planes (or voxel planes) may describe each level of an octree style structure based on successive decompositions in ascending powers of 4, as represented in FIG. 5. In this example implementation, the 64-bit voxel descriptor is chosen because it is a good match for a 64-bit bus infrastructure used in a corresponding system implementation (although other voxel descriptor sizes and formats may be provided in other system implementations and sized according to the bus or other infrastructure of the system). In some implementations, a voxel descriptor may be sized to reduce the number of memory accesses used to obtain the voxel. For instance, a 64-bit voxel descriptor may be used to reduce the number of memory accesses necessary to access a voxel at an arbitrary level in the octree by a factor of 2 compared to a traditional octree which operates on 2^3 elements, among other example considerations and implementations.

In one example, an octree can be described starting from a 4^3 root volume 503, and each non-zero entry in which codes for the presence of geometry in the underlying layers 504, 505 and 506 are depicted in the example 256^3 volume. In this particular example, four memory accesses may be used in order to access the lowest level in the octree. In cases where such overhead is too high, an alternate approach may be adopted to encode the highest level of the octree as a larger volume, such as 64^3, as shown in 507. In this case, each non-zero entry in 507 may indicate the presence of an underlying 4^3 octree in the underlying 256^3 volume 508. The result of this alternate organization is that only two memory accesses are required to access any voxel in the 256^3 volume 508 compared to the alternate formulation shown in 503, 504 and 505. This latter approach is advantageous in the case that the device hosting the octree structure has a larger amount of embedded memory, allowing only the lower and less frequently accessed parts of the voxel octree 508 in external memory. This approach may cost more in terms of storage, for instance, where the full, larger (e.g., 64^3) volume is to be stored in on-chip memory, but the tradeoff may allow faster memory access (e.g., 2×) and much lower power dissipation, among other example advantages.

Figure 6:
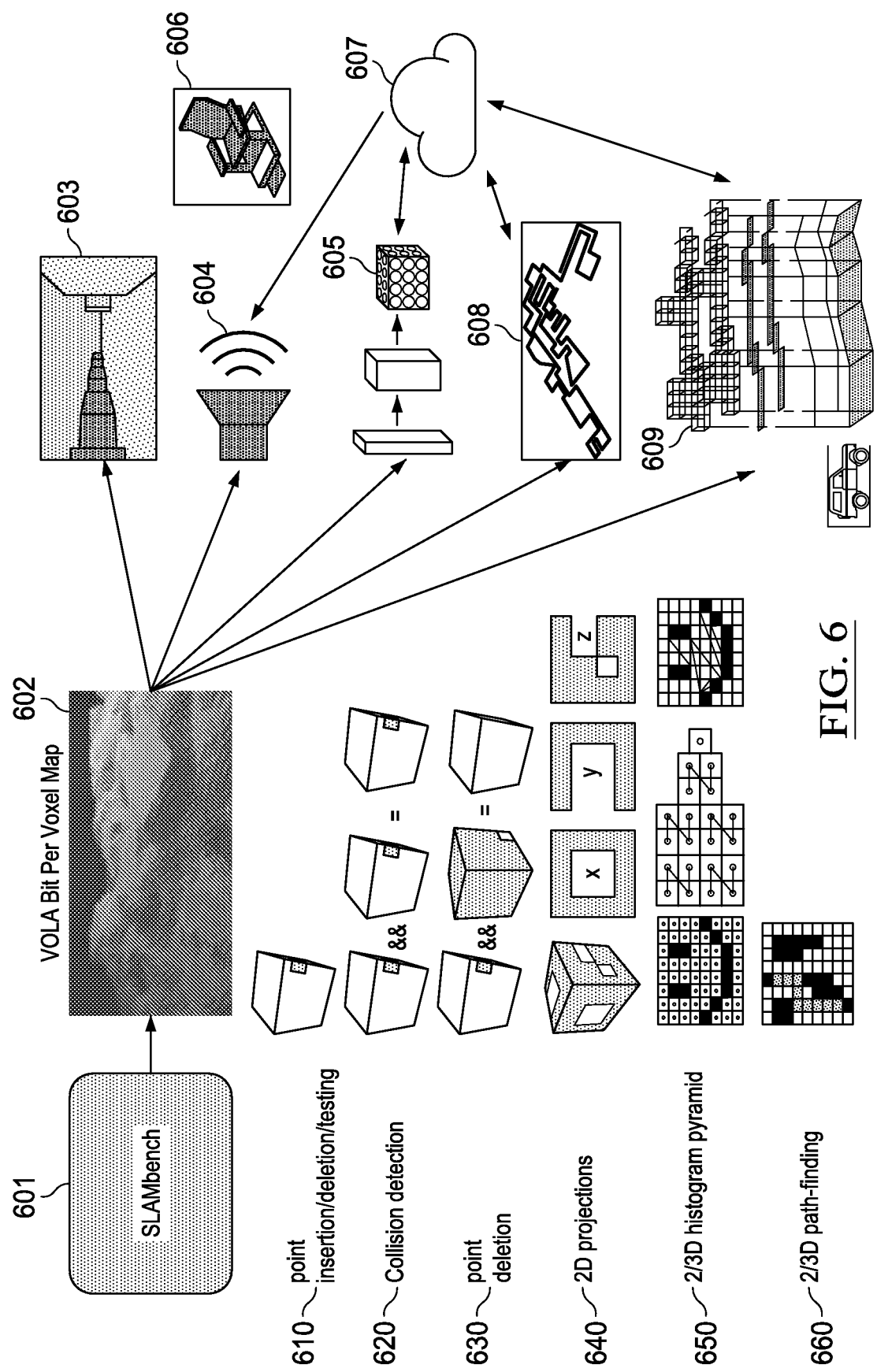
FIG. 6 illustrates applications which can utilize the data-structure and voxel data of the present application in accordance with some embodiments.

Turning to FIG. 6, a block diagram is shown illustrating example applications which may utilize the data-structure and voxel data of the present application in accordance with some embodiments. In one example, such as that shown in FIG. 5, additional information may be provided through an example voxel descriptor 500. While the voxel descriptor may increase the overall memory utilized to 2 bits per voxel, the voxel descriptor may enable a wide range of applications, which can make use of the voxel data, such as represented in FIG. 6. For instance, a shared volumetric representation 602, such as generated using a dense SLAM system 601 (e.g., SLAMbench), can be used in rendering the scene using graphic ray-casting or ray-tracing 603, used in audio ray-casting 604, among other implementations. In still other examples, the volumetric representation 602 can also be used in convolutional neural network (CNN) inference 605, and can be backed up by cloud infrastructure 607. In some instances, cloud infrastructure 607 can contain detailed volumetric descriptors of objects such as a tree, piece of furniture, or other object (e.g., 606) that can be accessed via inference. Based on inferring or otherwise identifying the object, corresponding detailed descriptors may be returned to the device, allowing voxels of volumetric representation 602 to be replaced by bounding box representations with pose information and descriptors containing the properties of the objects, among other example features.

In still other embodiments, the voxel models discussed above may be additionally or alternatively utilized in some systems to construct 2D maps of example environments 608 using 3D-to-2D projections from the volumetric representation 602. These 2D maps can again be shared via communicating machines via cloud infrastructure and/or other network-based resources 607 and aggregated (e.g., using the same cloud infrastructure) to build higher quality maps using crowd-sourcing techniques. These maps can be shared by the cloud infrastructure 607 to connected machines and devices. In still further examples, 2D maps may be refined for ultra-low bandwidth applications using projection followed by piecewise simplification 609 (e.g., assuming fixed width and height for a vehicle or robot). The simplified path may then only have a single X,Y coordinate pair per piecewise linear segment of the path, reducing the amount of bandwidth required to communicate the path of the vehicle 609 to cloud infrastructure 607 and aggregated in that same cloud infrastructure 607 to build higher quality maps using crowd-sourcing techniques. These maps can be shared by cloud infrastructure 607 to connected machines and devices.

In order to enable these different applications, in some implementations, common functionality may be provided, such as through a shared software library, which in some embodiments may be accelerated using hardware accelerators or processor instruction set architecture (ISA) extensions, among other examples. For instance, such functions may include the insertion of voxels into the descriptor, the deletion of voxels, or the lookup of voxels 610. In some implementations, a collision detection function 620 may also be supported, as well as point/voxel deletion from a volume 630, among other examples. As introduced above, a system may be provided with functionality to quickly generate 2D projections 640 in X-, Y- and Z-directions from a corresponding volumetric representation 602 (3D volume) (e.g., which may serve as the basis for a path or collision determination). In some cases, it can also be advantageous to be able to generate triangle lists from volumetric representation 602 using histogram pyramids 650. Further, a system may be provided with functionality for fast determination of free paths 660 in 2D and 3D representations of a volumetric space 602. Such functionality may be useful in a range of applications. Further functions may be provided, such as elaborating the number of voxels in a volume, determining the surface of an object using a population counter to count the number of 1 bits in the masked region of the volumetric representation 602, among other examples.

Figure 7:
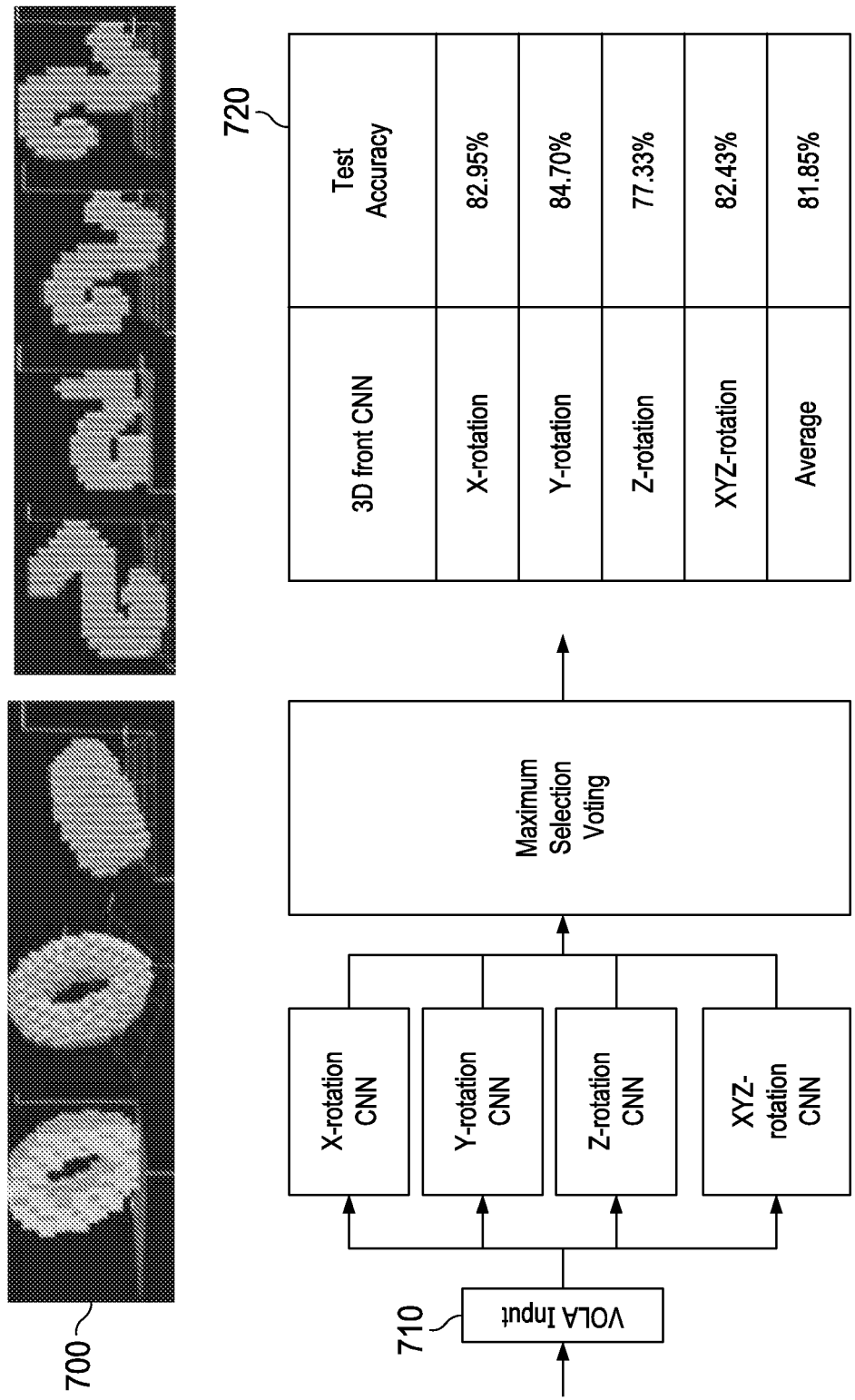
FIG. 7 illustrates an example network used to recognize 3D digits in accordance with some embodiments.

Turning to the simplified block diagram of FIG. 7, an example network is illustrated including systems equipped with functionality to recognize 3D digits in accordance with at least some embodiments. For instance, one of the applications shown in FIG. 6 is the volumetric CNN application 605, which is described in more detail in FIG. 7 where an example network is used to recognize 3D digits 700 generated from a data set, such as the Mixed National Institute of Standards and Technology (MNIST) dataset. Digits within such a data set may be used to train a CNN based convolutional network classifier 710 by applying appropriate rotations and translations in X, Y and Z to the digits before training. When used for inference in an embedded device, the trained network 710 can be used to classify 3D digits in the scene with high accuracy even where the digits are subject to rotations and translations in X, Y and Z 720, among other examples. In some implementations, the operation of the CNN classifier can be accelerated by the HW CNN accelerator 207 shown in FIG. 2. As the first layer of the neural network performs multiplications using the voxels in the volumetric representation 602, these arithmetic operations can be skipped as multiplication by zero is always zero and multiplication by a data value A by one (voxel) is equal to A.

Figure 8:
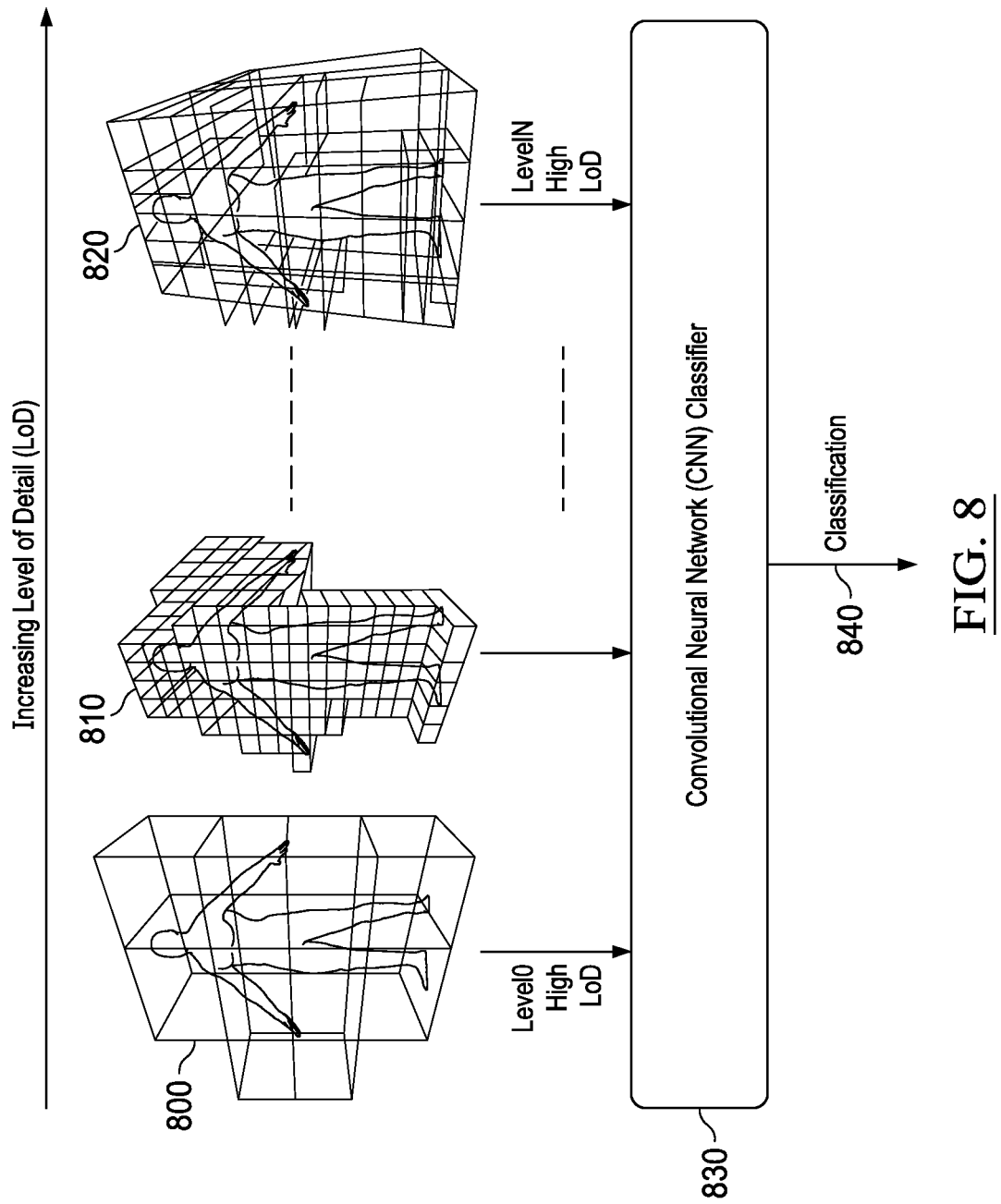
FIG. 8 illustrates multiple classifications performed on the same data structure using implicit levels of detail in accordance with some embodiments.

FIG. 8 illustrates multiple classifications performed on the same data structure using implicit levels of detail. A further refinement of the CNN classification using volumetric representation 602 may be that, as the octree representation contains multiple levels of detail implicitly in the octree structure as shown in FIG. 5, multiple classifications can be performed on the same data structure using the implicit levels of detail 800, 810 and 820 in parallel using a single classifier 830 or multiple classifiers in parallel, such as shown in FIG. 8. In traditional systems, comparable parallel classification may be slow due to the required image resizing between classification passes. Such resizing may be foregone in implementations applying the voxel structures discussed herein, as the same octree may contain the same information at multiple levels of detail. Indeed, a single training dataset based on volumetric models can cover all of the levels of detail rather than resized training datasets, such as would be required in conventional CNN networks.

Turning to the example of FIG. 9, an example operation elimination is illustrated by 2D CNNs in accordance with some embodiments. Operation elimination can be used on 3D volumetric CNNs, as well as on 2D CNNs, such as shown in FIG. 9. For instance, in FIG. 9, in a first layer, a bitmap mask 900 can be used to describe the expected "shape" of the input 910 and may be applied to an incoming video stream 920. In one example, operation elimination can be used not only on 3D volumetric CNNs, but also on 2D volumetric CNNs. For instance, in a 2D CNN of the example of FIG. 9, a bitmap mask 900 may be applied to a first layer of the CNN to describe the expected "shape" of the input 910 and may be applied to input data of the CNN, such as an incoming video stream 820. As an example, the effect of applying bitmap masks to images of pedestrians for training or inference in CNN networks is shown in FIG. 9 where 901 represents an original image of a pedestrian 901, with 903 representing the corresponding version with bitmap mask applied. Similarly, an image containing no pedestrian is shown in 902 and the corresponding bitmap masked version in 904. The same method can be applied to any kind of 2D or 3D object in order to reduce the number of operations required for CNN training or inference through knowledge of the expected 2D or 3D geometry expected by the detector. An example of a 3D volumetric bitmap is shown in 911. The use of 2D bitmaps for inference in a real scene is shown in 920.

In the example implementation of FIG. 9, a conceptual bitmap is shown (at 900) while the real bitmap is generated by averaging a series of training images for a particular class of object 910. The example shown is two dimensional, however similar bitmap masks can also be generated for 3D objects in the proposed volumetric data format with one bit per voxel. Indeed the method could also potentially be extended to specify expected color range or other characteristics of the 2D or 3D object using additional bits per voxel/pixel, among other example implementations.

Figure 10:
FIG. 10 illustrates the experimental results from analysis of example test images in accordance with some embodiments.

FIG. 10 is a table illustrating results of an example experiment involving the analysis of 10,000 CIFAR-10 test images in accordance with some embodiments. In some implementations, operation elimination can be used to eliminate intermediate calculations in 1D, 2D, and 3D CNNs due to Rectified Linear Unit (ReLU) operations which are frequent in CNN networks such as LeNet 1000, shown in FIG. 10. As shown in FIG. 10, in an experiment using 10,000 CIFAR-10 test images, the percentage of data-dependent zeroes generated by the ReLU units may reach up to 85%, meaning that in the case of zeroes, a system may be provided that recognizes the zeros and, in response, does not fetch corresponding data and perform corresponding multiplication operations. In this example, the 85% represents the percentage of ReLU dynamic zeros generated from the Modified National Institute of Standards and Technology database (MNIST) test dataset. The corresponding operation eliminations corresponding to these zero may serve to reduce power dissipation and memory bandwidth requirements, among other example benefits.

Trivial operations may be culled based on a bitmap. For instance, the use of such a bitmap may be according to the principles and embodiments discussed and illustrated in U.S. Pat. No. 8,713,080, titled "Circuit for compressing data and a processor employing the same," which is incorporated by reference herein in its entirety. Some implementations, may provide hardware capable of using such bitmaps, such as systems, circuitry, and other implementations discussed and illustrated in U.S. Pat. No. 9,104,633, titled "Hardware for performing arithmetic operations," which is also incorporated by reference herein in its entirety.

Figure 11:
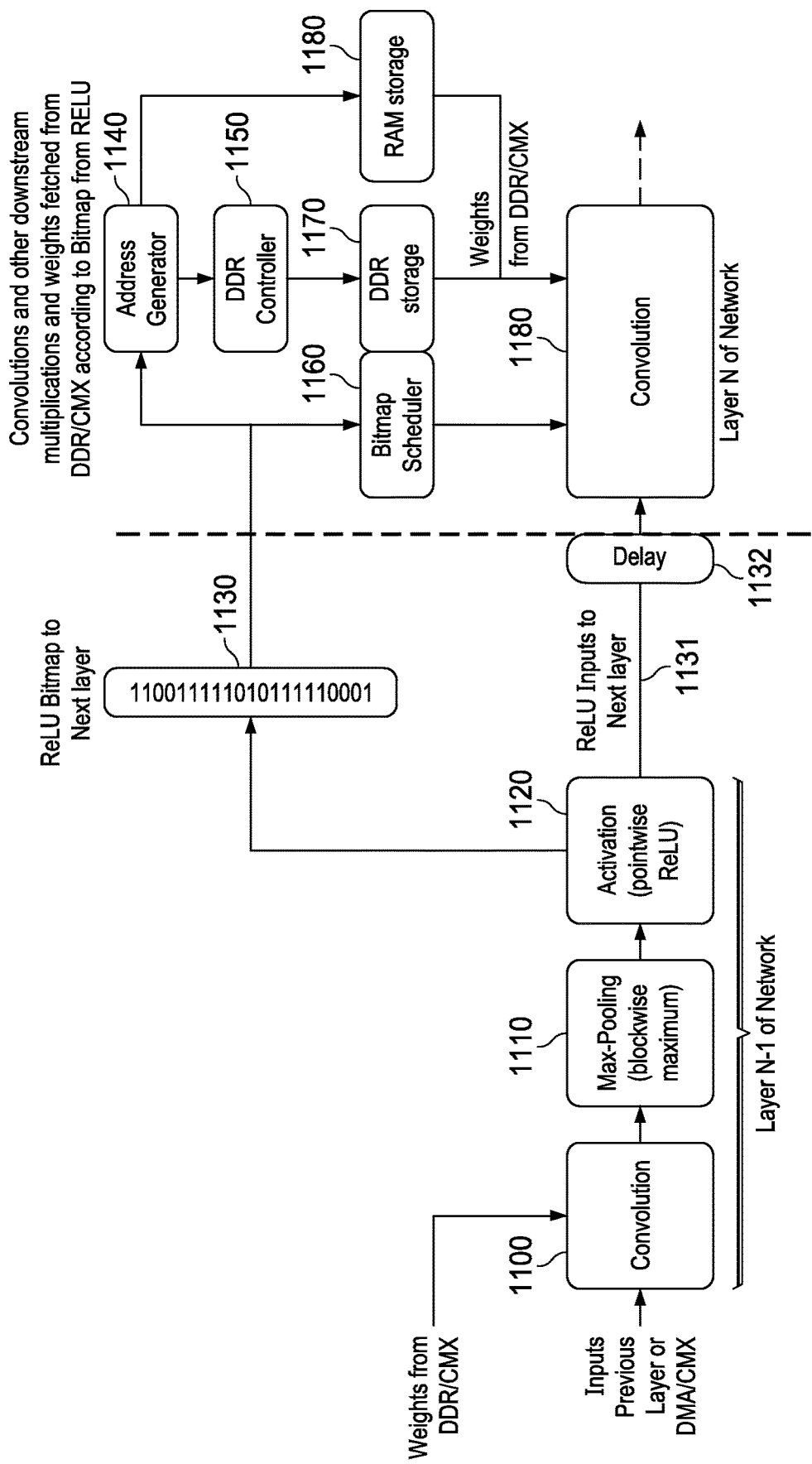
FIG. 11 illustrates hardware for culling operations in accordance with some embodiments.

FIG. 11 illustrates hardware that may be incorporated into a system to provide functionality for culling trivial operations based on a bitmap in accordance with some embodiments. In this example, a multi-layer neural network is provided, which includes repeated convolutional layers. The hardware may include one or more processors, one or more microprocessors, one or more circuits, one or more computers, and the like. In this particular example, a neural network includes an initial convolutional processing layer 1100, followed by pooling processing 1110, and finally an activation function processing, such as rectified linear unit (ReLU) function 1120. The output of the ReLU unit 1120, which provides ReLU output vector 1131, may be connected to a following convolutional processing layer 1180 (e.g., possibly via delay 1132), which receives ReLU output vector 1131. In one example implementation, a ReLU bitmap 1130 may also be generated in parallel with the connection of the ReLU unit 1120 to the following convolution unit 1180, the ReLU bitmap 1130 denoting which elements in the ReLU output vector 1131 are zeroes and which are non-zeroes.

In one implementation, a bitmap (e.g., 1130) may be generated or otherwise provided to inform enabled hardware of opportunities to eliminate operations involved in calculations of the neural network. For instance, the bits in the ReLU bitmap 1130 may be interpreted by a bitmap scheduler 1160, which instructs the multipliers in the following convolutional unit 1180 to skip zero entries of the ReLU output vector 1131 where there are corresponding binary zeroes in the ReLU bitmap 1130, given that multiplication by zero will always produce zero as an output. In parallel, memory fetches from the address generator 1140 for data/weights corresponding to zeroes in the ReLU bitmap 1130 may also be skipped as there is little value in fetching weights that are going to be skipped by the following convolution unit 1180. If weights are to be fetched from an attached DDR DRAM storage device 1170 via a DDR controller 1150, the latency may be so high that it is only possible to save some on-chip bandwidth and related power dissipation. On the other hand, if weights are fetched from on-chip RAM 1180 storage, it may be possible to bypass/skip the entire weight fetch operation, particularly if a delay corresponding to the RAM/DDR fetch delay 1132 is added at the input to the following convolution unit 1180.

Figure 12:
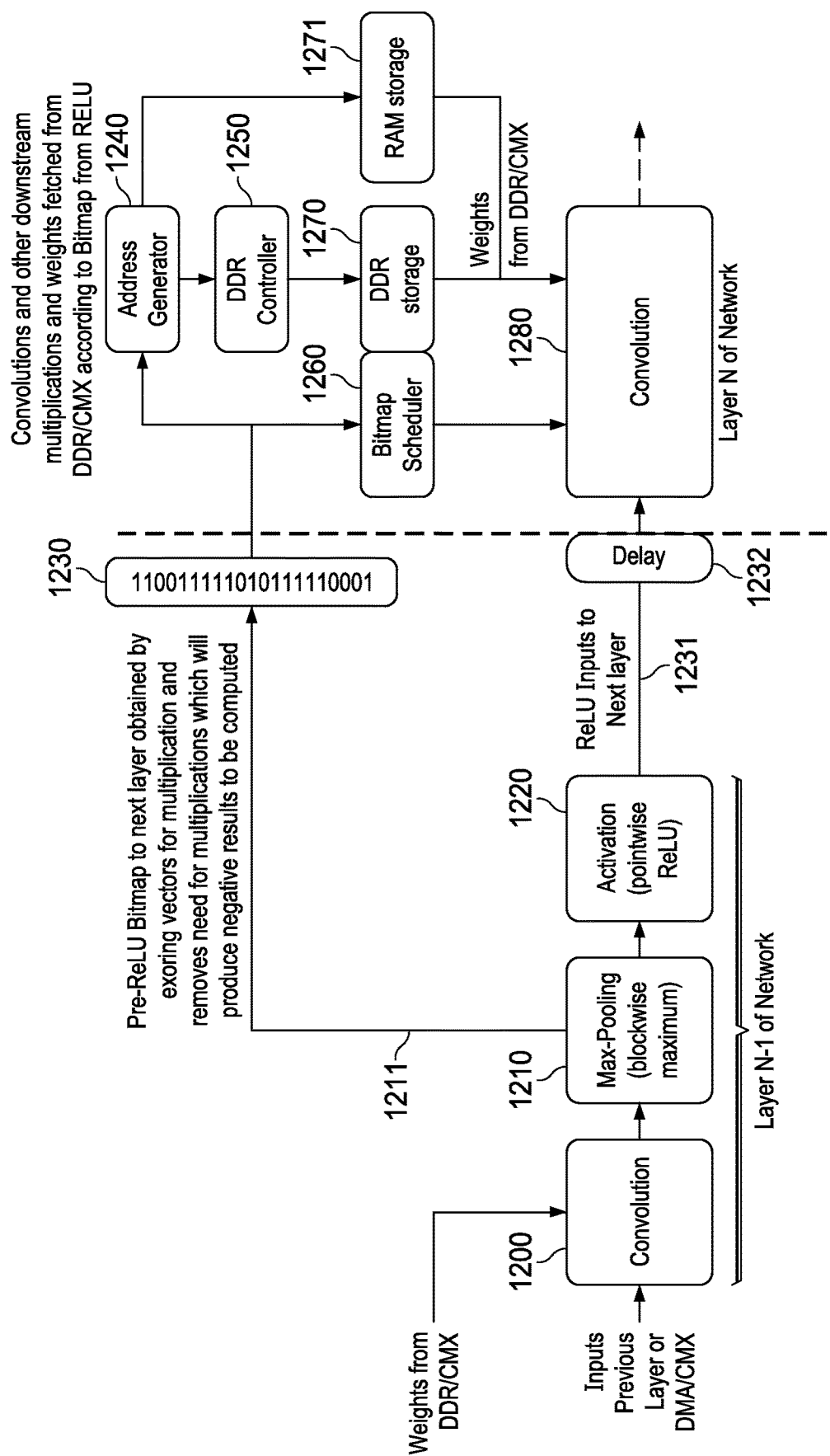
FIG. 12 illustrates a refinement to the hardware for culling operations in accordance with some embodiments.

Turning to FIG. 12, a simplified block diagram is presented to illustrate a refinement to example hardware equipped with circuitry and other logic for culling trivial operations (or performing operation elimination) in accordance with some embodiments. As shown in the example of FIG. 12, additional hardware logic may be provided to predict the sign of the ReLU unit 1220 input in advance from the preceding Max-Pooling unit 1210 or convolution unit 1200. Adding sign-prediction and ReLU bitmap generation to the Max-pooling unit 1210 may allow the ReLU bitmap information to be predicted earlier from a timing point of view to cover delays that may occur through the address generator 1240, through external DDR controller 1250 and DDR storage 1270 or internal RAM storage 1271. If the delay is sufficiently low, the ReLU bitmap can be interpreted in the address generator 1240 and memory fetches associated with ReLU bitmap zeroes can be skipped completely, because the results of the fetch from memory can be determined never to be used. This modification to the scheme of FIG. 11 can save additional power and may also allow the removal of the delay stage (e.g., 1132, 1232) at the input to the following convolution unit 1280 if the delays through the DDR access path (e.g., 1240 to 1250 to 1270) or RAM access path (e.g., 1240 to 1271) are sufficiently low so as not to warrant a delay stage 1232, among other example features and functionality.

Figure 13:
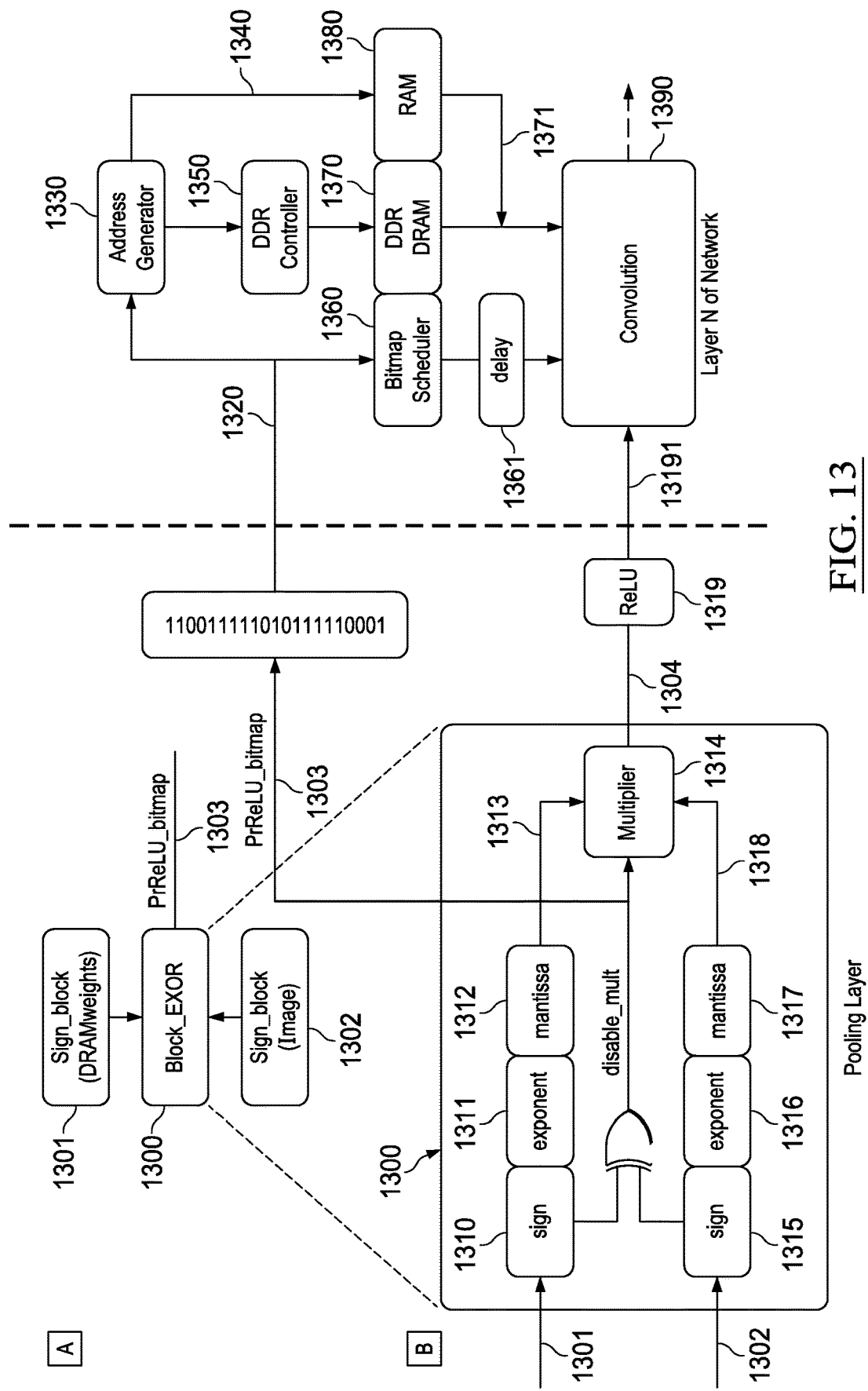
FIG. 13 illustrates hardware in accordance with some embodiments.

FIG. 13 is another simplified block diagram illustrating example hardware in accordance with some embodiments. For instance, CNN ReLU layers can produce high numbers of output zeroes corresponding to negative inputs. Indeed, negative ReLU inputs can be predictively determined by looking at the sign input(s) to the previous layers (e.g., the pooling layer in the example of FIG. 13). Floating-point and integer arithmetic can be explicitly signed in terms of the most significant bit (MSB) so a simple bit-wise exclusive OR (XOR) operation across vectors of inputs to be multiplied in a convolution layer can predict which multiplications will produce output zeroes, such as shown in FIG. 13. The resulting sign-predicted ReLU bitmap vector can be used as a basis for determining a subset of multiplications and associated coefficient reads from memory to eliminate, such as in the manner described in other examples above.

Providing for the generation of ReLU bitmaps back into the previous pooling or convolutional stages (i.e., stages before the corresponding ReLU stage) may result in additional power. For instance, sign-prediction logic may be provided to disable multipliers when they will produce a negative output that will be ultimately set to zero by the ReLU activation logic. For instance, this is shown where the two sign bits 1310 and 1315 of the multiplier 1314 inputs 1301 and 1302 are logically combined by an XOR gate to form a PreReLU bitmap bit 1303. This same signal can be used to disable the operation of the multiplier 1314, which would otherwise needlessly expend energy generating a negative output which would be set to zero by the ReLU logic before being input for multiplication in the next convolution stage 1390, among other examples.

Note that the representation of 1300, 1301, 1302, and 1303 (notation A) shows a higher-level view of that shown in the representation donated B in FIG. 13. In this example, the input to block 1302 may include two floating-point operands. Input 1301 may include an explicit sign-bit 1310, a Mantissa 1311 including a plurality of bits, and an exponent again including a plurality of bits 1312. Similarly, input 1302 may likewise include a sign 1315, mantissa 1317, and exponent 1316. In some implementations, the mantissas, and exponents may have different precisions, as the sign of the result 1303 depends solely upon the signs of 1301 and 1302, or 1310 and 1315 respectively. In fact, neither 1301 nor 1302 need be floating point numbers, but can be in any integer or fixed-point format as long as they are signed numbers and the most significant bit (MSB) is effectively the sign bit either explicitly or implicitly (e.g., if the numbers are one- or twos-complement, etc.).

Continuing with the example of FIG. 13, the two sign inputs 1310 and 1315 may be combined using an XOR (sometimes denoted alternatively herein as ExOR or EXOR) gate to generate a bitmap bit 1303, which may then be processed using hardware to identify down-stream multiplications that may be omitted in the next convolution block (e.g., 1390). The same XOR output 1303 can also be used to disable the multiplier 1314 in the event that the two input numbers 1313 (e.g., corresponding to 1301) and 1318 (e.g., corresponding to 1302) have opposite signs and will produce a negative output 1304 which would be set to zero by the ReLU block 1319 resulting in a zero value in the RELU output vector 13191 which is to be input to the following convolution stage 1390. Accordingly, in some implementations, the PreReLU bitmap 1320 may, in parallel, be transmitted to the bitmap scheduler 1360, which may schedule the multiplications to run (and/or omit) on the convolution unit 1390. For instance, for every zero in the bitmap 1320, a corresponding convolution operation may be skipped in the convolution unit 1390. In parallel, the bitmap 1320 may be consumed by an example address generator 1330, which controls the fetching of weights for use in the convolution unit 1390. A list of addresses corresponding to 1 s in the bitmap 1320 may be compiled in the address generator 1330 and controls either the path to DDR storage 1370 via the DDR controller 1350, or else controls the path to on chip RAM 1380. In either case, the weights corresponding to ones in the PreReLU bitmap 1320 may be fetched and presented (e.g., after some latency in terms of clock cycles to the weight input 1371) to the convolution block 1390, while fetches of weights corresponding to zeros may be omitted, among other examples.

As noted above, in some implementations, a delay (e.g., 1361) may be interposed between the bitmap scheduler 1360 and the convolution unit 1390 to balance the delay through the address generator 1330, DDR controller 1350, and DDR 1350, or the path through address generator 1330 and internal RAM 1380. The delay may enable convolutions driven by the bitmap scheduler to line up correctly in time with the corresponding weights for the convolution calculations in the convolution unit 1390. Indeed, from a timing point of view, generating a ReLU bitmap earlier than at the output of the ReLU block 1319 can allow additional time to be gained, which may be used to intercept reads to memory (e.g., RAM 1380 or DDR 1370) before they are generated by the address generator 1330, such that some of the reads (e.g., corresponding to zeros) may be foregone. As memory reads may be much higher than logical operations on chip, excluding such memory fetches may result in very significant energy savings, among other example advantages.

In some implementations, if there is still insufficient saving in terms of clock cycles to cover the DRAM access times, a block-oriented technique may be used to read groups of sign-bits (e.g., 1301) from DDR ahead of time. These groups of sign bits may be used along with blocks of signs from the input images or intermediate convolutional layers 1302 in order to generate blocks of PreReLU bitmaps using a set of (multiple) XOR gates 1300 (e.g., to calculate the differences between sign bits in a 2D or 3D convolution between 2D or 3D arrays/matrices, among other examples). In such an implementation, an additional 1-bit of storage in DDR or on-chip RAM may be provided to store the signs of each weight, but this may allow many cycles of latency to be covered in such a way as to avoid ever reading weights from DDR or RAM that are going to be multiplied by zero from a ReLU stage. In some implementations, the additional 1-bit of storage per weight in DDR or on-chip RAM can be avoided as signs are stored in such a way that they are independently addressable from exponents and mantissas, among other example considerations and implementations.

In one example, a system may be further enhanced to utilize DDR accesses, which may have a natural burst access for maximal data-transfer rate. Saving energy by skipping individual DDR weight accesses may not be feasible in this content as they may be shorter than a burst. Accordingly, in some instances, bursts may be skipped in cases where all bitmap bits corresponding to a particular burst transaction are zero. However, this may not occur frequently and hence, the resulting power and bandwidth savings may be limited. In still other implementations, a register programmable threshold may be set for the number of bitmap bits in a burst so that the burst will be skipped completely if more than N bits in the bitmap burst are zero. This may have the effect of slightly degrading overall CNN classification accuracy, but may be acceptable in the interests of saving energy.

Figure 14:
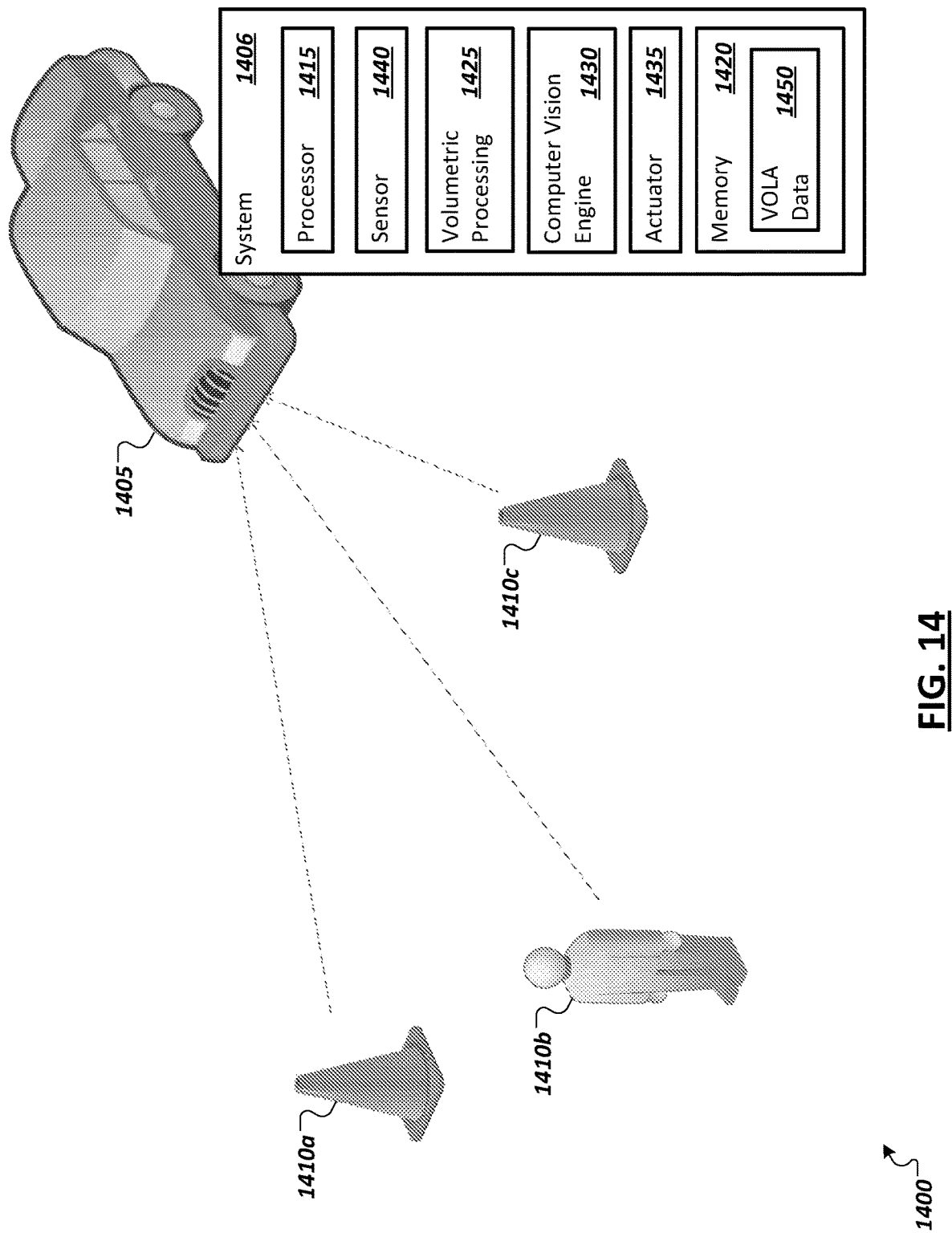
FIG. 14 illustrates an example system employing a computer vision subsystem in accordance with some embodiments.

Turning to FIG. 14, a simplified block diagram 1400 is shown illustrating an example environment involving a machine 1405 analyzing a 3D space. In some implementations, the machine may be equipped with machine-executable logic, implemented in hardware and/or circuitry, to utilize volumetric data describing the 3D space in one or a variety of applications or actions, such as a SLAM process, raycasting, odometry, collision detection, 2D- or 3D-route planning, among other examples, such as discussed herein. The volumetric data may be embodied as a sparse tree representation, such as discussed herein. In some instances, a hash table may also or alternatively be used to perform quicker processing of volumetric data by trading off increased memory occupation (e.g., as the hash table uses less memory than the dense array).

The machine 1405 may include hardware and logic discussed herein configured to handle and process volumetric data represented in a sparse tree volumetric data structure. In the particular example illustrated in FIG. 14, the machine 1405 may be implemented as an autonomous or semi-autonomous machine capable of processing volumetric data describing a 3D scene and utilizing this information to autonomous move within the scene (e.g., change its position within the scene and/or change the orientation (e.g., aim) of one or more of the machine's elements (e.g., a sensor, camera, pointer, actuator, tool, etc.) based on geography present within the scene. By so doing, the machine may detect objects (e.g., 1410*a*-*c*) and navigate or interact with the scene autonomously based on the detected objects. In some implementations, the machine 1405 may be embodied as an autonomous vehicle (for carrying passenger or cargo), an aerial, ground-based, or water-based drone, a robot, among other examples.

In one example implementation, the machine 1405 may include a computing system 1406 implemented using a data processor 1415, such as one or more central processing units (CPUs), graphical processing units (GPUs), tensor processing units or other matrix arithmetic processors, hardware accelerators (e.g., volumetric processing accelerator, machine learning accelerator), among other example general purpose and specialized processing hardware, and further implemented using one or more memory elements (e.g., 1420). Additional logical blocks may be provided, which are implemented in hardware circuitry, firmware, or software, such as volumetric processing logic 1425, computer vision engine 1430, and actuator 1435. In some implementations, the machine 1405 may additionally include one or more sensors (e.g., 1440) to measure the 3D space (e.g., lidar, time of flight sensors, realsense sensors, etc.). Such sensors 1440 may be used to generate the volumetric data describing the 3D environment to develop a map of the volume as well as for comparing locally observed geometry detected using the sensors 1440 with reference data describing an expected or previously observed version of the volume's occupied geometry. Sensor data may be processed by the computer vision engine 1430 in connection with raycasting, odometry, pose estimation, or other functions (e.g., which may be implemented as sub-modules of the computer vision engine 1430). In some instances, volumetric processing logic 1425 may be provided with logic to perform one or multiple different volumetric processing operations or tasks, such as tasks pertaining to the functionality of computer vision engine 1430. In one example, a volumetric acceleration unit, such as the volumetric acceleration unit (VXU) described herein, may be utilized to implement at least a portion of volumetric processing logic 1425 and/or computer vision engine 1430. In some implementations, all or a part of the logic of volumetric processing logic 1425 and computer vision engine 1430 may be combined. Volumetric processing logic may take, as an input, volumetric data embodied in VOLA data 1450 and parse the data 1450 to determine opportunities to forego analysis of certain sections of a relevant volume identified, in the data 1450, as not being occupied by structure or geometry, among other examples. In some instances, results generated by the volumetric processing logic 1425 and/or computer vision engine 1430 may cause one or more actuators 1435 of the machine 1405 to be triggered to cause one or more motors, engines, or other drives and/or one or more steering mechanisms to be activated and cause the machine itself or specific tools of the machine to move within the volume in accordance with its design. For instance, volumetric processing logic may provide inputs to one or more actuators to cause a drone or autonomous vehicle to self-navigate a volume understood by the machine through the processing of the volumetric data.

Among its applications, simultaneous localization and mapping (SLAM) applications may be utilized, for instance, in the field of robotics, to facilitate autonomous movement of robots and drones within an environment, among other examples. In some cases, SLAM may utilize maps produced offline. However, autonomous robots often need to build and interact with maps in real-time and do so with limited available resources. Most of the methods for computing dense SLAM are designed for high performance desktop systems and require far more FLOPS, memory, and power than is generally advisable or possible to integrate on a low-cost embedded device utilized in modern robotics and drones, especially when considering the compute intensive raycasting step in the traditional SLAM pipeline. To address this issue, an optimized low-power, low-memory implementation of a raycasting algorithm may be implemented in hardware and/or software, to be integrated in the SLAM pipeline. For instance, the volumetric acceleration data structure (VOLA) introduced herein may be used for the 3D volume representation and additional techniques and features may leverage the structure of VOLA and the architecture utilized to implement an improved SLAM application to realize specific performance/memory efficiency.

The worlds of computer vision and graphics, although separate, converge in the field of robotics. Representing volumetric data in 3D space in a way that conserves the limited resources available in embedded systems is a major challenge for both domains. For instance, input systems for computer vision such as Light Detection and Ranging (LiDAR) can generate point clouds depth maps of the environment that can quickly become too large for embedded system memory to handle. A common application in which this constitutes an issue is SLAM applications, whose goal is to create a map of the environment surrounding a robot and simultaneously locate the robot in it. In autonomous applications, building a highly-detailed map is useless if the autonomous agent is not capable of interacting with it efficiently in real time. One of the most important interactions may be collision detection, which is particularly important in drone applications (e.g., for readily apparent safety reasons). A common method used for ray/geometry intersection is raycasting, which typically requires a high amount of operations per second. Raycasting represents one of the most expensive components of a typical SLAM SW pipeline and hence there is a need to improve its performance and efficiency to make real-time embedded SLAM possible despite the limitations of embedded platforms.

In some implementations, an improved, lightweight implementation of a raycasting algorithm for embedded platforms, based on the use of the VOLA data structure may be utilized, which is specifically designed for reducing the memory requirements of 3D models. For instance, an embedded implementation of the raycasting algorithm may be provided, specifically targeting SLAM applications. Implementing such an algorithm may improve use of computational resources such as caches and SIMD instructions to exploit image and object space coherence, among other example advantages. A dense or a sparse hierarchical grid data structure (e.g., VOLA-based structures) may be utilized to produce volumetric compression of the 3D scene. Such a solution may also yield improvements in power efficiency while maintaining sufficient quality and accuracy.

As introduced above, a VOLA-type data structure may be implemented as a compact data structure organized as a hierarchical bit array that allows efficient compression of volumetric data for use in embedded devices, where it would be impractical or even impossible to use full point clouds in such devices due to memory constraints. A spatial partitioning VOLA structure may combine the hierarchical structure of octrees with volumetric approaches, using modular arithmetic and bit counting applied to a bit array. As opposed to octrees, kd-trees, and other 3D representations, VOLA may not use a pointer-based tree structure, but rather a hierarchical grid structure. Since compression is the main concern, VOLA only encodes occupancy data, achieving the maximum compression of 1 bit per voxel, making it extremely compact. As a consequence, VOLA may not be well suited for accurate volumetric rendering by means of raycasting, but is instead very efficient in applications such as SLAM, in which a simple map of the surrounding has to be built and raycasted and where photorealism of the representation is not a requirement or priority. In some implementations, each element in VOLA is a 64-bit integer that divides a represented volume into 4×4×4 subcells and is mapped from a one-dimensional bit array to the three dimensions using modular arithmetic. If some points are occupied within a cell, the corresponding subcell bit is set to one, otherwise to zero. In the next level only occupied subcells are represented so as to encode just occupied space. As such, passing from a higher level to a lower level within the VOLA structure implies a fourfold increase of the resolution, among other examples.

The use of the VOLA format has been proven in several applications, resulting particularly efficiencies for the encoding of aerial scans of major cities, for instance, where a 70-fold maximum size reduction may be achieved for a LiDAR dataset. Other common applications that could benefit of the VOLA format are CNN inference, path planning and obstacle avoidance. Finally, it is possible to further reduce the memory footprint by making use of Hash tables, among other example applications.

An example raycasting algorithm may be implemented as a non-recursive ray tracing algorithm that only casts primary rays and it is particularly popular as a direct volume rendering technique. Some of the main advantages of volume rendering techniques are their superior image quality and the possibility to render images without explicitly defining the surface geometry. On the contrary the main drawback is their high computational cost. Several approaches exist regarding the data structures used to represent the 3D volume and the algorithms used for voxel traversal. Moreover, numerous additional techniques have been developed during the years to handle specific sub-problems and improve the performance of the algorithm, such as space leaping, coherent packet traversal, frustum culling, etc.

The types of optimizations employed in raycasting are often linked to the chosen representation of the volume. The most basic representation of the volume are uniform grids and hierarchical grids. Hierarchical grids can be organized as loosely nested grids, recursive or multiresolution grids, and macrocells or multigrids. As another example, Binary Space Partitioning (BSPs) may be utilized to recursively subdivide space using an arbitrary splitting plane. Among BSPs, kd-trees are a special case that uses only axis aligned splitting planes. kd-trees allow the volume to be divided adaptively, but are more difficult to update than Octrees and that are more used especially for large volumes. Although packet kd-tree traversal outperforms grids for static scenes, the cost of rebuilding the tree make them less suitable for truly dynamic scenes. Grids, by contrast, can be created and modified at higher rates, making them attractive for animated scenes even if they have a higher traversal cost. Another efficient representation for rendering voxelized geometry are sparse voxel octrees, Bounding Volume Hierarchies (BVH), among other examples.

In some implementations, space leaping may be utilized to exploit the VOLA structure for efficiently skipping empty cells. The strategy used for empty space skipping may be tied to the underlying volume representation. In one example, Ray Acceleration by Distance Coding (RACD) may be utilized for space leaping to store for each voxel the leaping distance to the next possible non-transparent voxel, which may be performed as a preprocessing step. In some implementations, a hardware architecture may be implemented for space leaping by calculating the occupancy map of the rendered volume only for the first level of a multilevel grid structure similar to VOLA. GPU octree-based approaches to skip empty nodes may also be implemented. In some implementation, empty space may be skipped in a regular 3D grid using proximity clouds, in which the empty voxels are filled with scene-dependent information that indicates the proximity to the surrounding objects. For instance, proximity cloud-based algorithms may be implemented in a system, which are particularly dedicated to GPU raycasting for large volume rendering, in which the best of image-order and object-order empty space skipping strategies are combined.

Volume traversal implementations may be at least partially dependent on the chosen volume representation. Most of the methodologies have evolved from an algorithm based on a flat grid, which determines the closest adjacent voxel to be visited at each iteration depending on the distance of the next axis-aligned planes. Other implementations may traverse an octree that only employs operations with integer arithmetic throughout the traversal. In another example, in connection with efficient sparse voxel octrees, an efficient octree representation of the data may be utilized, among other examples.

In traditional raycasters, the color may be accumulated during the traversal of the occupied voxels until an opacity threshold is reached (e.g., opacity accumulation), allowing an early termination of the ray traversal. In this manner, real volumetric data can be rendered accounting for transparent materials. In a front-to-back implementation using VOLA, these kinds of features may be foregone as the information that is needed is information about occupation in 3D space, as VOLA may natively omit the encoding of color information (although VOLA can be expanded with additional bit arrays for the voxel colors, at the expense of an increase in the memory footprint). In such an implementation, the algorithm flow may stop as soon as a voxel is encountered without elaborating any color information, opacity, textures etc.

Figure 15:
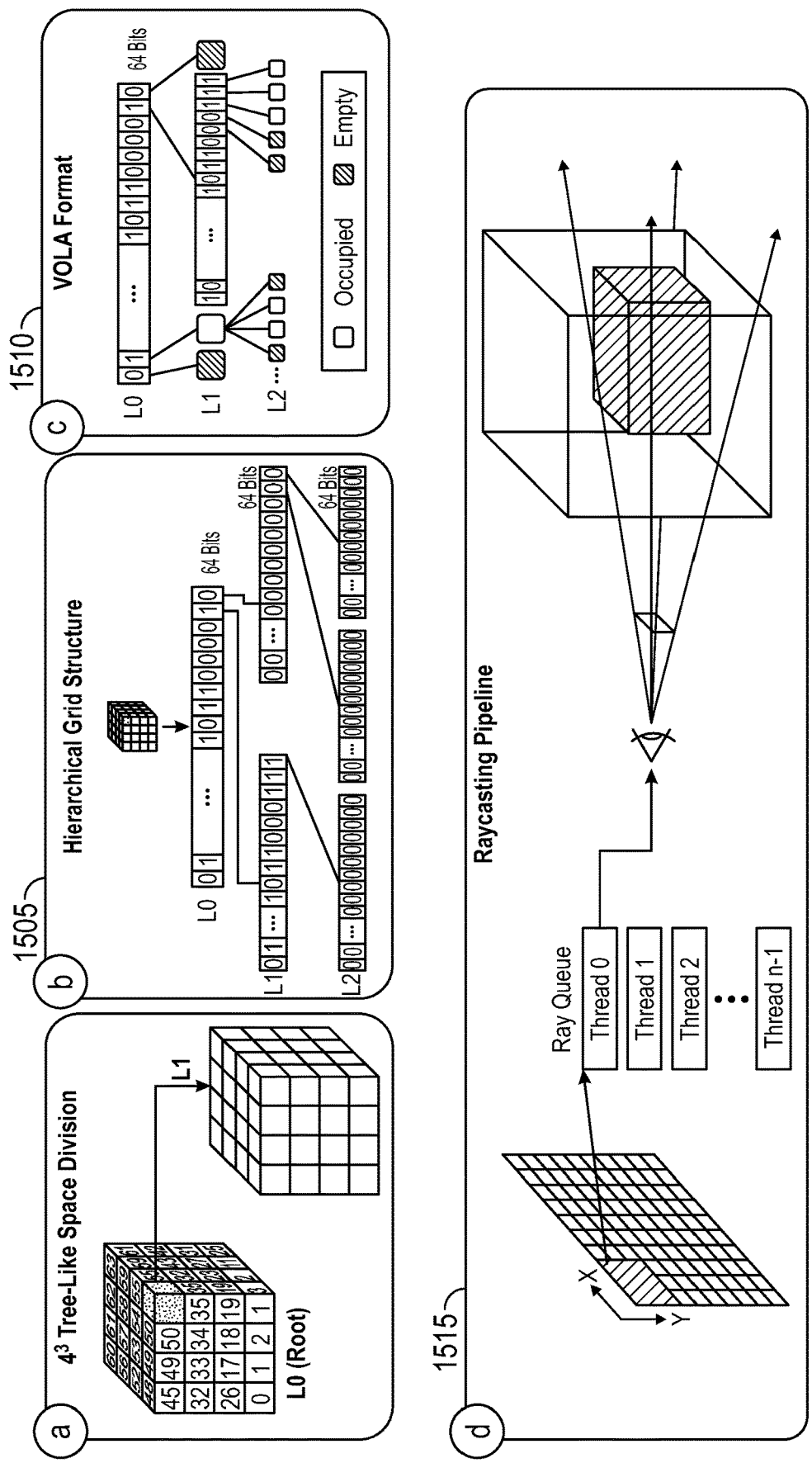
FIG. 15 illustrates raycasting using hierarchical volumetric data structures in accordance with some embodiments.

In one implementation, a ray traversal algorithm used during raycasting may be implemented to specifically exploit the structure of a VOLA-based representation. Turning to FIG. 15, two different 3D volume representations may be used and compared for a particular, example raycaster: a dense hierarchical grid (1505) and the VOLA format (1510), or a sparse hierarchical grid. Both data structures in this example have the shape of a $4^3$-tree with the difference that they are organized as multilevel bit-arrays. The data is encoded with a one bit per voxel format and stored depending on the geographical position in the grid. Given the resolution in the last level, the dimension of the dense grid is predictable, as both empty and occupied space is represented. In the VOLA format, however, the actual occupation may be dependent on the geometry, as empty sub-bricks are not stored. This results in a very small memory occupation but at the same time makes locating an individual voxel more involved and computationally expensive. For instance, to locate a sub-brick bit in a certain level, it may be necessary to know the number of bits that precede the corresponding bit set at the upper level. Such an operation can considerably slow down the computation, which is to be handled carefully during the raycasting algorithm to avoid incurring an unacceptable overhead. As represented at 1505 and 1510, locating a voxel depending on the level is theoretically simpler for the dense hierarchical grid (1505) than for a sparse hierarchical grid (1510), as depicted in FIG. 15.

In one example, a computing system may implement a ray traversal algorithm based on a hierarchical sparse grid structure (e.g., VOLA) in connection with the performance of raycasting operations (e.g., in a SLAM application). In some implementations, utilizing a VOLA structure to represent a 3D space in the raycasting application may enable a more efficient approximated hierarchical ray traversal algorithm. In some implementations, the raycasting traversal algorithm utilized in a raycasting application may implement a hierarchical version of a traditional traversal algorithms, such as the Fast Voxel Traversal Algorithm for Ray Tracing by John Amanatides and Andrew Wo. For instance, in one example implementation of a traversal algorithm, a ray-intersection test operation is performed with the bounding volume (e.g., an Axis-Aligned Bounding Box (AABB) test) when the bounding volume is aligned to the axis of the reference system. If some externally located parts of the volume are empty, it is possible to examine the L0 VOLA element to easily prune the volume to be raycasted, reducing it to a sub-AABB to be intersected (e.g., as represented at 1515). Such applications may include aerial scans, for which the volume in the z dimension is mostly empty. The virtual image is scanned using perspective projection. Since each ray is independent, it is possible to exploit multithreading to simultaneously process the different rays. In some implementations, a pool of threads is initialized and then scheduled depending on the available run-time resources. Indeed, in some implementations, due to considerations of cache data locality and context-switching overhead, it may be more convenient to assign to a thread a rectangular sub-tile of the virtual image rather than a single pixel or a full row.

Figure 16A:
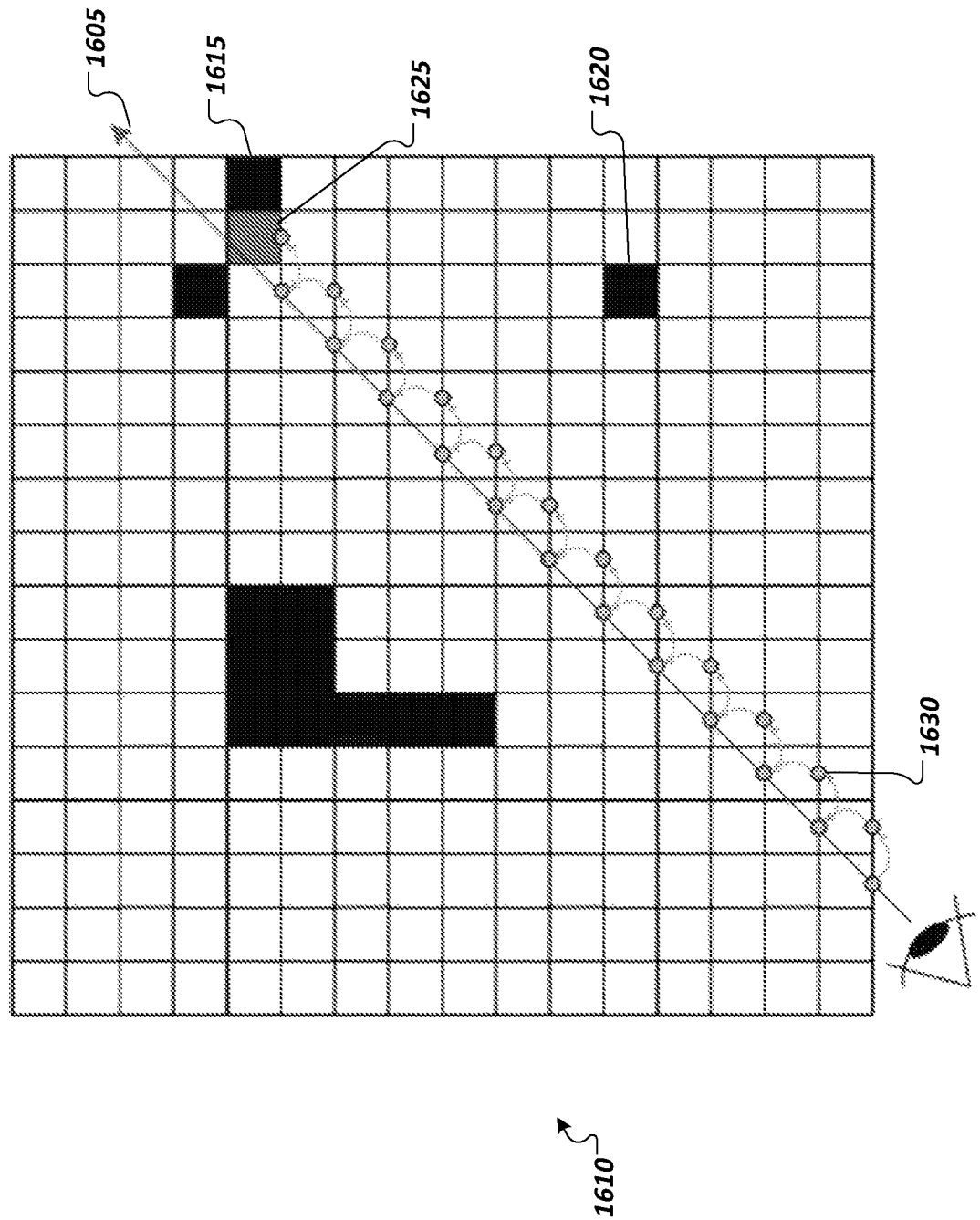
FIGS. 16A-16C illustrate examples of ray traversal during example raycasting algorithms.

In one example, an algorithm may be implemented using a computing system (and in some cases entirely in hardware), where p is the ray-AABB intersection point (or alternatively a point inside the volume) and d the ray direction; the equation of the ray expressed as r(t)=p+td. Solving the equation to find t for an axis aligned plane orthogonal to the x component gives $t_x=(1/d_x)x+(-p_x/d_x)$ where $d_x$ is the distance of the point to the plane. Defining now ($t_{Deltax}$, $t_{DeltaY}$, $t_{DeltaZ}$) as the values of t for which the ray moves for the width of the voxel in a particular direction, and initializing the ($t_{MaxX}$, $t_{MaxY}$, $t_{MaxZ}$) variables with the $t_x$, $t_y$, $t_z$ values for the closest axis aligned plane intersection, it is possible to define a simple algorithm to handle the traversal of the ray through a uniform grid. The pseudocode for the algorithm is represented below and an example visual traversal is depicted in FIG. 16A:

```
(x, y, z) ← p;
r ← (p,d);
(tMaxX, tMaxY, tMaxZ) ← findTMax3D(r);
```

-continued

```
(tDeltaX, tDeltaY, tDeltaZ) ← findTDelta3D(r);
while inside volume do
    if GetVoxel(x, y, z) then
        return (x, y, z);
    else
        if tMaxX < tMaxY then
            if tMaxX < tMaxZ then
                tMaxX += tDeltaX;
                x += stepX;
            else
                tMaxZ += tDeltaZ;
                z += stepZ;
            end
        else
            if tMaxY < tMaxZ then
                tMaxY += tDeltaY;
                y += stepY;
            else
                tMaxZ += tDeltaZ;
                z += stepZ;
            end
        end
    end
end
```

Figure 16B:
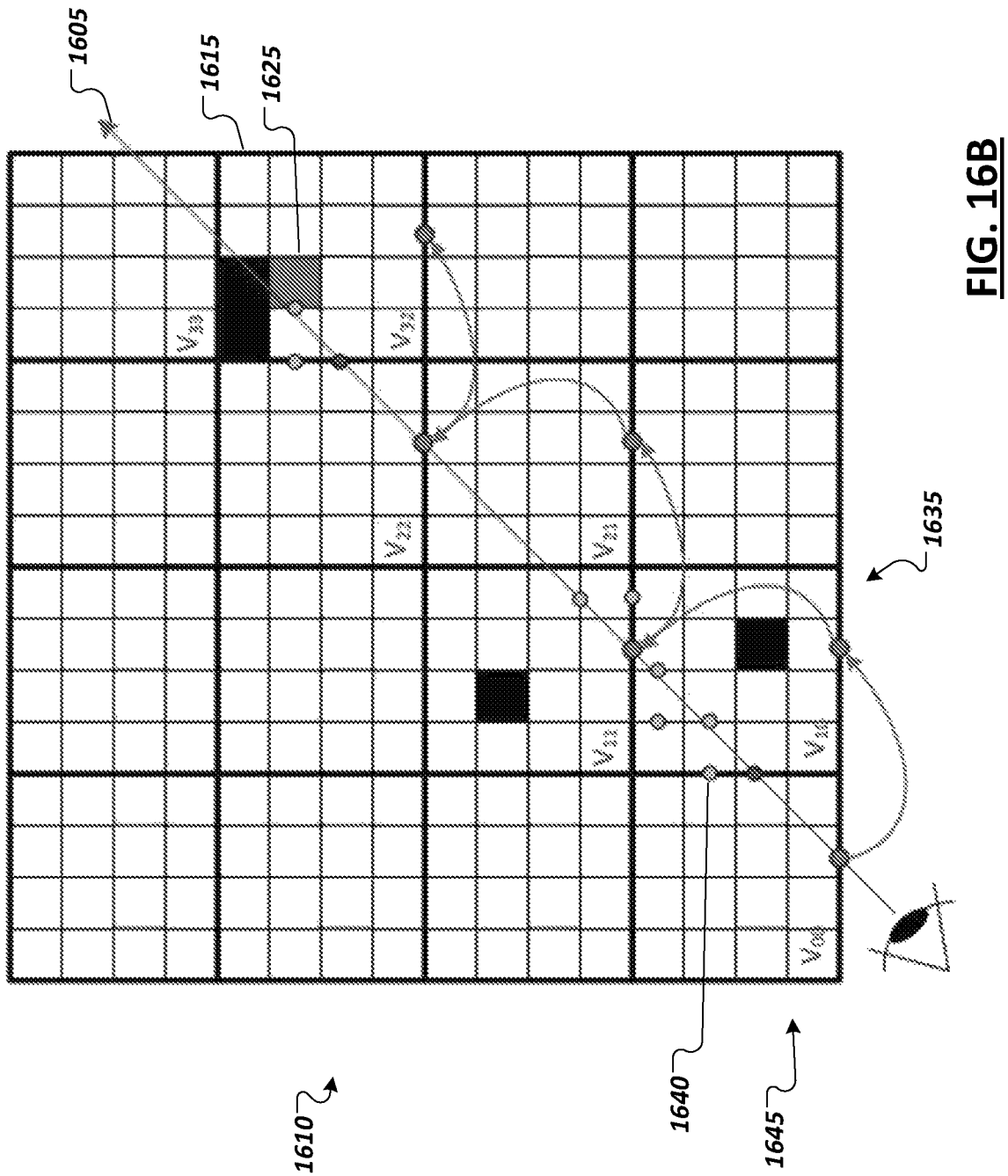

As shown in FIG. 16A, a traditional traversal algorithm is illustrated, whereby a ray 1605 (e.g., one of many to be cast through a volume (e.g., 1610)) is cast through a volume 1610. In FIG. 16A, black squares (e.g., 1615, 1620) represent occupied voxels in the volume 1610, which are not struck by the ray 1605 and gray squares (e.g., 1625) represent the first occupied voxel hit by the ray 1605. In a traditional traversal, as illustrated in FIG. 16A, each and every voxel traversed by the ray 1605 is checked (e.g., each check represented by a respective point (e.g., 1630) by system logic to determine whether the voxel is occupied or not. Traversal can be extended for a hierarchical structure, such as VOLA, effectively exploiting it to skip empty space. In one example, the hierarchical dense grid and the VOLA format share the same organization of data, so the algorithm can be indiscriminately applied to both of them. As for the basic algorithm, 3D coordinates may be used to move in space while changing the level of resolution depending on the encountered voxels: the main difference between the two is how the content of the voxel is tested. For instance, turning to FIG. 16B, when an occupied voxel (e.g., 1635) at a certain level is encountered, the next level in the hierarchy is accessed (e.g., and new initialization operations are performed for the tMax and tDelta variables) dependent on the level and on the boundaries of the specific brick of voxels, and the sub-voxels within the occupied higher-level voxel traversed by the ray 1605 may be individual checked (e.g., represented by points (e.g., 1640)). The boundaries can be determined using modular arithmetic based on the regular volume subdivision. When a higher-level voxel (e.g., 1645) is determined to be empty, checking the traversed constituent sub-voxels may be skipped. For instance, when passing from a level to another, the space skipping is determined by a 3D linear step of the form $r(t)=p+t_{min}d$, where $t_{min}$ is the t value from the upper level. Due to the traversal method, the tracked positions at different levels can be implemented more efficiently than traditional traversal algorithms. For instance, at each hierarchical level, the traversal is performed as in the traditional traversal, but when passing from a level to the next one, the first position is found with a linear step, using the current t parameter, to move from one occupied voxel to the next (skipping over any intermediate voxels (e.g., 1645) in the ray's path that are unoccupied). In either instance, the traversal algorithm continues until the system first encounters an occupied voxel (e.g., 1625) at the highest level of resolution.

Figure 16C:
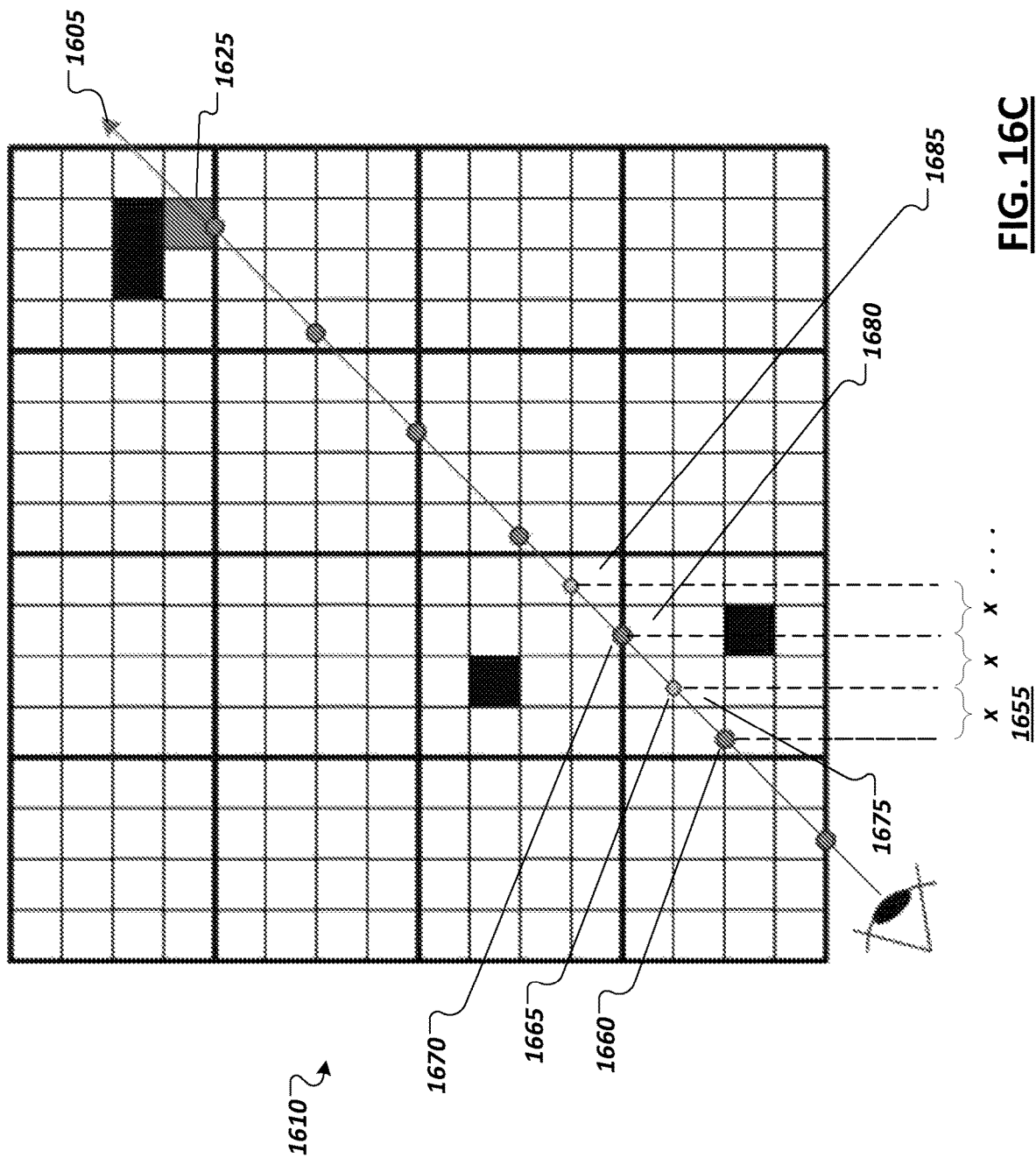

In one example, a hierarchical implementation of a traversal algorithm may be modified to speed up execution in cases in which the accuracy is not the main concern and it can be sacrificed in favor of speed. For instance, as represented in FIG. 16C, in some implementations, the ray traversal algorithm first determine which courser-grained voxel is occupied and first traversed by the ray. The ray traversal algorithm may then focus only on assessing higher-resolution (lower level) voxel representations in the occupied lower-resolution (higher level) voxel. However, as opposed to checking each sub-voxel in the occupied voxel an approximated approach may be utilized where the sub-voxels are checked at an interval (e.g., x) covering more than one voxel (e.g., checking every $2^{nd}$ or $3^{rd}$ voxel traversed by the ray for an occupied volume, rather than checking every traversed voxel). For instance, a fixed-point implementation may be used for the data. After identifying the main component of the ray direction, the ray, at a certain level, is advanced so as to cover a distance equal to the size of a subvoxel in the determined direction's main component (e.g., x-, y-, or z-component). Doing so, the occupied/not occupied decision to make for the new voxel to be traversed is fast. The tradeoff, however, is that the approximated hierarchical traversal algorithm does not visit strictly all the voxels traversed by the ray and this may result in a ray hit on an occupied voxel being missed, potentially creating artifacts in particular conditions, for instance, when the density of voxels is low or when rendering an empty object with a thin surface, among other side effects. As shown in FIG. 16C, the interval 1655 for scanning voxels within an occupied higher-level voxel may be defined to be a voxel in the x-direction. Accordingly, when performing the raycasting checks for the occupied higher-level voxels (e.g., 1660, 1665, 1670) only a portion of the traversed voxels (e.g., 1675, 1680, 1685) are checked. The example pseudocode further illustrates such an embodiment:

```
xyz ← p;
r_i ← integer(round(xyz * 2^PRECISION));
r_d ← scale(d);
level_increment_value[maxlod+1] ← distance init(r_d, maxlod);
while inside volume do
    if outside super-voxel boundaries then
        current_level -;
        continue;
    end
    if current_level < maxlod then
        find bounds(current_level, r_i, upper_bounds[current_level],
            lower_bounds[current level]);
        continue;
    end
    xyz = r_i >> PRECISION;
    voxel_State = Get3DVoxel(xyz, current_level);
    if voxel_state && current_level < maxload then
        current_level++;
        continue;
    else
        return xyz;
    end
    if current_level == maxlod then
        r_i = r_i +level_inc_val[maxlod + 1];
    else
        repeat
            r_i = r_i +level_inc_val[current_level + 1];
        until inside current level boundaries;
    end
end
```

Figures 17A, 17B:
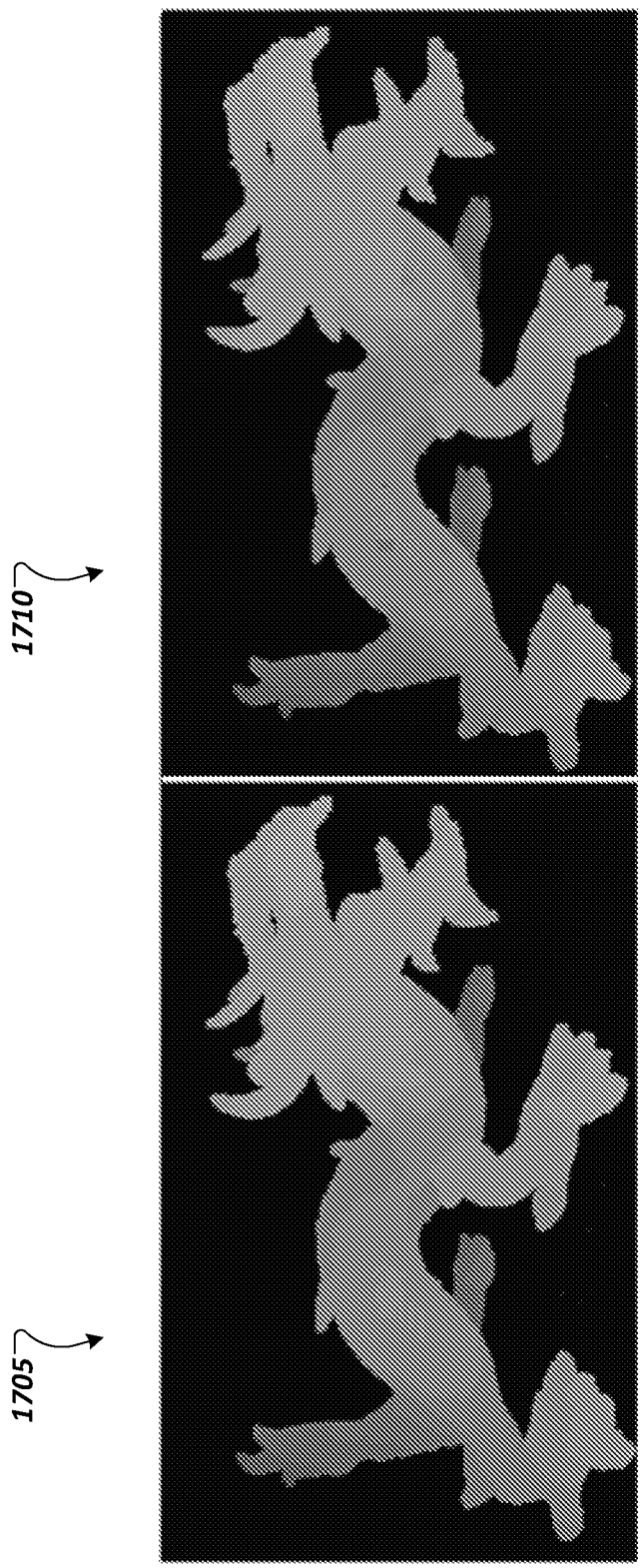
FIGS. 17A-17B illustrate example comparative images rendered using different raycasting techniques.

While the example of FIG. 16C, shows an approximated hierarchical traversal algorithm that checks voxels along a defined sub-voxel interval, other intervals may be selected and utilized in the algorithm, based on the application and resolution sensitivity of the application (e.g., a rendering or SLAM application). Turning to FIG. 17, for instance, to a visual comparison between example results of a standard hierarchical traversal algorithm (e.g., as illustrated in connection with FIG. 16B, where each sub-voxel in an occupied voxel traversed by the ray is checked) and an approximated hierarchical traversal algorithm (e.g., as illustrated in connection with FIG. 16C, where only a portion of the traversed sub-voxels in an occupied higher-level of voxel are checked), the comparative rendering of an example Asian dragon model is shown. In this example, images 1705, 1710 are rendered simply as depth maps from the raw raycasted data for the 3D Asian dragon model. Image 1705 represents results of a standard hierarchical traversal algorithm, while image 1710 represents results of an approximated hierarchical traversal algorithm. While the image 1710 generated from the approximated algorithm misses some voxels on the surface, manifesting as graphical artifacts, the similarity between the two images 1705, 1710 suggests that the computing efficiencies enabled through an approximated hierarchical traversal algorithm may be a more than worthwhile tradeoff in some applications The illustration of FIG. 17 is but one example results from an implementation of an approximate hierarchical traversal can be more generally compared with a traditional algorithm that puts a premium on accuracy in terms of rendered images. For such comparisons, for each camera pose, a grayscale image may be produced using both the hierarchical traversal algorithms. The intensity of each pixel in the images is an integer number that is related to the distance between the virtual camera and the hit voxel. The two images may thus be compared based on the difference between the values of intensity while considering the accurate, uniform algorithm being used as the ground truth. Since the background (ray-misses) does not provide valuable information, for the comparison only the rays that hit a voxel in the accurate raycaster may be considered (which only can cause missed detections, but not false alarms). The percentage of different outcomes may be calculated averaging the frames for hundreds of camera poses in the space and for different scenes. In this example, VOLA models may be used for the test, such as a model generation from an aerial scan of Liffey River (in Dublin, Ireland) and three models from the Stanford 3D Scanning Repository: the Asian dragon, the Lucy angel, and the Thai statuette. Since the use of floating-point operations and conversions may lead to very small pixel intensity differences (as small as a unity) that would non-realistically increase the diff count, a threshold may be implemented, where only pixel intensity differences above one are considered. The example results are shown in Table 1. Note that the percentage of different pixels shown in the table is expressed as a fraction of only the pixels that are actually hit by the accurate raycaster. The high values of the average for those pixels whose intensity is different between the two images confirm that the considered cases are proper missed-detections. The percentage difference depends on the density of voxels in the used model: in general, the higher the pixel density the lower the approximation.

TABLE 1

Percentage of different pixels between accurate and approximated rendered images, as a fraction of the pixels hit in the accurate image. The average intensity difference for the misses is also reported.

| Model | Different Pixels (%) | Average Intensity Difference |
| --- | --- | --- |
| Asian Dragon | 5.51 | 77.62 |
| Lucy Angel | 3.61 | 81.08 |
| Thai Statuette | 3.97 | 63.82 |
| Dublin Liffey | 5.84 | 32.24 |

Figure 18:
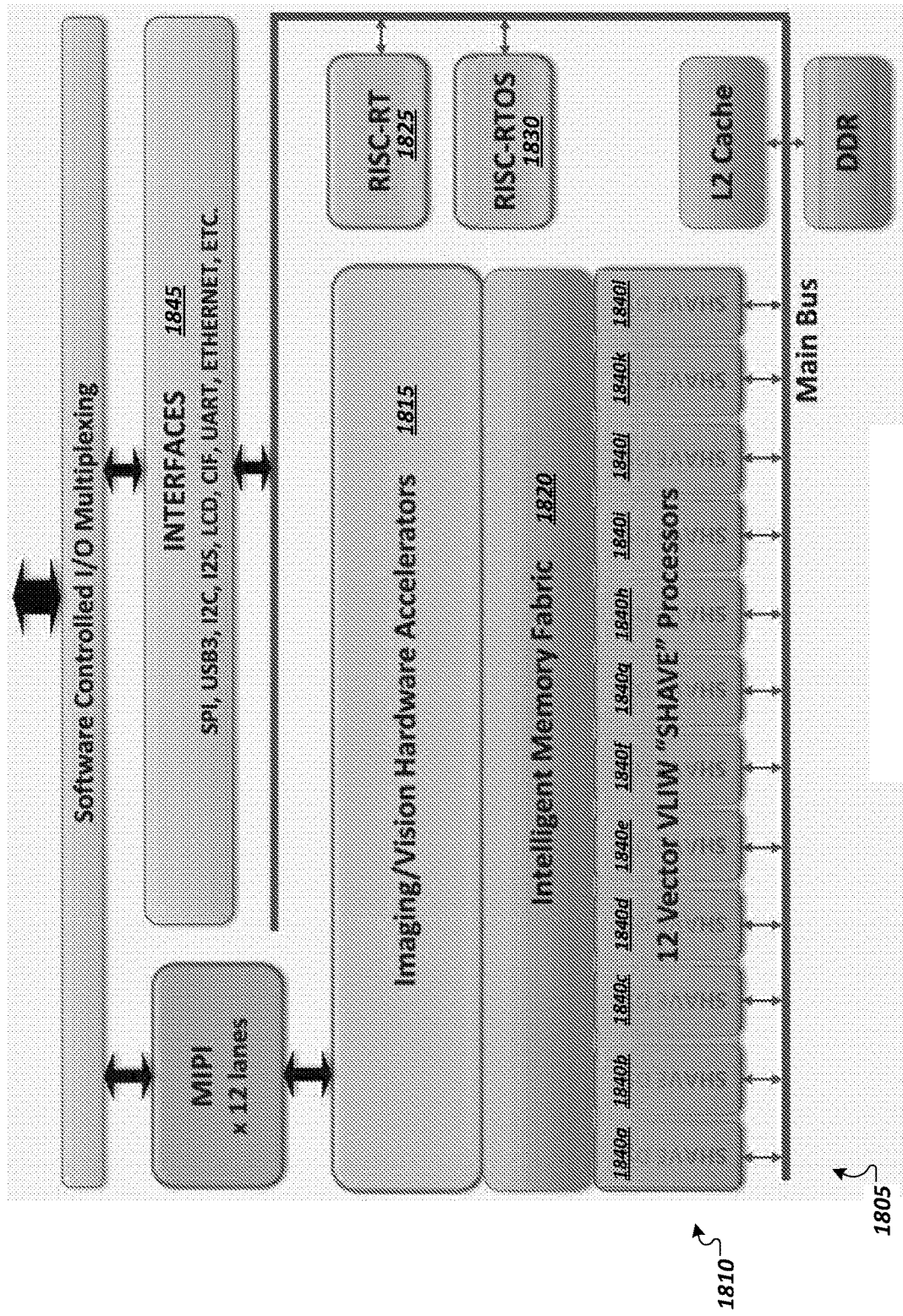
FIG. 18 is a simplified block diagram illustrating an architecture of an example visual processing unit (VPU)

In some implementations, a raycaster may be implemented in hardware, such as a visual processing unit (VPU). Such hardware devices may be specifically implemented to deliver high-performance machine vision and artificial intelligence (AI) computations in severely power-constrained environments. FIG. 18 is a simplified block diagram may be implemented as a multicore always-on System on a Chip (SoC) 1805 that provides highly sustainable performance efficiency for a range of machine learning and vision applications with low latency and low power requirements. The architecture of the example processing device 1805 may use a combination of low power Very Long Instruction Word (VLWI) processors (e.g., 1810) supporting vector and SIMD operations with hardware acceleration (e.g., provided through one or more accelerator devices (e.g., 1815) for image processing and computer vision kernels, backed by a very high bandwidth memory subsystem (e.g., 1820), and one or more RISC processors 1825, 1830 (e.g., Leon 32-bit RISC processors according to a SPARC architecture). The system is divided into three main architectural units: the Media Sub System (MSS), the CPU Sub System (CSS), and the Microprocessor Array (UPA). In this example, the UPA contains the VLWI processors (e.g., twelve custom vector processors (e.g., 1840a-l), in some instances, implemented as SHAVE (Streaming Hybrid Architecture Vector Engine) processors.

To easily access the SoC from the PC a machine learning accelerator (e.g., the Movidius™ Neural Compute Stick™ (NCS)) may be used to program the vector processor using an USB3 connection. A software application (e.g., run on a general purpose CPU or dedicated hardware or firmware of the computing system) manages the creation of the hierarchical grid structure starting from a set of .vol (VOLA format) files and it then sends the content through USB (or other interface (e.g., 1845) to the vector processor unit. In addition, it handles the visualization of the rendered frames coming from the accelerator (e.g., using SDL2 (Simple DirectMedia Layer) library). In some implementations, the actual raycasting algorithm may be executed by the set of specialized vector processors (e.g., 1840a-l), each one of which handles a small rectangular tile area of the virtual image. To fairly leverage the computational load the vector processors (e.g., 1840a-l) may be scheduled asynchronously and dynamically, so as to reduce the overall idle time. The data regarding the virtual camera position and direction is passed to the threads via a shared structure that is dynamically updated by the system, among other example system implementations and programs.

Figure 19:
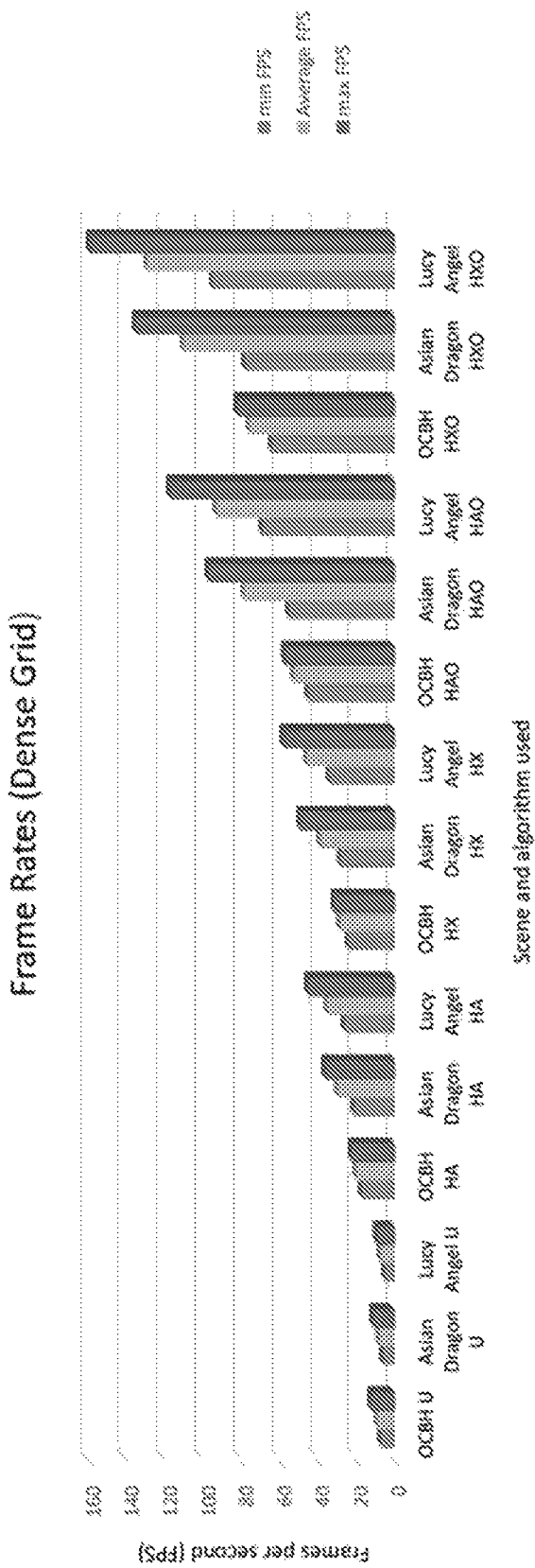
FIG. 19 is an example graph showing a comparison of example results of raycasting techniques.

In one example test, uniform grid and the hierarchical grid algorithms, in both the accurate (standard) and approximate versions, were tested and compared in terms of performance. To exploit the vector operations available in a particular architecture utilized to execute the raycasting application (e.g., an architecture utilizing a SHAVE Instruction Set Architecture (ISA)) the hierarchical implementations may be restructured taking advantage of the built-in functions (intrinsics) available in the compiler of the system and tested separately. In one example, tests using an aerial scan of O'Connell Bridge House (OCBH) building in Dublin and two models from the Stanford 3D Scanning Repository are used. The results obtained of such an example test are shown in FIG. 19, where average, min and max frame rate measured values are shown. The shown measurements are taken in the same conditions for all the tests, performing a circular movement of the virtual camera while looking at a fixed point at the center of the volume. As represented in the graph 1900 of FIG. 19, the approximate implementation performs consistently better than the accurate one, with a frame rate from 30% to 75% higher. Through the use of intrinsics a maximum speedup factor of 12.78 and 17.74 was reached for the Accurate and Approximate SIMD raycaster versions respectively.

Figure 20A:
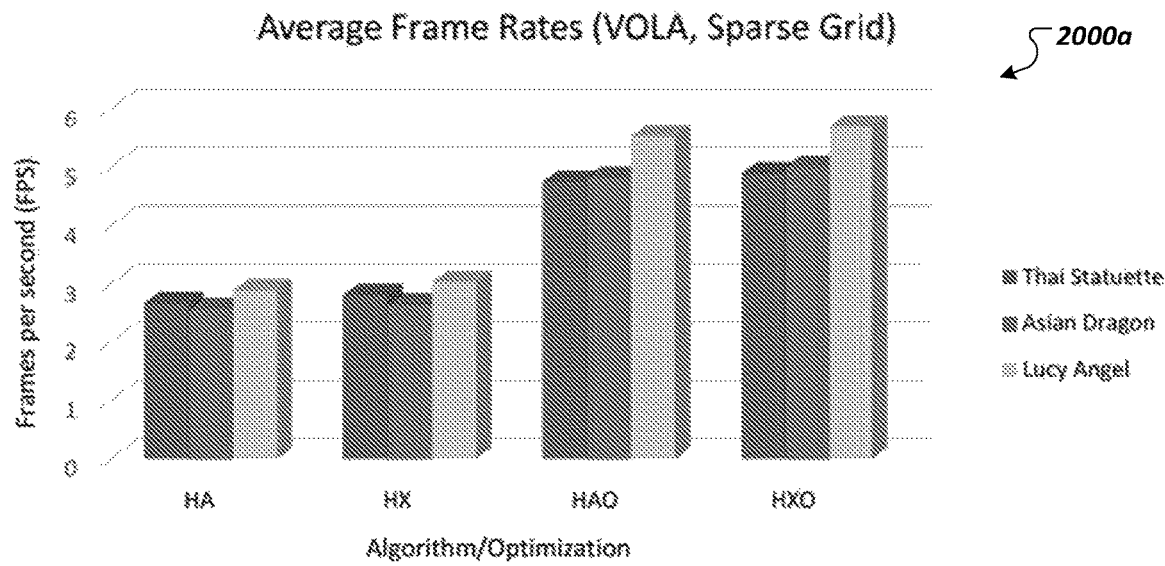
FIGS. 20A-20B are example graphs showing comparisons of example performance characteristics of different raycasting techniques.
Figure 20B:
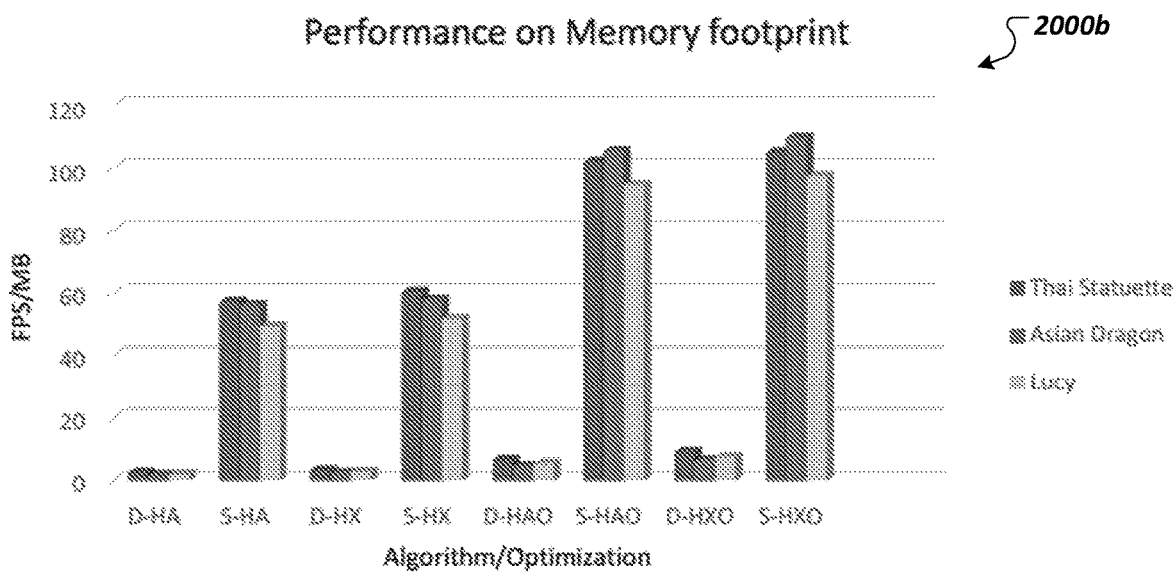

Utilizing a sparse hierarchical grid structure (e.g., VOLA) in a raycasting application may realize additional benefits, for instance, in terms of performance and memory occupation of the data structure. For instance, dense and the sparse hierarchical grids, from a topological point of view, may share effectively the same organization in the space, but in the case of the sparse grid only the occupied data is actually stored. This results in a very small memory footprint (table) but at the same time increases the time needed to locate a particular voxel in the hierarchical grid, as all the previous levels have to be inspected, in order to identify and count the set bits in sparse grid table. For instance, Table 2 reports a comparison between the memory occupation of different formats for the same models. The dense grid and the VOLA formats shown in the table are obtained directly from example Polygon File Format (PLY) objects. It can be seen that the VOLA structure guarantees a huge size reduction, that is here up to a maximum of about 11140 times lower with respect to PLY format. The dense grid occupancy may be considered perfectly deterministic in the sense that it only depends on the depth of the hierarchical grid; on the contrary the VOLA structure occupation depends on the actual occupied voxels in the space. As shown in the graph 2000a of FIG. 20A, the average frame rates for three different VOLA models and the same algorithms and optimizations used for the dense grid are shown. It is possible to notice that there is no actual gain in using the approximated implementation anymore; likewise, the benefit of introducing the SHAVE intrinsics optimization is very low. This can be explained from the fact that the utilized techniques aim to optimize the algorithm grid traversal performance, but now the bottleneck mainly consists in the high time needed to test voxels occupancy in the VOLA structure. As a consequence, the fraction of time spent in the actual traversal is here much lower than for the dense grid. The performance of the VOLA implementation are from about 11 to about 30 times lower than their dense grid counterparts. Nevertheless, relating the performance obtained with the memory footprint (Average-FPS/MB), it may be concluded that the VOLA implementation is much more efficient and therefore it can constitute a valid option in highly memory constrained environments as illustrated, for instance, in the example table 2000b of FIG. 20B.

TABLE 2

Memory footprint comparison of different data formats occupation for the same 3 D models.

| Model | PLY | Dense Grid | VOLA |
| --- | --- | --- | --- |
| Asian Dragon | 133 MB | 17.04 MB | 46.6 KB |
| Lucy Angel | 508 MB | 17.04 MB | 45.6 KB |
| Thai Statuette | 220 MB | 17.04 MB | 58.4 KB |

In some implementations, an embedded implementation of a raycasting algorithm may be implemented utilize a sparse hierarchical data structure to implement the raycasting. Further, approximated ray traversal algorithms may be employed to realize processing performance benefits. Further, performance and memory usage may be traded off for the dense and sparse (VOLA) approaches, showing a consistent advantage in the FPS/MB efficiency for the VOLA structure, at the cost of a decrease of performance. Thus, systems utilizing a sparse hierarchical grid structure to represent a 3D volume in raycasting applications may be considered preferable particularly in highly memory constrained environment. Indeed, the improved system implementations discussed herein show a very high-power efficiency, up to two orders of magnitude higher than traditional raycasting implementations, among other example advantages.

A computer vision system may utilize raycasting and rendering results in connection with autonomously determining position and orientation of an autonomous device, such as a robot, autonomous drone or vehicle, among other examples. Indeed, accurate position and orientation estimations are essential for navigation in autonomous robots. Although it is a well-studied problem, existing solutions rely on statistical filters, which usually require good parameter initialization or calibration and are computationally expensive. As discussed herein, an improved system may implement an improved, end-to-end machine learning approach, including the incorporation of multiple sources of data (e.g., monocular RGB images and inertial data) to overcome the weaknesses of each source independently. In some implementations, improved systems utilizing such functionality may realize odometry results that are computationally less expensive and at or only slightly below the state-of-the-art in accuracy, thereby allowing such systems to realize a valuable potential solution for resource constrained devices, among other example uses and advantages.

Motion estimation is one of the main pillars of mobile robotics. It provides a robot with the capability to know its position and orientation in an unknown environment and it can be combined with mapping approaches to develop Simultaneous Localization and Mapping (SLAM). Indeed, the SLAM pipeline utilized may adopt the improved raycasting techniques discussed herein within such implementations. A robot can use different sources of data to perform such motion estimation depending on the type of sensor: proprioceptive, when it offers the robot's internal information such as Inertial Measurement Units (IMU), or exteroceptive, when it offers information of the robot's surroundings such as cameras or LiDAR sensors. Due to the autonomous nature of a robot, it should be able to perform such motion estimation on board in real time—a particular challenge when the device is resource-limited. Thus, finding a solution that can run in an embedded device under such restrictions is desirable.

Deep learning may be utilized to solve a pose estimation problem in odometry applications. For instance, cameras capture the surroundings of a robot or other autonomous device and can be used to track the robot's movement through Visual Odometry (VO). Classic VO approaches estimate motion from geometry constraints and can be divided into two groups: sparse feature-based methods and direct methods. On one hand, sparse feature-based methods extract and match feature points to estimate the motion between frame. In addition, some VO approaches, add and maintain a feature map in order to correct the drift suffered due to the presence of outliers and noisy images. On the other hand, direct and semi-direct methods use all the image pixels to estimate the pose by minimizing the photometric error between consecutive images.

However, classical VO approaches typically need external information (such as camera height or templates) to perceive the scale and recover distances in real world units. Further, traditional VO systems have proven unreliable in the presence of rapid movements or when there are sudden changes in illumination. To solve this lack of reliability, the camera information can be combined with inertial sensors, which can provide acceleration and angular rate information. These sensors usually offer data at much higher frequencies (e.g., about 10 times faster) than a camera. Therefore, inertial information can be used to overcome VO systems' weaknesses in the case of rapid camera motion, among other example enhancements and issues.

Visual-Inertial Odometry (VIO) systems take advantage of visual and inertial information to provide position and orientation estimations. In some implementations, the visual-inertial data fusion is done by using probabilistic filter approaches such as Extended Kalman Filter (EKF) or Unscented Kalman Filter (UKF). The visual-inertial data fusion is performed with an EKF based system, which they used to compare different fusion models using only gyroscope data, or gyroscope and accelerometer data. Other variations of the EKF may be implemented, such as the Multi-state Constraint Kalman Filter (MSCKF), such as systems where several past camera poses are used to detect static features and add a constraint to the state vector, among other examples.

In some implementations, a system equipped with deep learning functionality may be used to overcome the weaknesses of classic VO approaches, such as lack of robustness to blurred or noisy images or when changes in illumination or occlusion occurs. For instance, Convolutional Neural Networks (CNN) may perform well even with blurred and noisy images, providing a robust method for extracting image features. CNNs may also be used to compute the Optical Flow between two consecutive images. The Optical Flow represents the change in location of the objects on the camera view, therefore it is related to the motion that the camera has experienced between two consecutive frames. In one example, the image features extracted by the Optical Flow network may be used in a deep learning system along with two Long Short Term Memory (LSTM) layers to implement a monocular VO system in an end-to-end deep learning manner, which may outperform a classic monocular VO approach (e.g., VO based on LIBVISO2), among other examples.

VIO approaches based on probabilistic filters for sensor fusion may require a hard and complex calibration process in order to bring camera and inertial measurement unit (IMU) measurements to the same reference coordinate system. For instance, the calibration process may be performed in real time while a tracking system is running, adding complexity to the filtering process. Moreover, some IMU's parameters are difficult to model, such as the noise scaling over the measurements found in most commercial IMUs. Deep Learning techniques may be further utilized to solve the issues with the sensor fusion process. For instance, an LSTM may be used to track past IMU raw measurements (accelerometer and gyroscope) to estimate the pose of a robot, which may then be fused with a VO system. LSTMs may be used in VINet to extract encoded features from IMU's raw measurements. These encoded features may be combined in a feature vector with features extracted from a CNN, being this feature vector tracked over time by a second LSTM, which may provide a pose estimation of a robot. In some implementations, VINet approaches may outperforms traditional approaches, such as traditional optimization-based sensor fusion approach, among other example benefits.

In one example, an improved system may implement an end-to-end trainable neural network architecture, which incorporates both visual and inertial deep learning sub-models. For instance, in a visual-based CNN sub-model, RGB images may be provided as an input. In a second, inertial-based deep learning sub-model, IMU raw measurements are provided as an input. In one example, the end-to-end neural network architecture may make used of a combination of the neural network sub-models, the combined network (and its subcomponents) being trainable in an end-to-end manner, eliminating any need of calibration or preprocessing.

In some implementations, a neural network of an end-to-end machine learning odometry system may be trained to produce at every frame a pose estimation relative to the previous frame. Each pose estimation represents a transformation, which is usually represented as elements of the Special Euclidean Group of transformations SE(3). All the transformations represented in SE(3) (Equation 1) may be composed of a rotation matrix and a translation vector, being that rotation matrix part of the Special Orthogonal group SO(3).

$$SE(3):(R|T), R \in SO(3), T \in \mathbb{R}^3 \qquad \text{Equation 1:}$$

Finding a transformation in the SE(3) is not straightforward for the network because R has to be orthogonally constrained. Thus, to make easier the learning process, the estimated transformations are represented in the Lie Algebra se(3) (Equation 2) of SE(3).

Equation 2:

$$se(3):(\omega|t), \omega \in so(3), t \in \mathbb{R}^3 \qquad (2)$$

The pose estimations in se(3) may be 6-D vectors and may not be orthogonally constrained. Once estimated, the poses in se(3) can be converted into transformations of the SE(3) by doing an exponential mapping: se(3)→SE(3) (Equation 10):

$$\theta = \sqrt{\omega^T \omega} \qquad \text{Equation 3}$$

$$A = \frac{\sin \theta}{\theta} \qquad \text{Equation 4}$$

$$B = \frac{1 - \cos \theta}{\theta^2} \qquad \text{Equation 5}$$

$$C = \frac{1 - A}{\theta^2} \qquad \text{Equation 6}$$

$$\omega_x = \begin{pmatrix} 0 & -\omega_3 & \omega_2 \\ \omega_3 & 0 & -\omega_1 \\ -\omega_2 & \omega_1 & 0 \end{pmatrix} \qquad \text{Equation 7}$$

$$R = I + A\omega_x + B\omega_x^2 \qquad \text{Equation 8}$$

$$V = I + B\omega_x + C\omega_x^2 \qquad \text{Equation 9}$$

$$se(3) \to SE(3) : \exp(\omega \mid t) = (R \mid Vt) \qquad \text{Equation 10}$$

where matrices R and V can be calculated using Equations 8 and 9, respectively. A, B, C and θ can be obtained through Equations 4, 5, 6 and 3. $\omega_x$ matrix is composed by ω values (Equation 7).

Figure 21A:
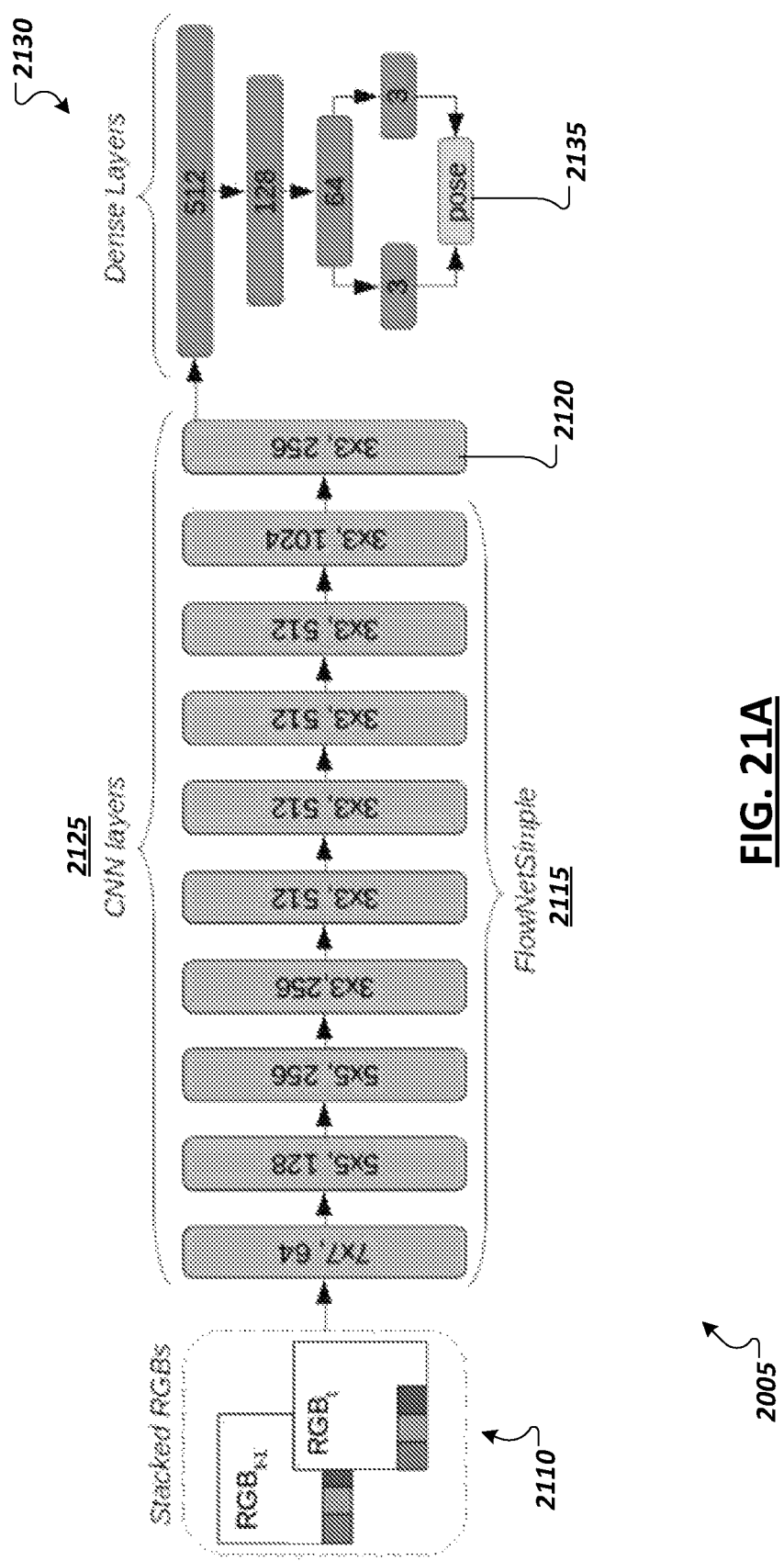
FIGS. 21A-21C are simplified block diagrams illustrating example neural network models.

In one example, a visual-based neural network model 2105 may be utilized, such as represented in simplified block diagram of FIG. 21A. It takes as input 2110 two consecutive RGB images, which are stacked composing an input tensor of size 512×384 with 6 channels. This image size may contain enough features while resulting in a light CNN. In one example, layers 2115 of a computer vision neural network, such as FlowNetS, may be used to extract images' features, which may be advantageously used for motion estimation, among other example uses. Such a network (e.g., 2115), adopted as a portion of neural network model 2105) may be trained on a synthetic dataset to learn how to estimate the Optical Flow between frames, which represents the motion undergone by the robot over time, among other examples.

In the example of FIG. 21A, FlowNetS layers 2115 may be taken up to the network's 2105 ninth convolutional layer, followed by an additional convolutional layer 2120 to reduce the output size of the CNN to a 2×3×256 tensor. After the CNN layer 2125, a series of Fully Connected layers 2130 may be utilized to combine the extracted features to produce an output 6-D vector pose 2135 that represents the transformation of the current frame (t) relative to the previous frame (t−1), expressed in the Lie Algebra of SE(3).

Figure 21B:
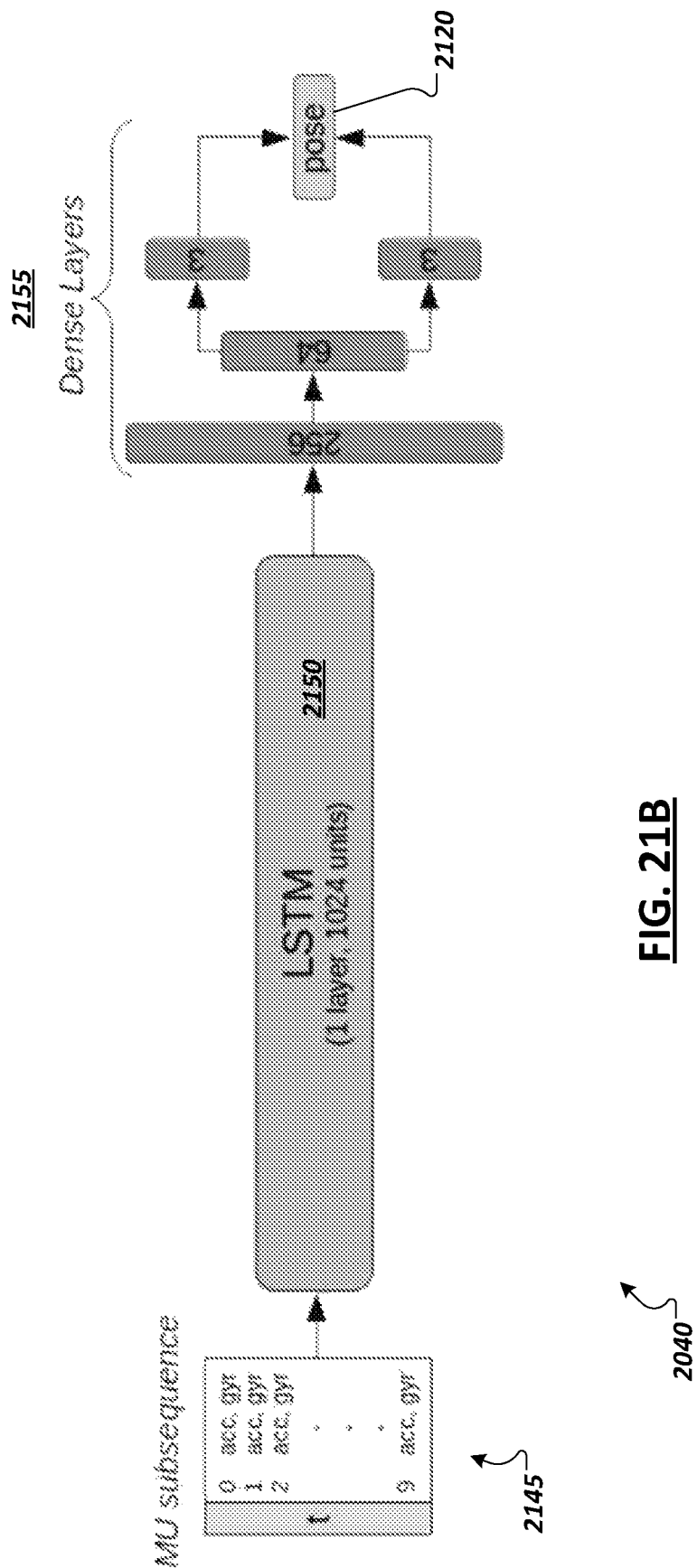

In another example network 2140, shown in FIG. 21B, only inertial data is used as input 2142 to the network 2140. In one example, the input 2145 may be IMU data embodied as a subsequence composed by ten 6-D vectors with the x-y-z raw data components from accelerometer and gyroscope components of a device. In this example, the input subsequence of (ten) measurements may be ordered in time, being the last one the most up to date, encoding the motion that the sensor has experienced over time.

Continuing with the example of FIG. 21B, a long short-term memory (LSTM) artificial recurrent neural network portion 2150 may be utilized as regression layers in the model 2140 to track measurements over the subsequence and extract motion information as it is able to store in its hidden states short and long term dependencies produced by past inputs. Each input is combined with the hidden state as it passes through the LSTM 2150, finding temporal correspondences between the current and past measurements. The LSTM 2150, in one example, may have 1 layer, 1024 units, and may be followed by four Fully Connected layers 2155 that output a 6-D vector representing the transformation undergone (e.g., by the robot) from the last to the first element of the subsequence. These architecture and parameters may be selected as a result of their performance in a Monte Carlo analysis, which may be used to explore and optimize the selection of different combination of layers, among other example implementations.

As introduced above, an improved machine learning system may utilize a neural network model 2160 to perform an odometry calculation, the improved neural network model combining the example network portions 2105, 2140 illustrated in FIGS. 21A-21B to take advantage of both visual and inertial sensors, which may be present on a robot or other autonomous device. Accordingly, the input to the model 2160 may include both visual and inertial data, such as a pair of consecutive RGB images and a subsequence of ten inertial measurements. In this example, the virtual neural network portion 2105 is the same as that presented in the example of FIG. 21A up to its third fully connected layer. Similarly, the Inertial Odometry (IO) network portion 2140 is used up to its second fully connected layer. In this manner, the neural network model 2160 maintains both VO and IO networks until the last layer that provides useful features. Then, vision and inertial feature vectors are concatenated into a 128-D vector and passed through three fully connected layers 2165 to output a pose estimation 2170. As before, each pose estimation represents the transformation undergone by the robot at the current frame with respect to the previous one.

In one example implementation, the data used for training of example neural network model 2160 may be part of a compiled data set (e.g., the raw data section of KITTI Vision Benchmark Suite). In one example, the odometry dataset is composed by 22 sequences, being the first 11 of these provided with its ground truth transformations. In this example, sequences 11-22 are intended to be used as evaluation, so no ground truth is provided. Sequences 00, 02, 08 and 09, which contain the highest number of frames, are used for training and sequences 05, 07 and 10 for evaluation. The training data, in some implementations, may be augmented by randomly applying gaussian noise, gaussian blur and changes in intensity to the images, such as by applying gaussian noise (e.g., mean=0, standard deviation=[0,32]) and change in pixels intensity (e.g., [−25%,25%]) to ⅔ of the data, and gaussian blur with kernels 3, 5 and 7 to the remaining third of the data. After augmenting the data, the training dataset (e.g., a total of 22912 image frames) may be sampled (e.g., at 10 Hz) as well as the ground truth. The IMU data may arrives at a higher frequency (e.g., 100 Hz), meaning that there may be multiple IMU measurements per image frame. However, there also may be frames where some IMU data are missing. In that case, the first IMU measurement of the frame is used to pad the missing measurements to fill the subsequence.

In one example, the loss function (Equation 11) used represents the Euclidean distance between every estimated relative pose and its respective ground truth, expressed in se(3):

$$L_{se(3)} = \Sigma \|\omega - \hat{\omega}\| + \beta \|t - \hat{t}\| \qquad \text{Equation 11}$$

$\omega$, $\hat{\omega}$t, and $\hat{t}$ represent the estimated and ground truth rotation and translation in se(3), respectively. The parameter β is useful to balance the different magnitude order between ω and t, and it may be fixed to 0.1 in all trainings. Nesterov Accelerated Gradient (NAG) may be used as an optimizer (Equations 12 and 13) to speed up the convergence with respect to the standard Gradient Descent, measuring the gradient of the loss function not at the local position but slightly ahead in the direction of the momentum, m.

$$m = \beta m + \lambda \nabla (w^{se(3)} + \beta m) \qquad \text{Equation 12}$$

$$w^{se(3)} = w^{se(3)} - m \qquad \text{Equation 13}$$

where β acts as a friction factor, preventing the momentum from growing too large and λ is the learning rate. The weights $w^{se(3)}$ are then updated according to m. For training, a friction factor β=0:9 was used. In some cases, implementing an exponential schedule (Equation 14) leads to a faster convergence and it may be easier to implement in comparison with other methods such as the performance schedule.

$$\lambda(t)=\lambda_0 2^{-t/r}$$ Equation 14

In one example, an initial learning rate ($\lambda_0$) of 10-5 and a step (r) of 50 are used. With these parameters, the learning rate is divided by 2 every 50 iterations. In one example comparison, all the networks have been implemented on TensorFlow and trained using a NVIDIA GeForce GTX Titan X GPU. In order to reduce the training time, FlowNetS weights may be frozen during training.

The networks discussed herein may be evaluated and their performance compared. In this example, the VO and VIO are compared separately with existing approaches that use the same type of data. For instance, an improved VO network (e.g., as discussed herein in connection with the example of FIG. 21A) may be evaluated and compared with traditional solutions. In one example, the comparison may be performed using metrics proposed in KITTI's odometry development kit and the networks executed on sequences 05, 07 and 10, getting the absolute pose for every frame with respect to the first one. Then, the Root Mean Squared Error (RMSE) may be calculated for different trajectory lengths (100 m, 200 m, 300 m, . . . 800 m) over the sequence. These results are shown in Table 3 along with traditional VISO2 M and DeepVO networks. As illustrated in the example of Table 3, an improved VO network, such as discussed herein, may outperform traditional networks (e.g., VISO2M) in terms of both translation and rotation errors for Sequences 05 and 10, and perform comparatively in translation for Sequence 07.

TABLE 3

All the errors represent the average RMSE for all the possible sequence lengths. $t_{rel}$ is translation error and $r_{rel}$ is rotation error.

| | $t_{rel}$ (%) | | | $r_{rel}$ (deg/m) | | |
|---|---|---|---|---|---|---|
| Seq | Proposed VO | VISO2_M | Deep VO | Proposed VO | VISO2_M | Deep VO |
| 05 | 14.03 | 19.22 | 2.62 | 0.10 | 0.17 | 0.03 |
| 07 | 28.6 | 23.61 | 3.91 | 0.21 | 0.29 | 0.04 |
| 10 | 11.83 | 41.56 | 8.11 | 0.08 | 0.32 | 0.08 |

Figure 21C:
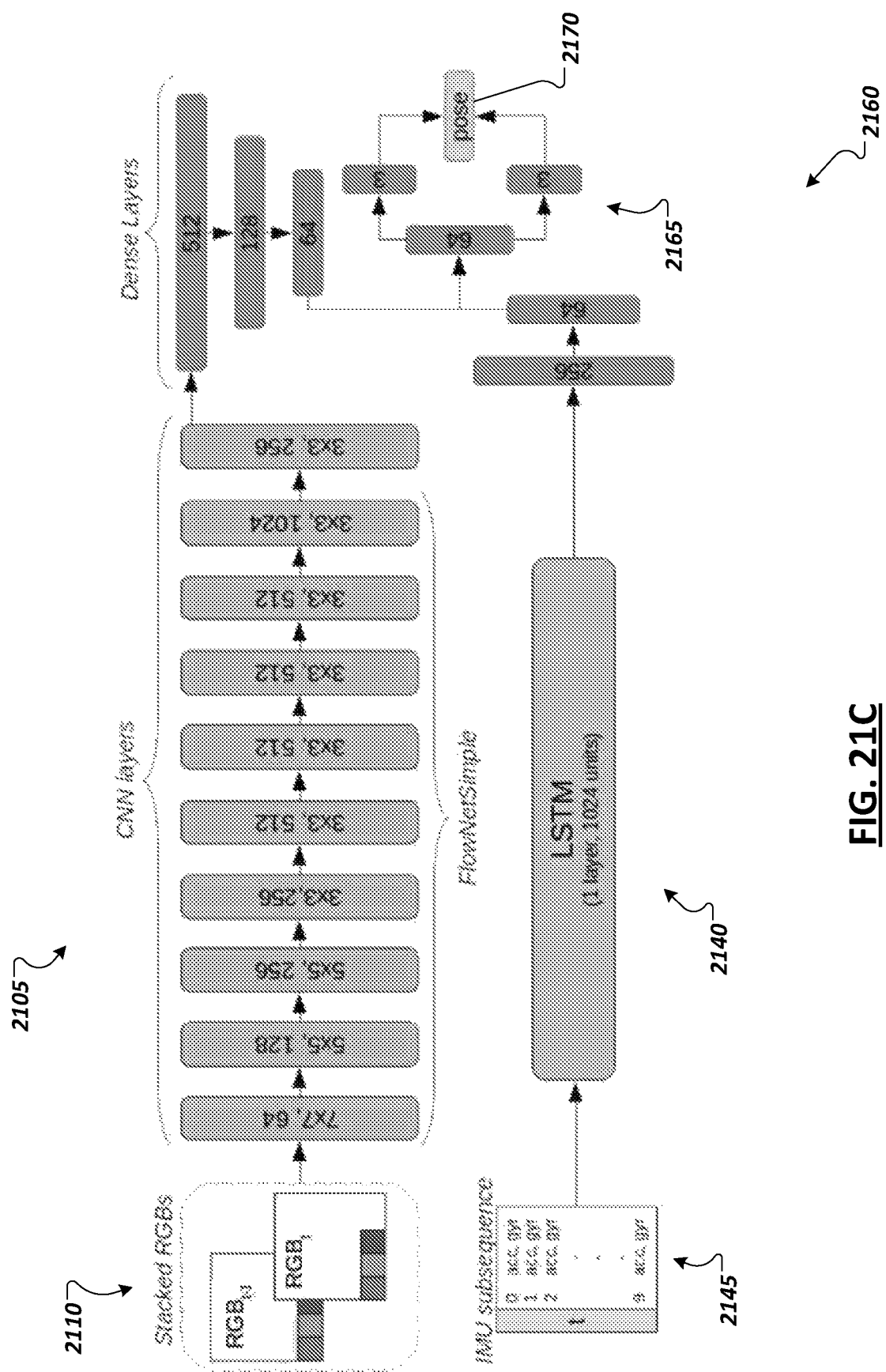
Figure 22:
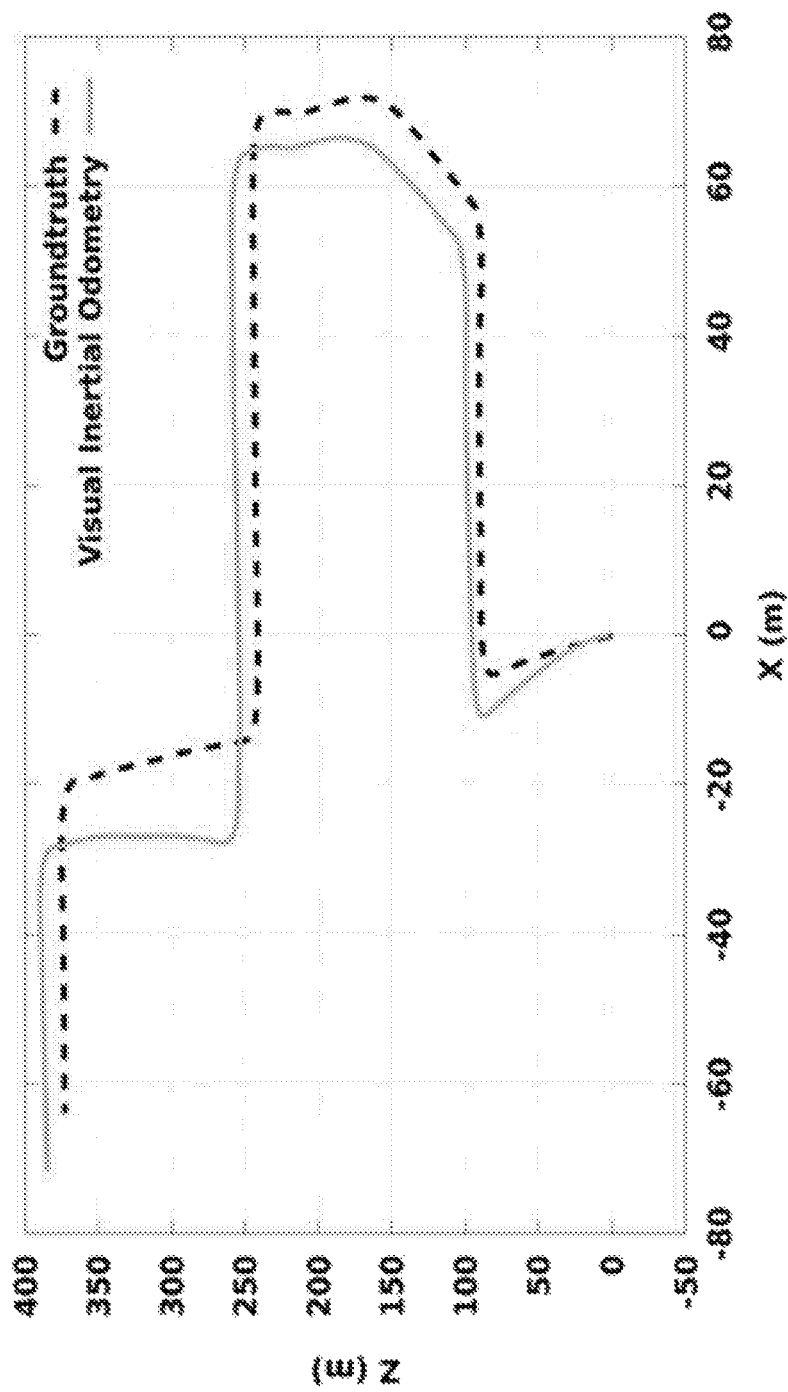
FIG. 22 is a graph showing example performance of a visual inertial odometry technique.

Turning to FIG. 22 example results of an embodiment of the improved VIO network discussed herein (e.g., in connection with FIG. 21C) are illustrated and compared with results of traditional solutions. For instance, FIG. 22 shows the estimated trajectory realized using an improved VIO network against the ground truth (with the corresponding example end point translation and rotation errors shown in Table 4).

TABLE 4

Final point position and orientation error for an improved VIO network model as compared with traditional solutions. The translation error is shown both in terms of absolute error of the final point and of percentage of that error with respect of the total distance covered in frames 0-800.

| | Improved VO technique | Conventional VO technique |
|---|---|---|
| Translation (m)/(%) | 37.20/6.68 | 6.44/1.15 |
| Rotation (deg) | 15.64 | 1.05 |

While implementations of an Inertial Odometry (10)-only network may show a large drift error over time, when it is combined with a Visual Odometry network (to form a Visual Inertial Odometry network, such as discussed in the examples above), the drift may be considerably reduced. Moreover, the Visual Inertial Odometry (VIO) network may show a better performance when the robot is turning, outperforming the Visual Odometry network. This demonstrates how the IMU compensates the large displacement of the objects in the camera. An improved Visual Inertial Odometry network may outperform traditional solutions. Such networks may be utilized in a variety of applications from robots to autonomous drones, among other examples.

In addition to the example features above, an improved computer vision system may additional utilize Convolutional Neural Networks (CNNs) to estimate the relative pose between a pair of point clouds using a sparse hierarchical voxel grid representation (e.g., VOLA). AS discussed herein, a voxel grid is a more memory efficient solution compared with the point cloud, therefore it can be used on embedded systems (e.g., autonomous devices) where the memory and computing resources may be limited. A novel loss function using the transformation error may further be used along with 2D convolutions over a 3D voxel grid. Indeed, such solutions may deliver such efficiencies while maintaining accuracy comparable to traditional, state-of-the-art implementations of Iterative Closest Point (ICP). Indeed, an improved, voxel-grid-based solutions may realize improvements over ICP as the use of voxel grids limits the contribution of high-density areas to the alignment error, among other example uses and advantages.

In recent years, 3D scanning technology has become more accessible to everyone as a result of a large range of sensors able to scan 3D data in a higher quantity and quality. These 3D sensors produce a Point Cloud, which is a set of unorganized three-dimensional points in an unified coordinate system that describes the spatial information used to represent 3D data. However, available 3D sensors like LiDAR, sonar, and RGB-D have a limited range of scan. In order to overcome this limited range, multiple scans are acquired and merged to create a 3D map. The fusion of multiple scans requires each scan to be expressed in the same coordinate system, so their information is presented in an organized way. Therefore, in order to express all the scans in the same coordinate system it is crucial to know the location where the scan was performed. This location can be expressed as a displacement between a reference frame and the current scan. This displacement, known as camera pose, can be represented as a transformation ΔT formed by a translation t and a rotation R, so ΔT=(R|t). The displacement of the sensor can be extracted by using the 3D information available in the scan or with the support of other type of sensors, such as GPS, IMU, or wheel odometry on ground vehicles. In some instances, odometry solutions, such as discussed herein, may be applied to assist in determining such placement. Once the location of the camera is known, the scans can be represented on the same coordinate system allowing the creation of a 3D map that contains the information from all the scans together. The problem of finding the location of the camera is known as relative pose estimation, which is historically difficult to implement on resource constrained devices.

In one example, a computing system may be configured to solve the relative pose estimation problem by implementing and using Deep Neural Networks (DNNs). The size of the point cloud can vary between scans due to noise and limitations on the sensor. However, a voxel grid representation of the point cloud is fixed from the design stage. As 3D convolutions are computationally expensive, an improved solution may instead use an alternate 2D representation of the 3D voxel grid allowing to use a computationally efficient 2D Convolutional Neural Network (CNN). In some implementations, the 2D Convolutional Neural Network may be used to find the transformation between a pair of voxel grids. A loss function may be determined based on the error obtained transforming a point cloud using the ground truth and the network prediction. The performance of such an implementation may be using a RGB-D SLAM dataset to compare its results with a state-of-the-art Iterative Closest Point (ICP) approach. Further, the relative pose estimation between scans of a sensor producing two Point Clouds may be utilized to find the transformation that produces the best alignment between the produced point clouds. Accordingly, such relative pose estimation solutions discussed herein may alternatively be referred to as "Point Cloud Alignment" solutions.

Figure 23A:
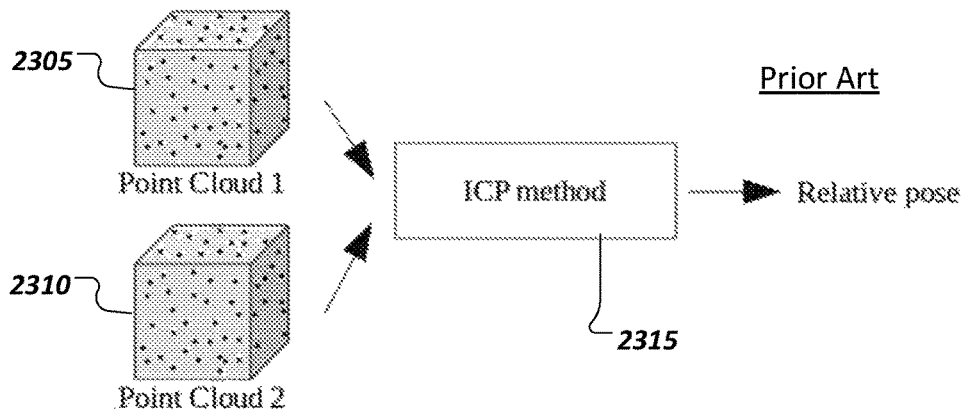
FIG. 23A is a simplified block diagram of a traditional relative pose estimation technique.
Figure 23B:
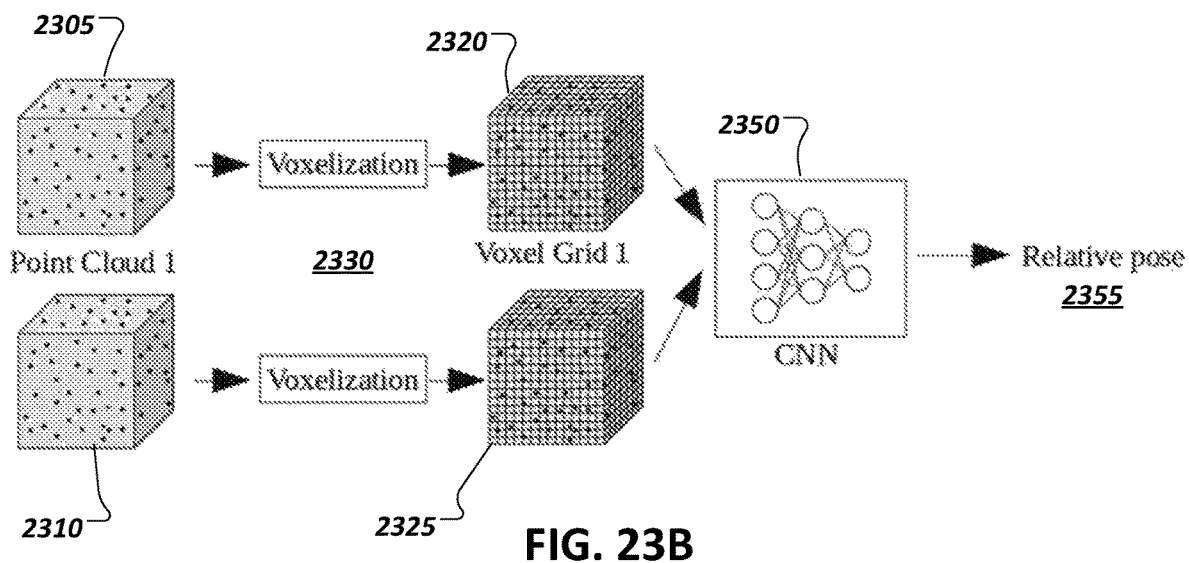
FIG. 23B is a simplified block diagram of an improved relative pose estimation technique utilizing a neural network model.

Turning to FIGS. 23A-23B, at present, the most frequent methods for aligning 3D point clouds are based on variations of Iterative Closest Point (ICP) 2315, which, in an iterative manner, estimates the transformation that minimizes the distances between the correspondent points in two different point clouds 2305, 2310, as represented in FIG. 23A. This iterative procedure might be computationally expensive, and additionally, it is sensitive to the initial alignment and overlap between the processing point clouds 2305, 2310 and their size. Depending on the way of calculating and minimizing the alignment difference between both point clouds, multiple ICP based methods can be found, where, instead of points, this distance can be done between planes or curves. In order to make the 3D alignment more efficient, ICP solutions may be extended to use features to extract key-points from descriptors of the 3D point clouds. Factors like rotation and translation invariance or noise robustness are important on these key-points, where works using Histogram based descriptors, 3DSIFT, SHOT, and NARF are examples.

In cases where RGB-D images are available, the RGB images can be used to improve the estimation of the camera displacement. This may be utilized to implement approaches for monocular or binocular or multi camera pose estimation. In some implementations of an improved system, RGB images are used as inputs to a Convolutional Neural Network (CNN), which uses a set of convolutional layers to extract that complex features within image data followed by a set of fully connected layers to regress the pose. Additionally, in some implementations, Long Short-Term Memory (LSTM) layers may be added on this topology to form a Recurrent Neural Network (RNN), handling time dependencies among images taken in long trajectories.

Other implementations may utilize a different type of input along with RGB images. For instance, an optical flow between a pair of images may be used to estimate the relative pose. Furthermore, the information of the depth dimension may also be used where a neural network uses RGB-D images as inputs, considering this situation from a 2.5D perspective, among other examples. Some implementations may utilize CNNs on 3D data to perform deep learning with this 3D data. For instance, the point cloud alignment problem may be assessed by first extracting feature points from the point cloud, then feeding the obtained features a deep learning approach. For instance, a "super-point" descriptor may serve as the basic unit for matching the point clouds, and this descriptor may be used as an input to a Deep Neural Network Auto-Encoder that retains the geometrical information used to find the transformation between point clouds. In other implementations, interest points may be used, which represent clusters of the point cloud where high amounts of points are present. In addition, different problems like classification or segmentation using this strategy may be used, where nearest neighbors maps and KD-trees are used respectively as descriptors of the point cloud.

In some implementations, point clouds may be expressed as point subsets that are represented as a list of (x; y; z) coordinates which are then fed to fully connected layers that find interactions among points in order to classify 3D objects. In some implementations, such as represented by the simplified block diagram in FIG. 23B, point clouds 2305, 2310 may be converted into respective voxel grids (VG) 2320, 2325 through a voxelization process 2330, which converts each point cloud 2305, 2310 on a 3D grid where each cell has a fixed size. This fixes the amount of required memory and produces a neighboring relationship between the voxels. The voxel grid-based inputs 2320, 2325 may then be used to provide inputs to a Convolutional Neural Network 2350 to generate a relative pose result 2355. The strategy of using this type of data with Deep Learning can be applied in object classification and orientation problems, among other application. Traditional solutions and systems do not use voxel grids (VG) and deep learning to solve the relative pose estimation problem. The use of VG representations of 3D space has the properties of having a fixed size at the design stage and having a small memory footprint. Also, by using low-power hardware accelerators for CNN execution and other machine learning operations (e.g., the Movidius™ Neural Compute Stick™) it is possible to apply the approach on resource constrained devices, among other example benefits.

Figure 24:
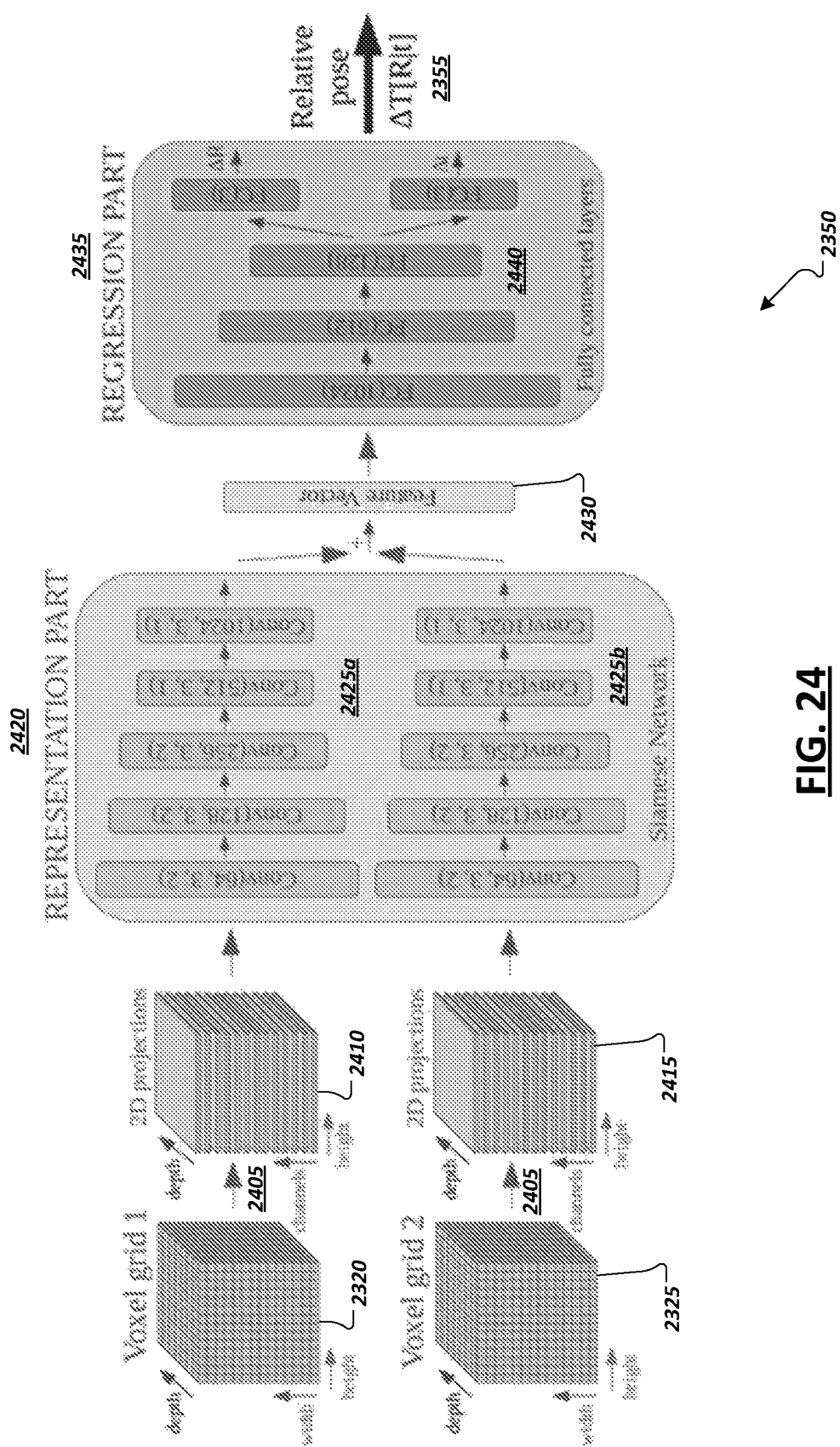
FIG. 24 is a simplified block diagram illustrating an example neural network model.

Turning to the simplified block diagram illustrated in FIG. 24, an example neural network topology is represented for use in determining relative pose estimation based on voxel grid representations (e.g., 2320, 2325) of 3D space under analysis. In one example implementation, a 2D Convolutional Neural Network can be implemented to take a pair of voxel grid structures 2320, 2325 as inputs to find the relative pose between the scans by training the CNN 2350 to align their correspondent point clouds (generated from the scans and upon which the voxel grid structures are based). Indeed, each voxel grid structure 2320, 2325 may be generated or extracted from a corresponding one of the point clouds through a voxelization process performed by the system. Then a 3D to 2D projection 2405 may be performed by the system in order to adapt the inputs for use in 2D Convolutional layers within the network 2350. Once a pair of 2D projections are introduced in the network, the Relative Pose ΔT 2355 between them is predicted.

As shown in the example of FIG. 24, with the voxel grid inputs 2320, 2325 sliced in 2D projections and converted into 2D projection inputs (2410, 2415 respectively), the 2D projection inputs 2410, 2415 may be provided as inputs to the representation part 2420 of the CNN 2350. The representation part 2420 of the network 2350 may implemented as a Siamese network with multiple sets (e.g., pairs) of corresponding convolutional layers (e.g., 2425a,b). Within the notation used in FIG. 24, for each of the layers in the representation part 2420 Conv(i; j; k) represents a convolutional layer with i outputs, a kernel size of j×j with stride of k and a "same" zero padding. The outputs from the representation part 2420 may be concatenated to form a feature vector 2430 that is introduced as an input to the regression part 2435 of the network 2350. For instance, regression part 2435 may be implemented to include a set of fully connected layers 2440, with a final fully connected layer to respectively generate each of the rotational (AR) and translational (At) components for use in generating the relative pose result 2355. Within the notation used in the representation of FIG. 24, FC(i) means a fully connected layer with i neurons As noted above, a point cloud is a type of data formed by a set of unorganized points, so first it is expressed as a 3D grid on a process known as voxelization. Voxelization converts the point cloud into a voxel grid, where the data is structured in voxels as the 2D images are correspondingly structured in pixels. Essentially, it is a cubical 3D grid with a [height, width, depth] shape, where each cube known as voxel, contains a small zone of information from the point cloud. If a point falls in that zone, the voxel occupancy is set to 1, otherwise it is a 0. This means that the VG only contains 1 bit per voxel, that is known as occupancy VG. An example of a point cloud representation 2505 of a 3D space is shown in FIG. 25 as well as an example of the corresponding voxel grid representation 2510 generated through voxelization from the point cloud representation 2505. A VOLA structure may be considered a specialized form of a voxel grid data structure, where data is only stored for those voxels that represent 3D space occupied by some geometry. Accordingly, a VOLA voxel grid structure decreased the amount of stored data useful for data transfers and memory constrained environments, such as described in the examples herein.

As introduced above, in some implementations, before introducing the voxel-grid-based inputs (e.g., 2320, 2325), a 3D to 2D projection step may be performed to adapt the 3D representation for use with convolutional layers with 2D kernels. This reduces the computational cost of the network (e.g., 2350) and makes it simpler allowing an easy deployment into embedded devices where there are memory constraints, among other example applications. 2D projections may be used on 3D data, such as in Multi-View CNNs, where 2D image projections are extracted from different perspectives of a 3D model to use them with a well-developed 2D CNN. However, this approach typically does not preserve the spatial structure of the 3D volume, as it is focused on a classification problem where this information might not be needed. Other implementations may project 3D objects into 2D using Anisotropic Probing kernels, a similar process to a "X-ray scanning" that convolves the 3D VG into a 2D plane. This projection may help to capture the 3D global structure of the 3D volume, for use in the pose estimation problem of our work. As a voxel grid is expressed as $(h_{VG}; w_{VG}; d_{VG})$ representing the (X; Y; Z) dimensions in the real world, in one example solution, a voxel grid structure may be converted into 2D projections by slicing the voxel grids in the direction of the Y dimension, generating $w_{VG}$ images of size $(h_{VG}, d_{VG})$. Then the resulting 2D images are stacked, producing an image of size $(h_{VG}, d_{VG})$ with $w_{VG}$ channels. In this example, $w_{VG}$ is used as slicing direction as the vertical of the objects may be expected in related applications to contribute to the alignment of the point cloud. Other implementations, based on considerations of the intended application, may alternatively perform similar along the other dimensions of the 3D voxel grid, among other example alternatives.

As set forth above in the example of FIG. 24, a computing system may implement, in hardware and/or software, a Convolutional Neural Network (CNN) and use the CNN to estimate the relative pose between a pair of voxel grids. The CNN 2350 takes as input the 2D projections of corresponding voxel grids and outputs a vector that represents the rotation (ΔR) and translation (Δt) of the relative pose. The representation part 2420 of the CNN 2350 can extract a feature vector 2430 from every pair of inputs. This feature vector 2430 may contain the practical information that is used later to predict the relative pose. The feature vector 2430 is formed by a Siamese Network with two identical branches of convolutional layers where the weights are shared between each other. In some implementations, after every convolutional layer in the representation part 2430 there is a rectified linear unit (ReLU) as activation function. In some instances, no pooling layers are used to ensure that the spatial information of the data is preserved. For the regression part 2435 of the CNN 2350, the outputs of both branches of the Siamese Network are flattened and concatenated forming a vector that is introduced to the regression part, which is the part responsible for estimating the prediction of the network. This one is formed by a set of Fully Connected layers 2440, each followed by a ReLU activation function. The output of the network has two components, the rotational and translational parts of the prediction, so in the last segment 2450 of the network 2350 there is a separation on two fully connected layers, each for every prediction part.

Continuing with the example above, the output 2355 of the CNN 2350 may be composed of a vector that represents the relative pose between the pair of voxel grids. This vector is usually defined as a transformation matrix ΔT of the special Euclidean group SE(3) of transformations: a set of elements consisting on rotation elements from the special orthogonal group SO(3) and a translation vector. When making predictions in the SE(3) group there can be some problems with the SO(3) rotation components, as they need to be an orthogonal matrix. In some implementations, the use of the Lie Algebra se(3) of the SE(3) group is presented as a solution to avoid the orthogonality requirement, as it represents an instantaneous transformation without having that orthogonality constraints. In order to make the conversion between se(3) and SE(3) an exponential map may be used:

$$se(3) \rightarrow SE(3): \exp(\omega|u) = (R|t) = \Delta T \qquad \text{Equation 15:}$$

As a result of using the Lie Algebra group, the pose prediction of the network (w|u) is represented by two vectors: w=(w1; w2; w3) for rotation and u=(u1; u2; u3) for translation, that are converted into ΔT. The calculation steps to make this conversion utilize Equations 3-9 above.

In some implementations, the network 2350 may be trained utilizing a learning phase controlled by a loss function that guides the network to achieve the correct solution. The loss function may measure how good the prediction of the network is, penalizing or rewarding the learning threw backpropagation. In one example, the proposed loss function quantifies the difference in the location of the points in a point cloud after applying two different transformations $T_{gt}$ and $\hat{T}$. The procedure consists of taking a generic point cloud that has points equally distributed in the 3D space, then two different transformations are applied and the difference in the location of the point is compared. The two transformations correspond to the network prediction $\hat{T}$ and to the ground truth $T_{gt}$. As a result, the closer these point clouds are between themselves, the more similar is the prediction to the ground truth. The Euclidean distance between the position of the points $p_i$, corresponding to transformation Tgt, and $\hat{p}_i$, corresponding to transformation $\hat{T}$, is used as error metric. Once this distance is determined for every point a mean is computed to represent the loss. The loss function can be expressed as follows:

$$\frac{\sum_i^n \|p_i - \hat{p}_i\|_2}{n} \quad \text{Equation 16}$$

where $\|p_i - \hat{p}_i\|_2$ represents the $L_2$ norm of point i and n is the number of points in the point cloud.

Many datasets exist that are focused on the relative pose estimation problem, which may be utilized to test the efficacy of a CNN used in pose estimation solutions. Such datasets may be used to represent a ground truth that provides information about the localization of the data, necessary to know about the relative pose. In one example, point clouds are needed for evaluating the network. This type of data can be found in two ways: from 3D datasets that directly provides point clouds produced with 3D laser sensors (e.g., LiDAR; or RGB-D datasets), where point clouds can be extracted from the depth maps in a straightforward process, converting each pixel with depth information into a point.

For an implementation utilizing deep learning, such as discussed herein, a high volume of data may be needed in the learning phase to train the network. Meeting this requirement, different datasets can be found, differentiating them by their application. For instance, the KITTI dataset, Oxford Robot Car dataset, Malaga Urban dataset, and others may be focused on autonomous driving applications, where a car is used to move the camera/sensors. As another example; a 7-scenes dataset, an ICL-NUIM dataset, and other dataset may be focused on handheld devices on indoor environments, where they take and move the camera with the hand. In another example, a TUM dataset may be utilized that, in addition to hand-held sequences, may also contain data obtained from a wheeled robot moving in the ground, among other example data set, which may be employed during training of the network.

As an example, in applications of ground robots for indoor locations using deep learning, the TUM dataset may be utilized, as it provides a sufficient amount of data of this kind to train a Deep Neural Network (DNN). This dataset may consist of multiple sequences organized in categories depending on their application. In one example, only the sequences of "Robot SLAM" are used. In order to obtain the point clouds from the depth maps, the tools provided in the dataset are used for evaluating the performance of our approach.

The point clouds from TUM dataset may be voxelized, as described herein (e.g., taking only the points from a range of [4, 4, 8] meters from the camera in the x, y and z direction into a VG with size of [64, 64, 128]). To train the network from scratch, in one example, the first three sequences of the "Robot SLAM" category may be used (e.g., fr2/pioneer 360, fr2/pioneer slam and fr2/pioneer slam2), leaving the fourth set (e.g., fr2/pioneer slam3) out of the training in order to evaluate the network with unknown data.

Further, in order to increase the amount of data for training and to make the network robust to large displacements of the sensor, the training pairs may be created by taking different step sizes in the sequence of data, in the form $(F_i, F_{i+s})$, where F is the frame with index i, that can be i∈ 0, 1, . . . , n where n is the length of the sequence, and s is the step size with s∈ 3, 5, 7, 10. These values may be selected to increase the separation between the used frames.

In one example, the network model may be implemented with the TensorFlow framework and trained with a graphical processing unit (GPU), vector processing unit, or other computer processor. In one example, the performance of the trained network is analyzed by using the tools provided in the TUM dataset, where two different types of errors are presented: (i) the relative pose error (RPE), which measures the local accuracy of the trajectory over a fixed interval Δ, an error corresponding to the drift of the trajectory; and (ii) the absolute trajectory error (ATE), which measures the global consistency of the estimated trajectory by comparing the absolute distances between the estimated and the ground truth trajectory.

To compare the performance of the network against existing approaches, a traditional implementation of Iterative Closest Point (ICP) may be used. The errors determined in an example evaluation of the CNN-based relative pose estimation approach discussed herein are presented in the Table 5, together with results for a traditional ICP implementation and a combined CNN-ICP approach (combining the improved CNN-based solution with an ICP portion) are also presented for comparison. It can be seen that in respect to the relative pose estimation, the CNN has a higher rotational error than the methods that use ICP, however the translational error of the CNN is the lowest. This means that although the rotational error is high, the influence on the pose is little, making the translational error the most influential. In some instance, the translational relative pose estimation errors may be considered sufficient for a comparison, as the rotational relative pose estimation errors show up as translational errors when the camera is moved. Finally, although the ATE error is larger for the CNN, the trajectory obtained by the network is smooth and follows the same "shape" as the ground truth, whereas the ICP trajectory is typically more erratic. The higher ATE for the CNN may be considered the result of training the CNN on a small set of data where the scale of the rotations of the evaluation is not present.

TABLE 5

Relative Pose Error (RPE) and Absolute Trajectory Error (ATE) for each relative pose estimation technique (expressed as root mean square error (RMSE), mean, and standard deviation (STD)). In this example, the RPE is calculated with a fixed Δ interval of 5 frames.

| Technique | RPE translational (m) | | | RPE rotational (deg) | | | Abs. Trajectory Error (m) | | |
| --- | --- | --- | --- | --- | --- | --- | --- | --- | --- |
| | RMSE | MEAN | STD | RMSE | MEAN | STD | RMSE | MEAN | STD |
| CNN | 0.036 | 0.029 | 0.021 | 3.517 | 1.649 | 3.106 | 1.514 | 1.413 | 0.536 |
| ICP | 0.098 | 0.061 | 0.077 | 2.926 | 1.392 | 2.573 | 1.461 | 1.142 | 0.911 |
| CNN + ICP | 0.071 | 0.040 | 0.058 | 2.545 | 0.944 | 2.363 | 0.972 | 0.878 | 0.416 |

As discussed above, an improved computing system may implement (in hardware and/or software) an end-to-end approach to find the relative pose between voxel grids using a loss function based on the transformation error between point clouds. The trajectories estimated by the CNN of such a system may be smoother compared to ICP (and even the combination of CNN+ICP). While such a system may utilize a relatively large amount of data to train the corresponding deep learning model, in other implementations, the size of the training dataset may be increased. It should be appreciated that this approach may be utilized in other applications, including hand-held cameras, drones and cars. Further, implementations may utilize point clouds obtained by LiDAR. In some implementations the size of parameters of the network may also be reduced or otherwise simplified, among other example modifications.

Figure 26C:
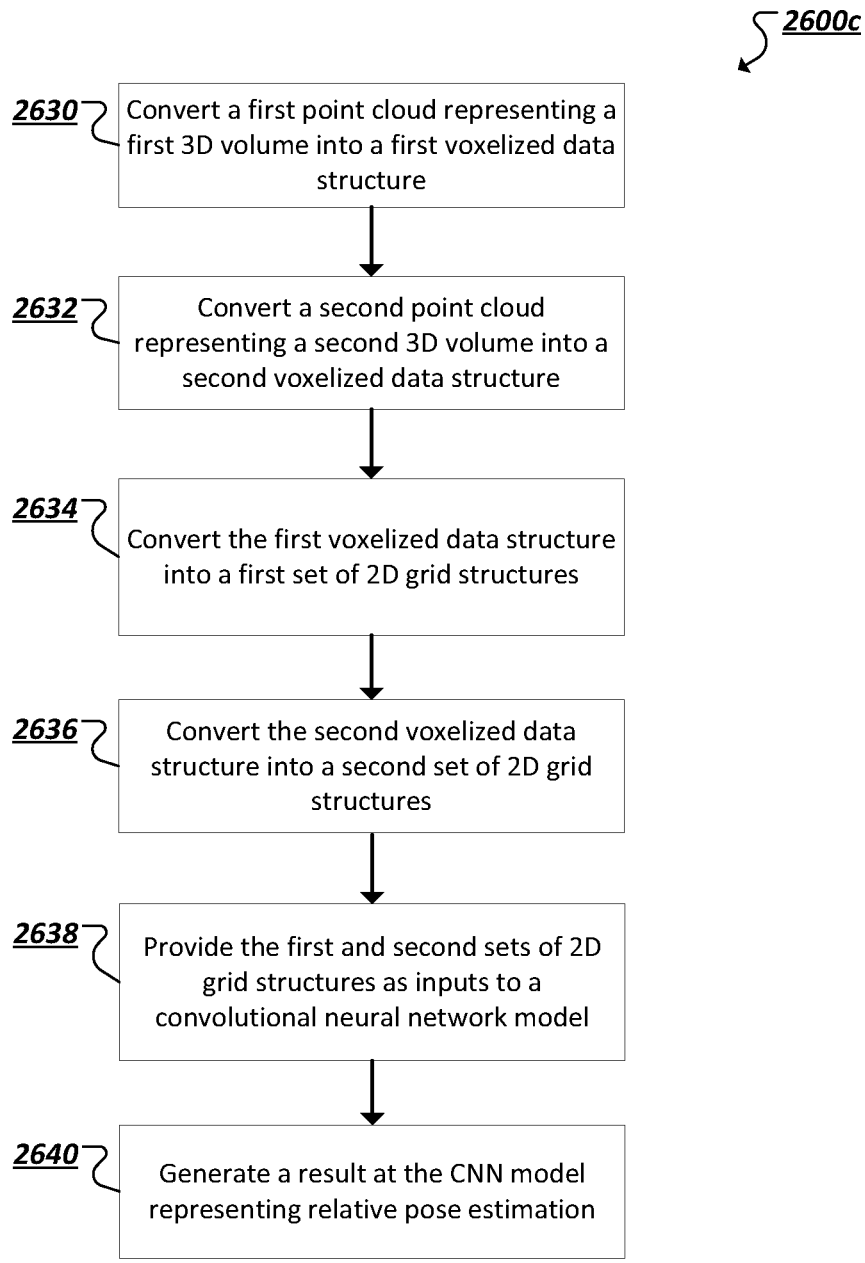

FIGS. 26A-26C are flowcharts 2600a-c illustrating example techniques for enhancing computer vision processing by a system. In the example of FIG. 26A, an improved technique for performing raycasting is represented. For instance, a sparse hierarchical volumetric (grid-based) data structure (e.g., a VOLA-based structure) may be accessed 2602 and a raycasting algorithm may be performed 2604 using the volumetric data structure. Multiple rays may be cast 2606 into the volume represented by the volumetric data structure to perform the raycasting algorithm. Raycasting may include ray traversal steps—in this case, according to an interval that results in an approximate traversal of the ray, in that less than all of the voxels intersected by the ray are checked to see if they contain geometry (or are "occupied"). From the traversal, it is approximately determined whether the ray intersects an occupied voxel and, if so, which occupied voxel is first intersected by the ray. This ray casting process is repeated for each of the rays, for instance, as part of a SLAM pipeline, rendering application, or other example use.

Turning to FIG. 26B, an improved technique for determining pose of a device (e.g., one or more sensors of the device) is illustrated. The device may be an autonomous device capable of autonomously navigating and moving within an environment. In one example, visual data (e.g., generated by a camera of the device) may be input 2620 to a first portion of a neural network model, the first portion implemented as a visual odometry neural network. Further, inertial data (e.g., generated by an IMU of the device) may also be input 2622 to the neural network model at a second portion of the model implemented as an inertial odometry neural network portion. Respective outputs of the visual odometry and inertial odometry network portions may be concatenated and provided as an input to a first in a set of fully-connected layers within the neural network model. An output, representing the post of the device, may be generated 2626 by the neural network model based on the combined inputs of visual and inertial data.

Turning to FIG. 26C, an improved technique for determining relative pose estimation is illustrated. For instance, point cloud data captured to describe views of an environment (and describing two volumes (e.g., sub-volumes of the overall environment)) may be converted (at 2630, 2632) into respective voxelized volumetric data structures (e.g., VOLA-based structures), each representing the corresponding volume. These volumetric data structures may then be sliced or otherwise converted (at 2634, 2636) into 2D data structures (e.g., respective sets of 2D slices) and the 2D slices may be provided as inputs (at 2638) to convolutional neural network model trained to determine relative pose estimation. Indeed, the convolutional neural network model may generate 2640 a result representing relative pose estimation based on volumes described in the two voxelized volumetric data structures.

Figure 27:
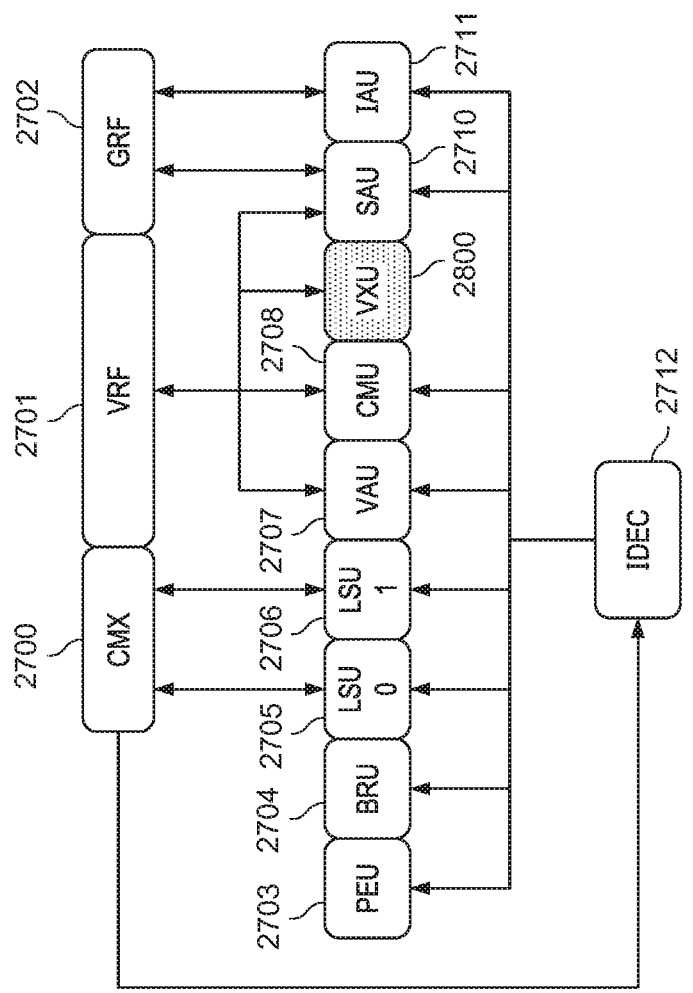
FIG. 27 depicts an example multi-slot vector processor in accordance with some embodiments.

FIG. 27 is a simplified block diagram representing an example multislot vector processor (e.g., a very long instruction word (VLIW) vector processor) in accordance with some embodiments. In this example the vector processor may include multiple (e.g., 9) functional units (e.g., 2703-2711), which may be fed by a multi-ported memory system 2700, backed up by a vector register file (VRF) 2701 and general register file (GRF) 2702. The processor contains an instruction decoder (IDEC) 2712, which decodes instructions and generates control signals which control the functional units 2703-2711. The functional units 2703-2711 are the predicated execution unit (PEU) 2703, branch and repeat unit (BRU) 2704, load store port units (e.g., LSU0 2705 and LSU1 2706), a vector arithmetic unit (VAU) 2707, scalar arithmetic unit (SAU) 2710, compare and move unit (CMU) 2708, integer arithmetic unit (IAU) 2711, and a volumetric acceleration unit (VXU) 2800. In this particular implementation, the VXU 2800 may accelerate operations on volumetric data, including both storage/retrieval operations, logical operations, and arithmetic operations. While the VXU circuitry 2800 is shown in the example of FIG. 27 as a unitary component, it should be appreciated that the functionality of the VXU (as well as an of the other functional units 2703-2711) may be distributed among multiple circuitry. Further, in some implementations, the functionality of the VXU 2800 may be distributed, in some implementations, within one or more of the other functional units (e.g., 2703-2708, 2710, 2711) of the processor, among other example implementations.

Figure 28:
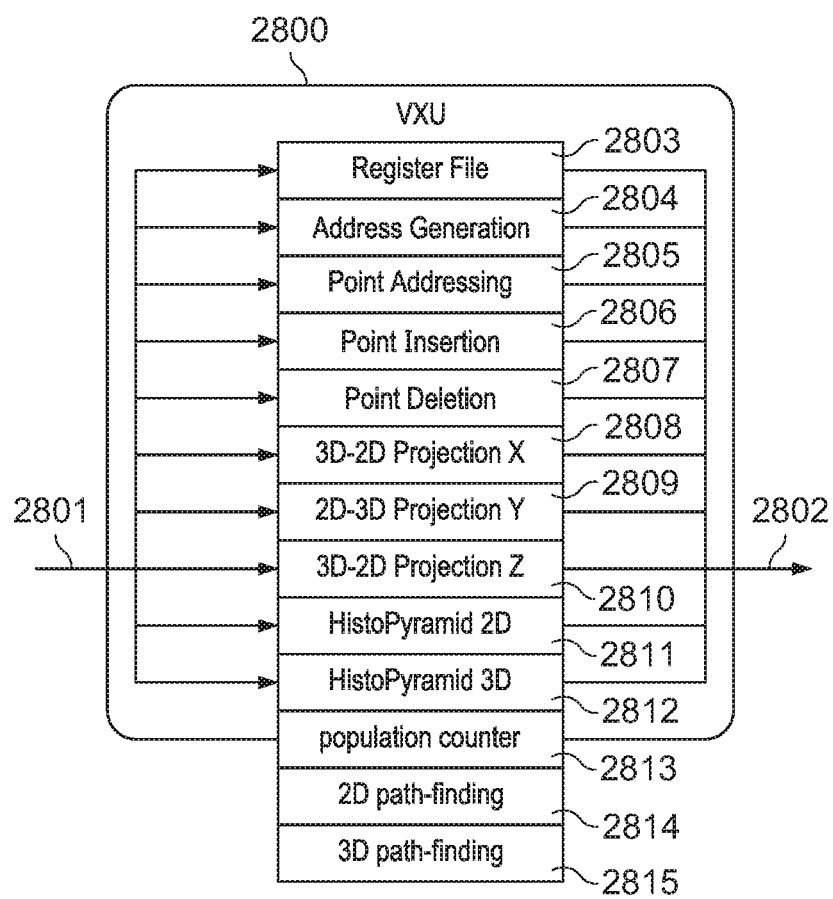
FIG. 28 illustrates an example volumetric acceleration hardware in accordance with some embodiments.

FIG. 28 is a simplified block diagram illustrating an example implementation of a VXU 2800 in accordance with some embodiments. For instance, VXU 2800 may provide at least one 64-bit input port 2801 to accept inputs from either the vector register file 2801 or general register file 2802. This input may be connected to a plurality of functional units including a register file 2803, address generator 2804, point addressing logic 2805, point insertion logic 2806, point deletion logic 2807, 3D to 2D projection logic in X dimension 2808, 3D to 2D projection logic in Y dimension 2809, 3D to 2D projection logic in X dimension 2810, 2D histogram pyramid generator 2811, 3D histopyramid generator 2812, population counter 2813, 2D path-finding logic 2814, 3D path-finding logic 2815 and possibly additional functional units to operate on 64-bit unsigned integer volumetric bitmaps. The output from the block 2802 can be written back to either the vector register file VRF 2801 or general register file GRF 2802 register files.

Figure 30:
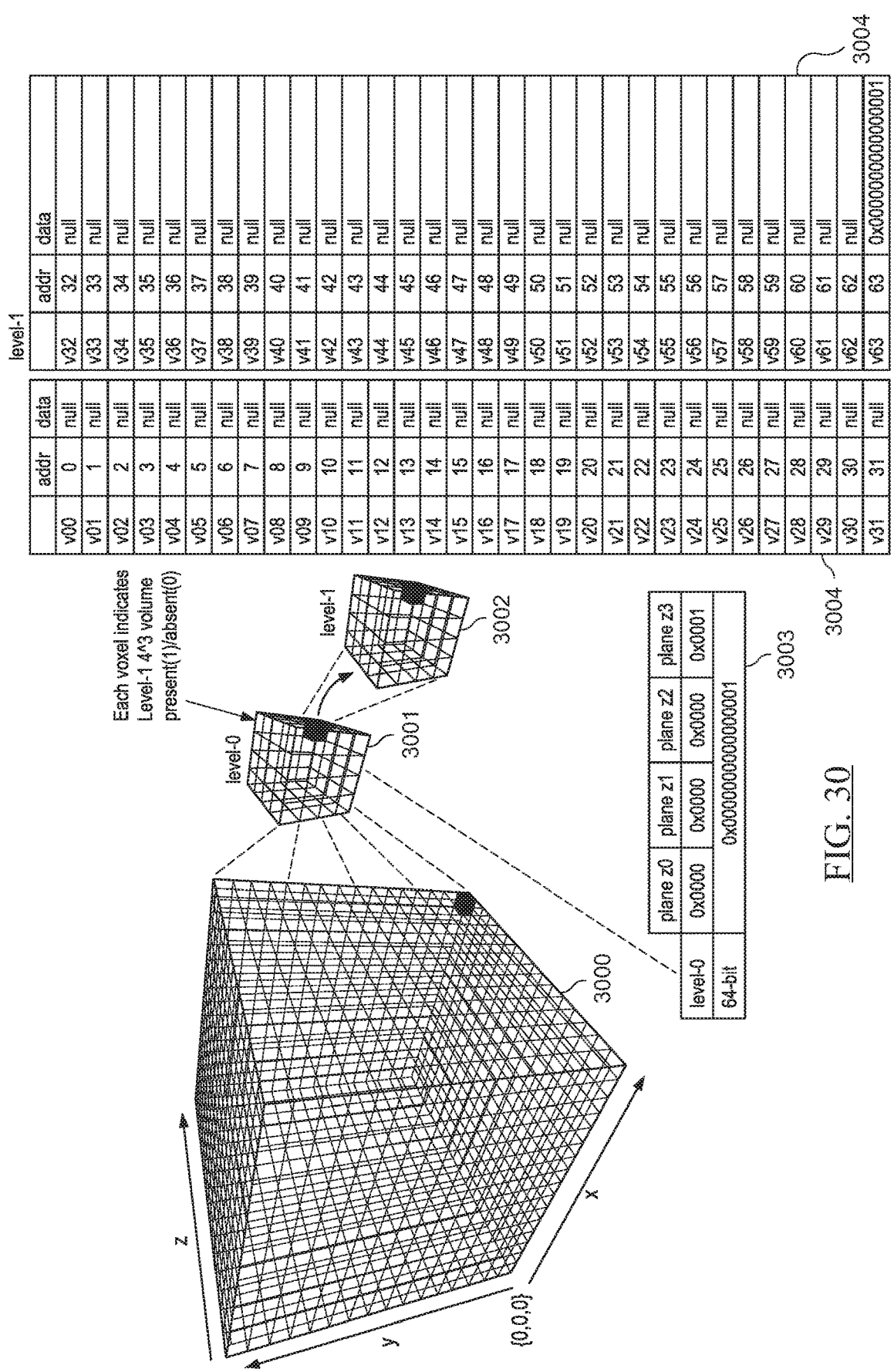
FIG. 30 illustrates a two-level sparse voxel tree in accordance with some embodiments.

Turning to the example of FIG. 29, a representation of the organization of a 4^3 voxel cube 2900 is represented. A second voxel cube 2901 is also represented. In this example, a voxel cube may be defined in data as a 64-bit integer 2902, in which each single voxel within the cube is represented by a single corresponding bit in the 64-bit integer. For instance, the voxel 2912 at address {x,y,z}={3,0,3} may be set to "1" to indicate the presence of geometry at that coordinate within the volumetric space represented by the voxel cube 2901. Further, in this example, all other voxels (beside voxel 2902) may corresponding to "empty" space, and may be set to "0" to indicate the absence of physical geometry at those coordinates, among other examples. Turning to FIG. 30, an example two-level sparse voxel tree 3000 is illustrated in accordance with some embodiments. In this example, only a single "occupied" voxel is included within a volume (e.g., in location {15,0,15}). The upper level-0 of the tree 3001 in this case contains a single voxel entry {3,0,3}. That voxel in turn points to the next level of the tree 3002 which contains a single voxel in element {3,0,3}. The entry in the datastructure corresponding to level 0 of the sparse voxel tree is a 64-bit integer 3003 with one voxel set as occupied. The set voxel means that an array of 64-bit integers is then allocated in level 1 of the tree corresponding to the voxel volume set in 3003. In the level 1 sub-array 3004 only one of the voxels is set as occupied with all other voxels set as unoccupied. As the tree, in this example, is a two level tree, level 1 represents the bottom of the tree, such that the hierarchy terminates here.

Figure 31:
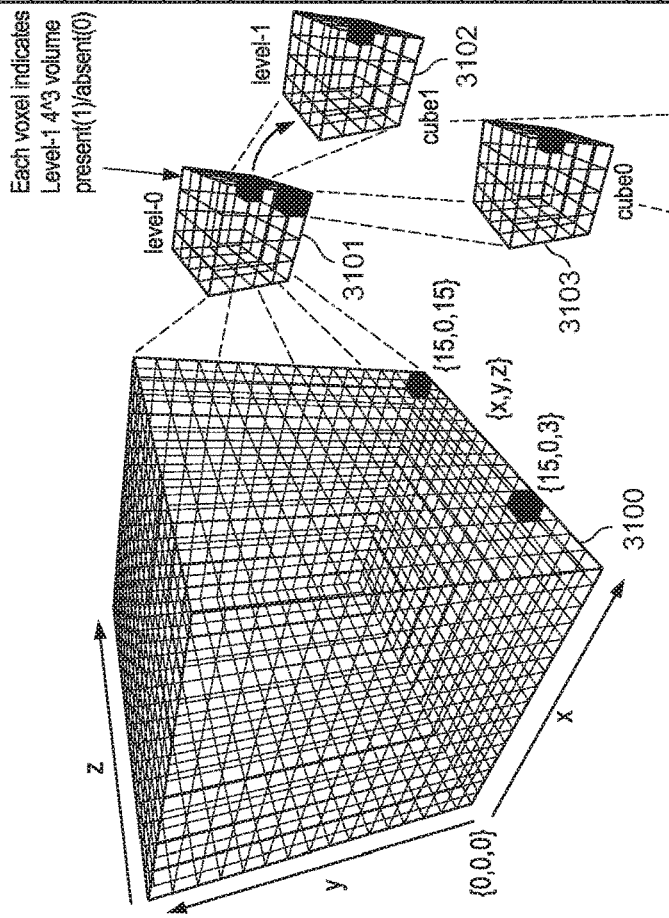
FIG. 31 illustrates a two-level sparse voxel tree in accordance with some embodiments.

FIG. 31 illustrates a two-level sparse voxel tree 3100 in accordance with some embodiments which contains occupied voxels in locations {15,0,3} and {15,0,15} of a particular volume. The upper level-0 of the tree 3101 in this case (which subdivides the particular volume into 64 upper level-0 voxels) contains two voxel entries {3,0,0} and {3,0,3} with corresponding data 3104 that shows two voxels are set (or occupied). The next level of the sparse voxel tree (SVT) is provided as an array of 64-bit integers that contains two sub-cubes 3102 and 3103, one for each voxel set in level 0. In the level 1 sub-array 3105, two voxels are set as occupied, v15 and v63, and all other voxels set as unoccupied and the tree. This format is flexible as 64-entries in the next level of the tree are always allocated in correspondence to each set voxel in the upper layer of the tree. This flexibility can allow dynamically changing scene geometry to be inserted into an existing volumetric data structure in a flexible manner (i.e., rather than in a fixed order, such as randomly), as long as the corresponding voxel in the upper layers have been set. If not, either a table of pointers would be maintained, leading to higher memory requirements, or else the tree would be required to be at least partially rebuilt in order to insert unforeseen geometry.

Figure 32:
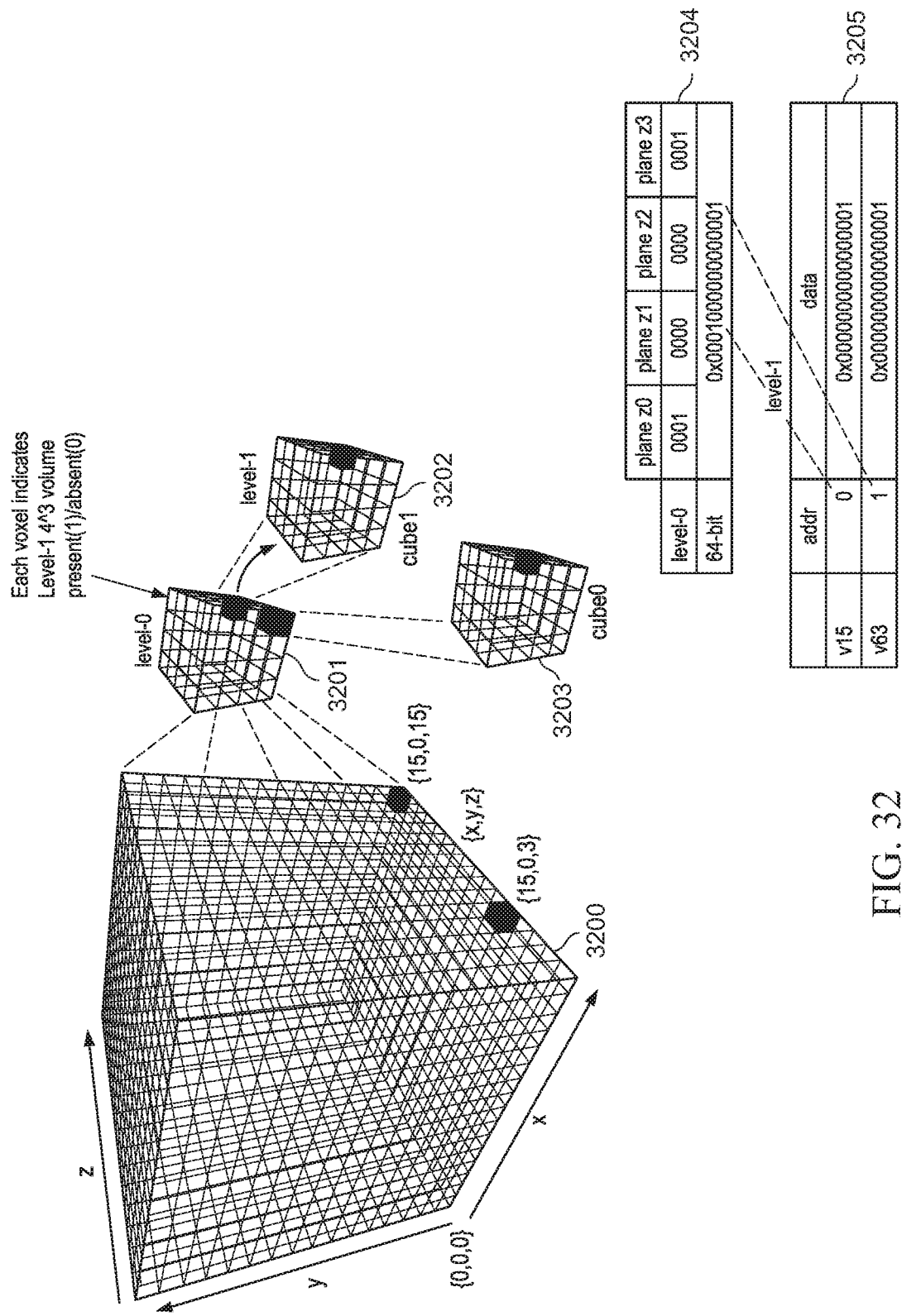
FIG. 32 illustrates storage of example voxel data in accordance with some embodiments.

FIG. 32 illustrates an alternate technique for storing the voxels from FIG. 31 in accordance with some embodiments. In this example, the overall volume 3200 contains two voxels stored at global coordinates {15,0,3} and {15,0,15} as in FIG. 31. In this approach, rather than allocating a 64-entry array to represent all of the sub-cubes in level 1 below level 0, only those elements in level 1, which actually contain geometry (e.g., as indicated by whether or not the corresponding level 0 voxels are occupier or not) are allocated as corresponding 64-bit level 1 records, such that the level 1, in this example, has only two 64-bit entries rather than sixty-four (i.e., for each of the 64 level-1 voxels, whether occupied or empty). Accordingly, in this example, the first level 0 3204 is equivalent to 3104 in FIG. 31 while the next level 3205 is 62 times smaller in terms of memory requirement than the corresponding 3105 in FIG. 23. In some implementations, if new geometry is to be inserted into level 0 for which space has not been allocated in level 1, the tree has to be copied and rearranged.

In the example of FIG. 32, the sub-volumes can be derived by counting the occupied voxels in the layer above the current layer. In this way, the system may determine where, in the voxel data, one higher layer ends and the next lower layer begins. For instance, if three layer-0 voxels are occupied, the system may expect that three corresponding layer-1 entries will following in the voxel data, and that the next entry (after these three) corresponds to the first entry in layer-2, and so on. Such optimal compaction can be very useful where certain parts of the scene do not vary over time or where remote transmission of volumetric data is required in the application, say from a space probe scanning the surface of Pluto where every bit is costly and time-consuming to transmit.

Figure 33:
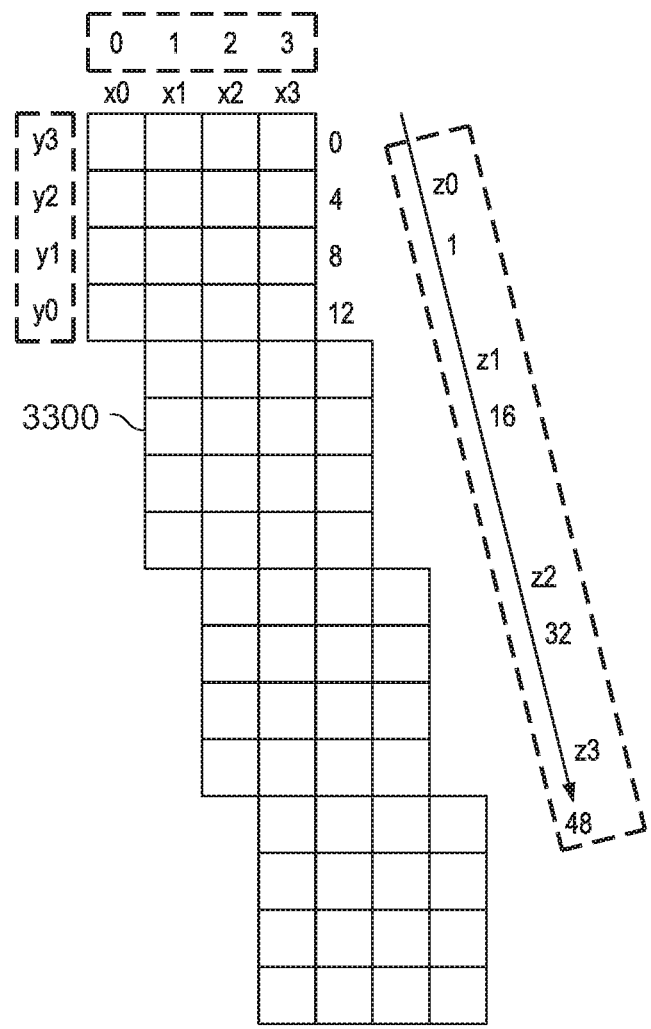
FIG. 33 illustrates insertion of a voxel into an example volumetric data structure in accordance with some embodiments.

FIG. 33 illustrates the manner in which a voxel may be inserted into a 4^3 cube represented as a 64 bit integer volumetric data structure entry, to reflect a change to geometry within the corresponding volume, in accordance with some embodiments. In one example, each voxel cube may be organized as four logical 16-bit planes within a 64-bit integer as shown in 3300. Each of the planes corresponds to Z values 0 through to 3, and within each plane each y-value codes for 4 logical 4-bit displacements 0 through 3, and finally within each 4-bit y-plane each bit codes for 4 possible values of x, 0 through 3, among other example organizations. Thus, in this example, to insert a voxel into a 4^3 volume, first a 1-bit may be shifted by the x-value 0 to 3, then that value may be shifted by 0/4/8/12 bits to encode the y-value, and finally the z-value may be represented by a shift of 0/16/32/48-bits as shown in the C-code expression in 3301. Finally, as each 64-bit integer may be a combination of up to 64 voxels, each of which is written separately, the new bitmap must be logically combined with the old 64-bit value read from the sparse voxel tree by ORing the old and new bitmap values as shown in 3302.

Figure 34:
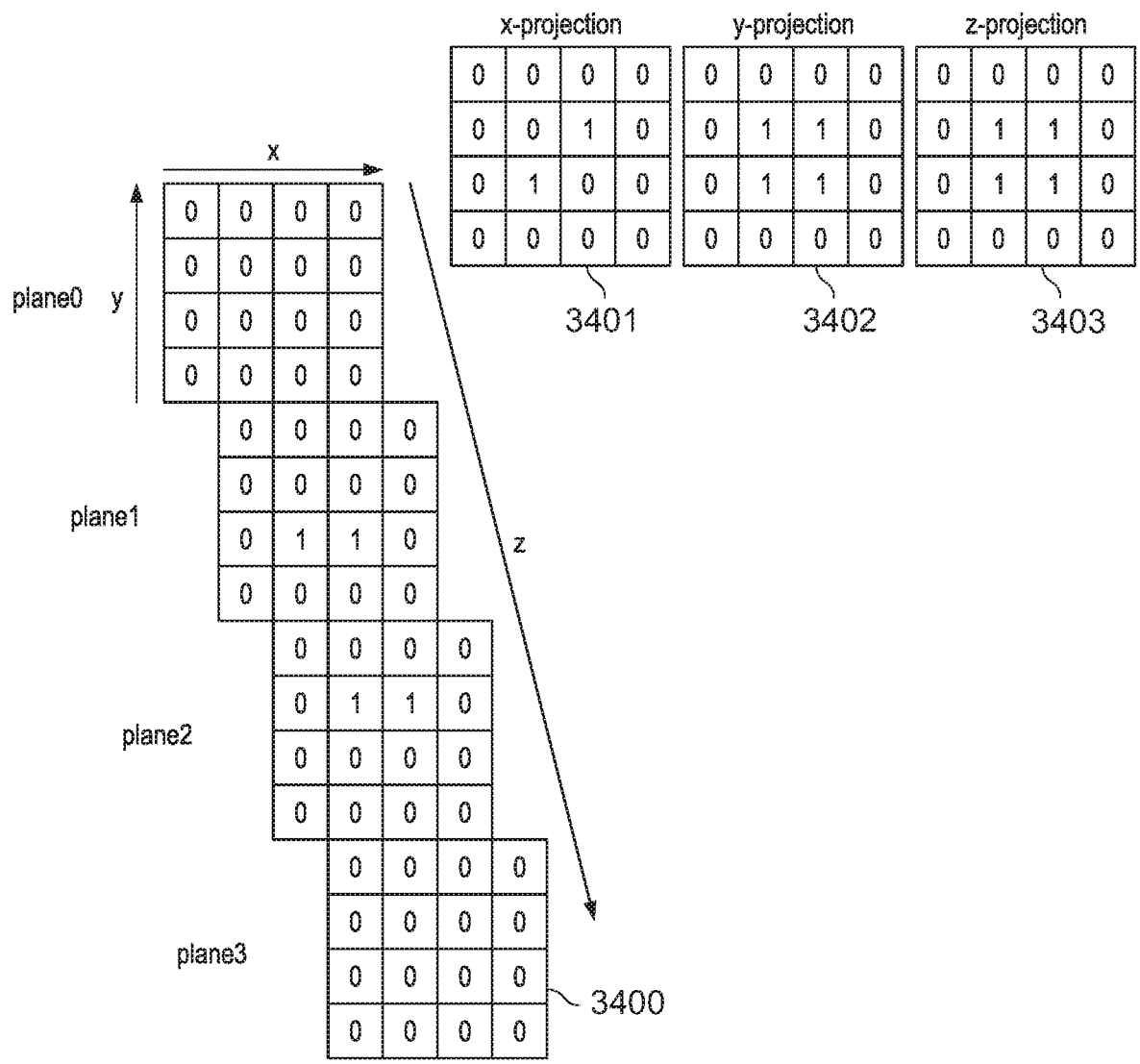
FIG. 34 illustrates projection of an example 3D volumetric object, in accordance with some embodiments.
Figure 35:
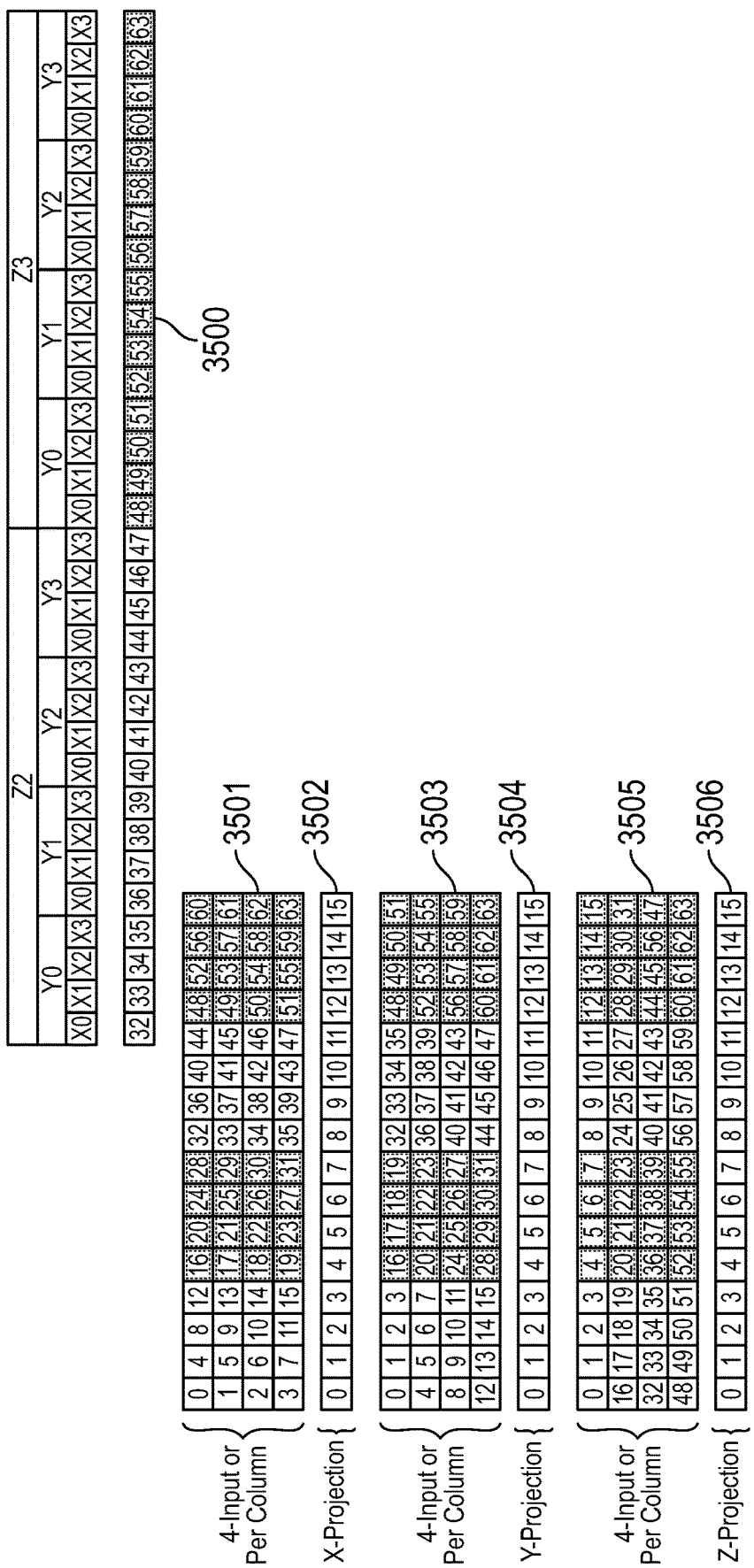
FIG. 35 illustrates example operations involving an example volumetric data structure.

Turning to FIG. 34, a representation is shown to illustrate, in accordance with some embodiments, how a 3D volumetric object stored in a 64-bit integer 3400 can be projected by logical ORing in the X direction to produce the 2D pattern 3401, in the Y-direction to produce the 2D output 3402 and finally in the Z-direction to produce the pattern shown in 3403. FIG. 35 illustrates, in accordance with some embodiments, how bits from the input 64-bit integer are logically ORed to produce the output projections in X, Y and Z. In this example, table 3501 shows column-wise which element indices from the input vector 3500 are ORed to produce the x-projection output vector 3502. Table 3503 shows column-wise which element indices from the input vector 3500 are ORed to produce the y-projection output vector 3504. Finally 3505 shows column-wise which element indices from the input vector 3500 are ORed to produce the z-projection output vector 3506.

The X-projection logically ORs bits 0,1,2,3 from the input data 3500 to produce bit 0 of the X-projection 3501. For instance, bit 1 in 3501 may be produced by ORing bits 4, 5, 6, and 7 from 3500, and so on. Similarly, bit 0 in the Y-projection 3504 may be produced by ORing together bits 0, 4, 8, and 12 of 3500. And bit 1 of 3504 is produced by ORing together bits 1, 5, 9, and 13 of 3500 etc. Finally bit 0 in the Z-projection 3506 is produced by ORing together bits 0, 16, 32, and 48 of 3500. And bit 1 of 3506 may be produced by ORing together bits 1, 17, 33, and 49 of 3500, and so on.

Figure 36:
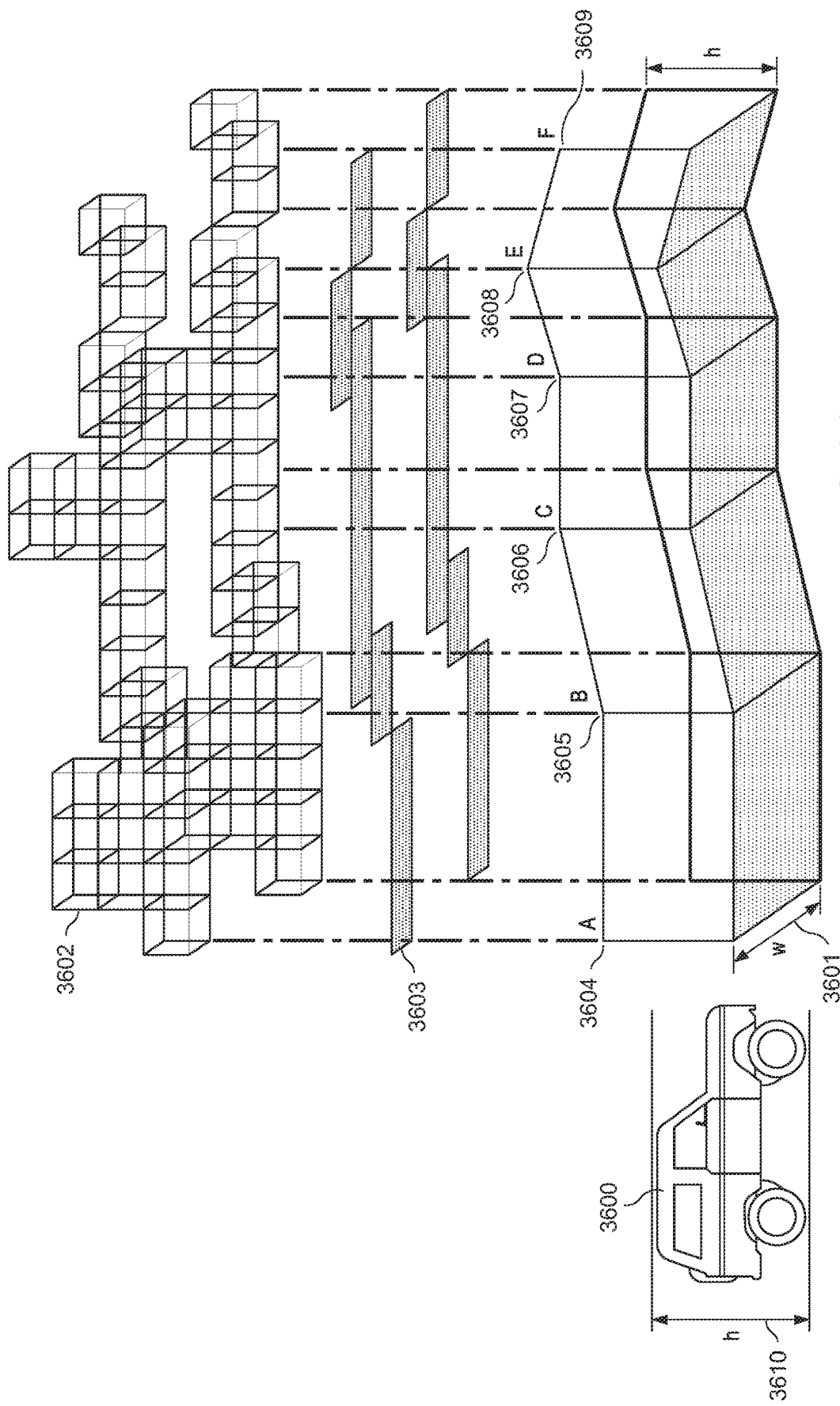
FIG. 36 shows using projections to generate simplified maps in accordance with some embodiments.

FIG. 36 shows an example of how projections can be used to generate simplified maps in accordance with some embodiments. In this scenario, the goal may be to produce a compact 2D map of paths down which a vehicle 3600 of height h 3610 and width w 3601 from a voxel volume 3602. Here the Y-projection logic can be used to generate an initial crude 2D map 3603 from the voxel volume 3602. In some implementations the map may be processed to check whether a particular vehicle (e.g., a car (or autonomous car), drone, etc.) of particular dimensions can pass through the width 3601 and height constraints 3610 of the path. This may be performed in order to ensure the paths are passable by performing projections in Z to check the width constraint 3601 and the projections in Y can be masked to limit calculations to the height of the vehicle 3610. With additional post processing (e.g., in software) it can be seen that for paths which are passable and satisfy the width and height constraints only the X and Z, coordinates of the points A 3604, B 3605, C 3606, D 3607, E 3608 and F 3609 along the path may only be stored or transmitted over a network in order to fully reconstruct the legal paths along which the vehicle can travel. Given that the path can be resolved into such piecewise segments it's possible to fully describe the path with only a byte or two per piecewise linear section of the path. This may assist in the fast transmission and processing of such path data (e.g., by an autonomous vehicle), among other examples.

Figure 37:
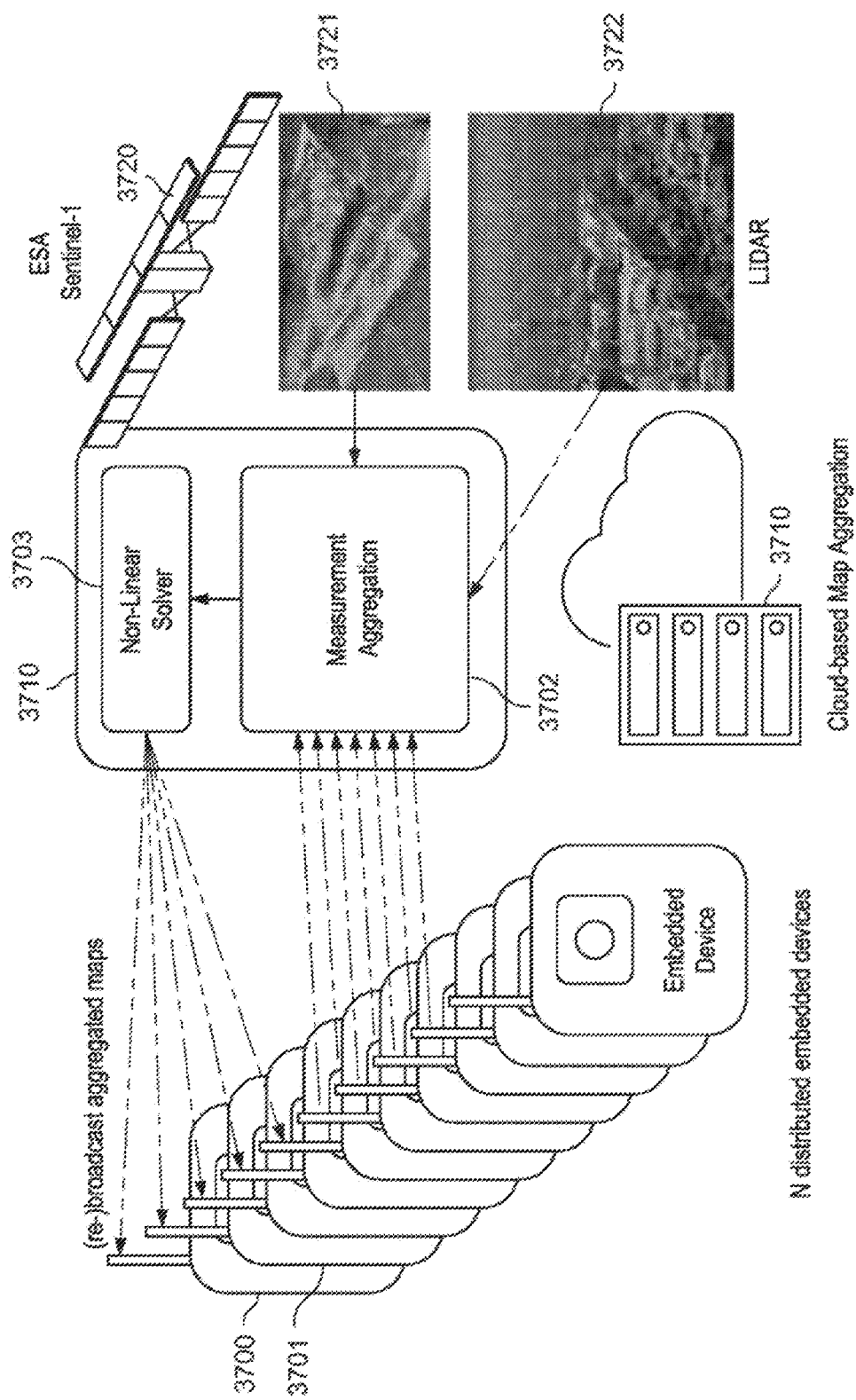
FIG. 37 illustrates example aggregation of example volumetric 3D and/or simple 2D measurements from embedded devices in accordance with some embodiments.

FIG. 37 illustrates how either volumetric 3D or simple 2D measurements from embedded devices can be aggregated in accordance with some embodiments by mathematical means in order to generate high-quality crowd-sourced maps as an alternative to using LIDAR or other expensive means to make precision measurements. In the proposed system a plurality of embedded devices 3700, 3701, etc. may be equipped with various sensors capable of taking measurements, which may be transmitted to a central server 3710. Software running on the server performs aggregation of all of the measurements 3702 and performs a numerical solve by non-linear solver 3703 of the resulting matrix to produce a highly accurate map, which can then be redistributed back to the embedded devices. Indeed the data aggregation can also include high accuracy survey data from satellites 3720, aerial LIDAR surveys 3721 and terrestrial LIDAR measurements 3722 to increase the accuracy of the resulting maps where these high fidelity datasets are available. In some implementations, the map and/or the recorded measurements may be generated in, converted to, or otherwise expressed using sparse voxel data structures with formats such as described herein, among other example implementations.

FIG. 38 is a diagram showing how 2D Path-Finding on a 2D 2×2 bitmap can be accelerated in accordance with some embodiments. The principal of operation is that for connectivity to exist between points on a map of identical grid cells the values of a contiguous run of cells in x or y or x and y must all be set to one. So a logical AND of bits drawn from those cells can be instantiated to test the bitmap in the grid for the existence of a valid path, and a different AND gate can be instantiated for each valid path through the N×N grid. In some instances, this approach may introduce combinatorial complexity in that even an 8×8 2D grid could contain $34^4-1$ valid paths. Accordingly, in some improved implementations, the grid may be reduced to 2×2 or 4×4 tiles which can be hierarchically tested for connectivity. A 2×2 bitmap 3800, contains 4 bits labeled b0, b1, b2 and b3. The 4 bits can take on the values 0000 through to 1111 with corresponding labels 3801 through to 3817. Each of these bit patterns expresses varying levels of connectivity between faces of the 2×2 grid labelled 3821 through to 3830. For instance 3821 or v0 denoting vertical connectivity between x0 and y0 in 3800 exists when the 2×2 grid 3800 contains bitmaps 1010 (3812), 1011 (3813), 1110 (3816) or 1111 (3817). A 2-input logical AND or b0 and b3 in 3800 as shown in row 1 of table 3818 generates v0 in the connectivity map that can be used in higher level hardware or software to decide on global connectivity through a global grid that has been subdivided into 2×2 sub grids. If the global map contains an odd number of grid points on either x or y axis the top level grid will require padding out to the next highest even number of grid points (e.g., such that 1 extra row of zeroes will need is added to the x- and/or y-axes on the global grid). FIG. 38 further shows an exemplary 7×7 grid 3850 showing how it is padded out to 8×8 by adding an additional row 3832 and column 3834 filled with zeroes. In order to speed up path-finding compared to the other techniques (e.g., depth-first search, breadth-first search or Dijkstra's algorithm, or other graph-based approaches), the present example may sub-sample the N×N map 3850 progressively town to a 2×2 map. For instance in this example cell W in 3840 is populated by ORing the contents of cells A, B, C and D in 3850, and so on. In turn the bits in 2×2 cells in 3840 are ORed to populate the cells in 3842. In terms of path-finding the algorithm starts from the smallest 2×2 representation of the grid 3842 and tests each of the bits. Only the parts of the 4×4 grid in 3840 (composed of four 2×2 grids) corresponding to one bits in the 2×2 grid 3842 need be tested for connectivity as we know that a zero bit means that there is no corresponding 2×2 grid cell in 3840. This approach can also be used in searching the 8×8 grid in 3820, for example if cell W in 3840 contains a zero then we know that there is no path in ABCD in 3820 etc. This approach prunes branches from the graph search algorithm used whether it be A*, Dijkstra, DFS, BFS or variants thereof. In addition to this, the use of a hardware basic path-finder with 2×2 organization 3818 may further limit the associated computations. Indeed, a 4×4 basic hardware element can be composed using a five 2×2 hardware blocks with the same arrangement as 3840 and 3842 further constraining the amount of graph searching that needs to be performed. Furthermore an 8×8 hardware-based search engine can be constructed with twenty one 2×2 HW blocks (3818) with the same arrangement as 3842, 3840, 3800, and so on for potentially any N×N topology.

Figure 39:
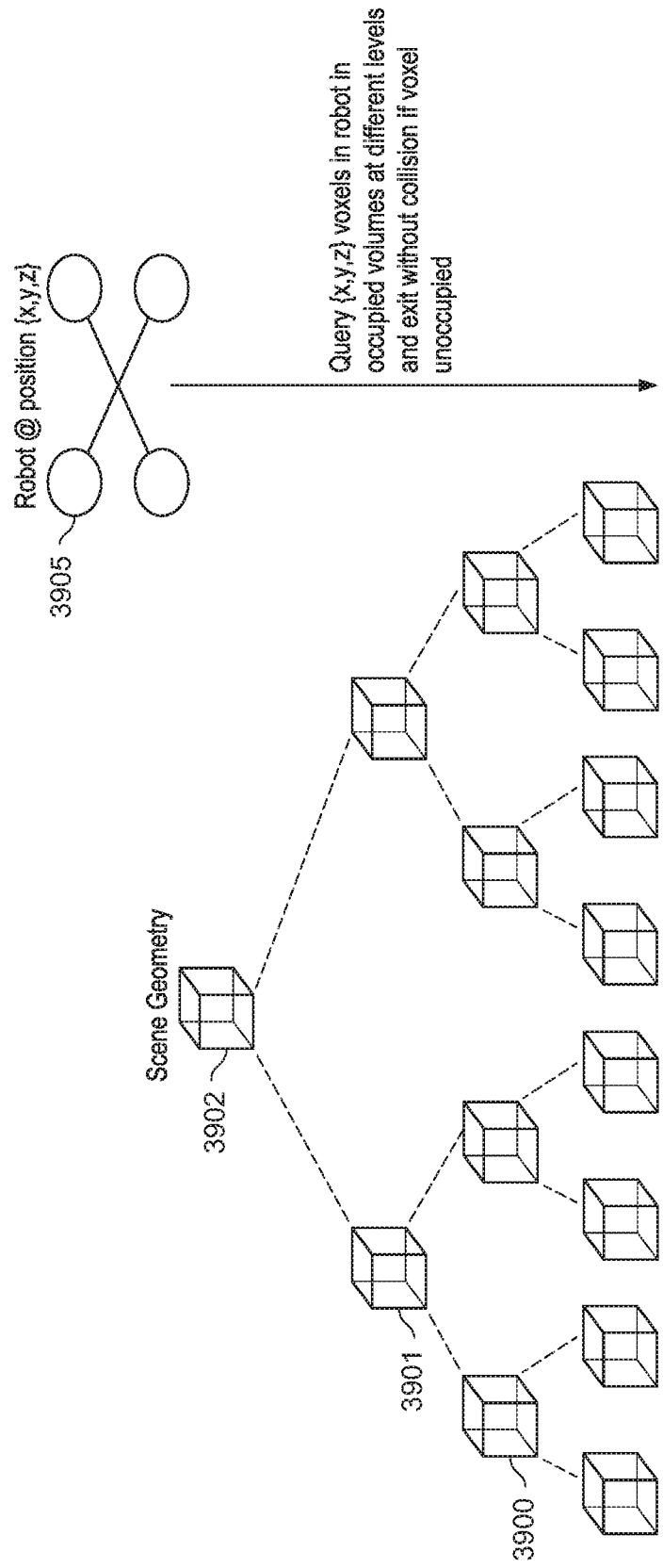
FIG. 39 shows the example acceleration of collision detection using an example volumetric data structure in accordance with some embodiments.

FIG. 39 is a simplified block diagram showing how collision detection can be accelerated using the proposed volumetric data structure in accordance with some embodiments. The 3D N×N×N map of the geometry can be sub-sampled into a pyramid consisting of a lowest Level of Detail (LoD) 2×2×2 volume 3902, a next highest 4×4×4 volume 3901, an 8×8×8 volume 3900, and so on all the way up to N×N×N. If the position of the drone, vehicle, or robot 3905 is known in 3D space via either a location means such as GPS, or via relocalization from a 3D map, then it can rapidly be used to test for the presence or absence of geometry in a quadrant of the relevant 2×2×2 sub-volume by scaling the x, y and z positions of the drone/robot appropriately (dividing them by 2 the relevant number of times) and querying 3902 for the presence of geometry (e.g., checking if the corresponding bitmap bit is one indicating a possible collision). If a possible collision exists (e.g., a "1" is found) then further checks in volumes 3901, 3900, etc. may be performed to establish if the drone/robot can move or not. However, if a voxel in 3902 is free (e.g., "0"), then the robot/drone can interpret the same as free space and manipulate directional control to move freely through a large part of the map.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 40-45 are block diagrams of exemplary computer architectures that may be used in accordance with embodiments disclosed herein. Indeed, computing devices, processors, and other logic and circuitry of the systems described herein may incorporate all or a portion of the functionality and supporting software and/or hardware circuitry to implement such functionality. Further, other computer architecture designs known in the art for processors and computing systems may also be used beyond the examples shown here. Generally, suitable computer architectures for embodiments disclosed herein can include, but are not limited to, configurations illustrated in FIGS. 40-45.

Figure 40:
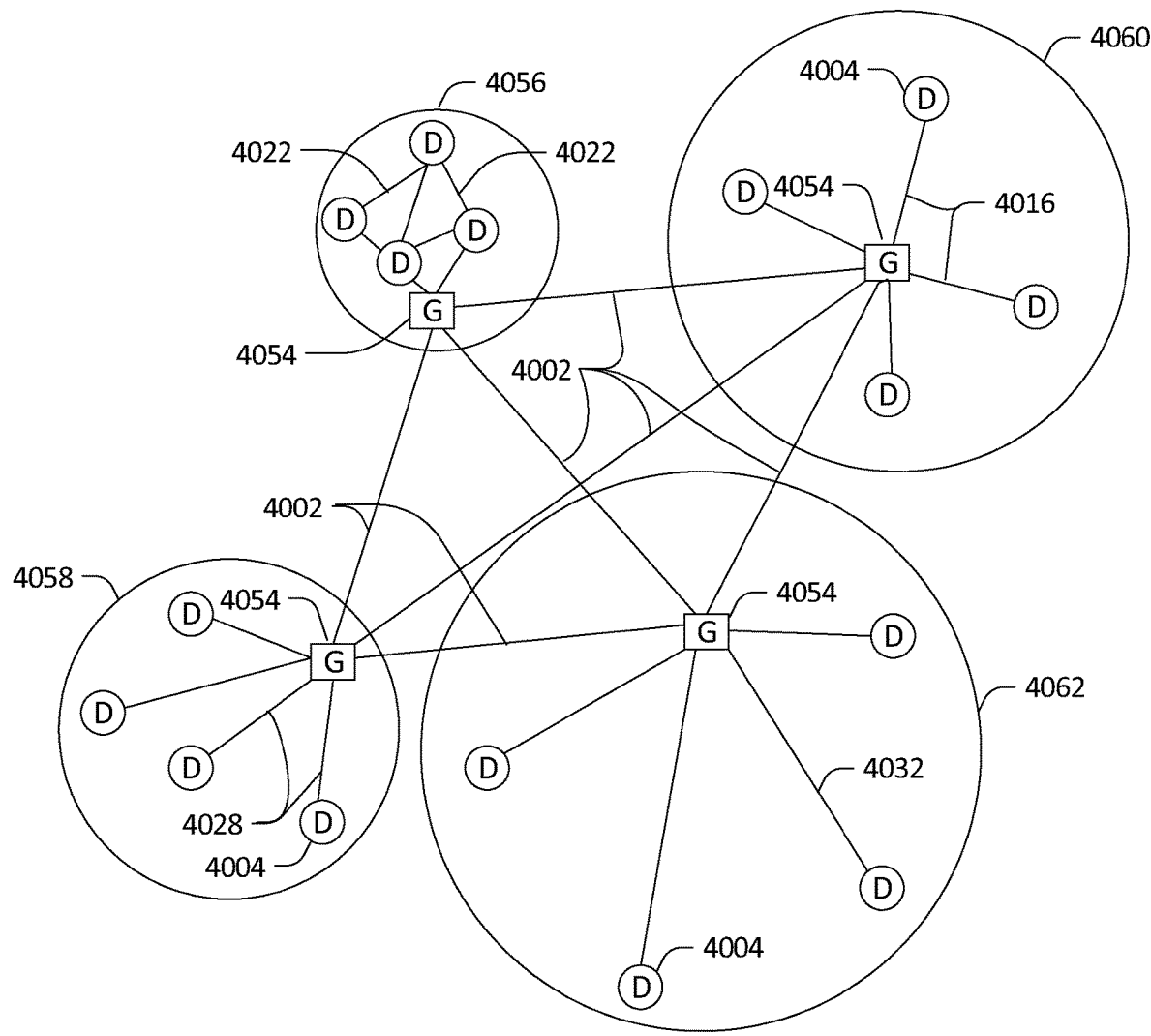
FIG. 40 is a simplified block diagram of an exemplary network with devices in accordance with at least some embodiments.

FIG. 40 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. Such IoT devices may be equipped with logic and memory to implement and use hash tables, such as introduced above.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 41:
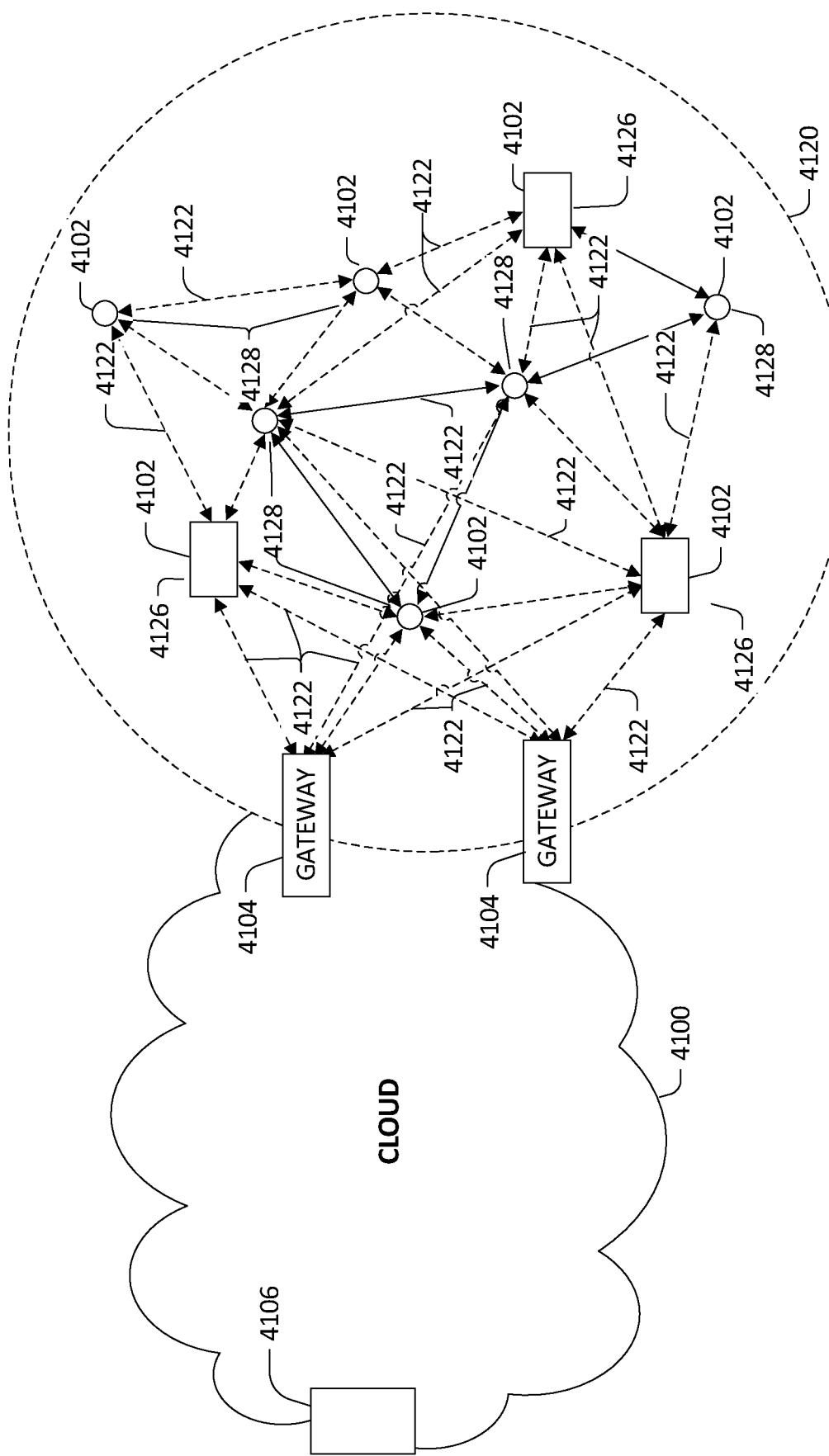
FIG. 41 is a simplified block diagram of an exemplary fog or cloud computing network in accordance with at least some embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 40 and 41, present a number of new challenges in a heterogeneous network of connectivity comprising a combination of wired and wireless technologies.

FIG. 40 specifically provides a simplified drawing of a domain topology that may be used for a number of internet-of-things (IoT) networks comprising IoT devices 4004, with the IoT networks 4056, 4058, 4060, 4062, coupled through backbone links 4002 to respective gateways 4054. For example, a number of IoT devices 4004 may communicate with a gateway 4054, and with each other through the gateway 4054. To simplify the drawing, not every IoT device 4004, or communications link (e.g., link 4016, 4022, 4028, or 4032) is labeled. The backbone links 4002 may include any number of wired or wireless technologies, including optical networks, and may be part of a local area network (LAN), a wide area network (WAN), or the Internet. Additionally, such communication links facilitate optical signal paths among both IoT devices 4004 and gateways 4054, including the use of MUXing/deMUXing components that facilitate interconnection of the various devices.

The network topology may include any number of types of IoT networks, such as a mesh network provided with the network 4056 using Bluetooth low energy (BLE) links 4022. Other types of IoT networks that may be present include a wireless local area network (WLAN) network 4058 used to communicate with IoT devices 4004 through IEEE 802.11 (Wi-Fi®) links 4028, a cellular network 4060 used to communicate with IoT devices 4004 through an LTE/LTE-A (4G) or 5G cellular network, and a low-power wide area (LPWA) network 4062, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 4004, such as over the backbone links 4002, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 4056, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 4058, for instance, may use systems that perform standards conversion to provide multi-standard connectivity, enabling IoT devices 4004 using different protocols to communicate. Further systems may provide seamless interconnectivity across a multi-standard infrastructure comprising visible Internet resources and hidden Internet resources.

Communications in the cellular network 4060, for instance, may be enhanced by systems that offload data, extend communications to more remote devices, or both. The LPWA network 4062 may include systems that perform non-Internet protocol (IP) to IP interconnections, addressing, and routing. Further, each of the IoT devices 4004 may include the appropriate transceiver for wide area communications with that device. Further, each IoT device 4004 may include other transceivers for communications using additional protocols and frequencies. This is discussed further with respect to the communication environment and hardware of an IoT processing device depicted in FIGS. 42 and 43.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 41 below.

FIG. 41 illustrates a cloud computing network in communication with a mesh network of IoT devices (devices 4102) operating as a fog device at the edge of the cloud computing network. The mesh network of IoT devices may be termed a fog 4120, operating at the edge of the cloud 4100. To simplify the diagram, not every IoT device 4102 is labeled.

The fog 4120 may be considered to be a massively interconnected network wherein a number of IoT devices 4102 are in communications with each other, for example, by radio links 4122. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.-.M.A.N.) routing protocol, or the OMA Lightweight M2M (LWM2M) protocol, among others.

Three types of IoT devices 4102 are shown in this example, gateways 4104, data aggregators 4126, and sensors 4128, although any combinations of IoT devices 4102 and functionality may be used. The gateways 4104 may be edge devices that provide communications between the cloud 4100 and the fog 4120, and may also provide the backend process function for data obtained from sensors 4128, such as motion data, flow data, temperature data, and the like. The data aggregators 4126 may collect data from any number of the sensors 4128, and perform the back end processing function for the analysis. The results, raw data, or both may be passed along to the cloud 4100 through the gateways 4104. The sensors 4128 may be full IoT devices 4102, for example, capable of both collecting data and processing the data. In some cases, the sensors 4128 may be more limited in functionality, for example, collecting the data and allowing the data aggregators 4126 or gateways 4104 to process the data.

Communications from any IoT device 4102 may be passed along a convenient path (e.g., a most convenient path) between any of the IoT devices 4102 to reach the gateways 4104. In these networks, the number of interconnections provide substantial redundancy, allowing communications to be maintained, even with the loss of a number of IoT devices 4102. Further, the use of a mesh network may allow IoT devices 4102 that are very low power or located at a distance from infrastructure to be used, as the range to connect to another IoT device 4102 may be much less than the range to connect to the gateways 4104.

The fog 4120 provided from these IoT devices 4102 may be presented to devices in the cloud 4100, such as a server 4106, as a single device located at the edge of the cloud 4100, e.g., a fog device. In this example, the alerts coming from the fog device may be sent without being identified as coming from a specific IoT device 4102 within the fog 4120. In this fashion, the fog 4120 may be considered a distributed platform that provides computing and storage resources to perform processing or data-intensive tasks such as data analytics, data aggregation, and machine-learning, among others.

In some examples, the IoT devices 4102 may be configured using an imperative programming style, e.g., with each IoT device 4102 having a specific function and communication partners. However, the IoT devices 4102 forming the fog device may be configured in a declarative programming style, allowing the IoT devices 4102 to reconfigure their operations and communications, such as to determine needed resources in response to conditions, queries, and device failures. As an example, a query from a user located at a server 4106 about the operations of a subset of equipment monitored by the IoT devices 4102 may result in the fog 4120 device selecting the IoT devices 4102, such as particular sensors 4128, needed to answer the query. The data from these sensors 4128 may then be aggregated and analyzed by any combination of the sensors 4128, data aggregators 4126, or gateways 4104, before being sent on by the fog 4120 device to the server 4106 to answer the query. In this example, IoT devices 4102 in the fog 4120 may select the sensors 4128 used based on the query, such as adding data from flow sensors or temperature sensors. Further, if some of the IoT devices 4102 are not operational, other IoT devices 4102 in the fog 4120 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. In some implementations, one or more multiple devices may operate cooperatively to implement functionality and perform tasks described herein. In some cases, one or more host devices may supply data, provide instructions, aggregate results, or otherwise facilitate joint operations and functionality provided by multiple devices. While functionality, when implemented by a single device, may be considered functionality local to the device, in implementations of multiple devices operating as a single machine, the functionality may be considered local to the devices collectively, and this collection of devices may provide or consume results provided by other, remote machines (implemented as a single device or collection devices), among other example implementations.

Figure 42:
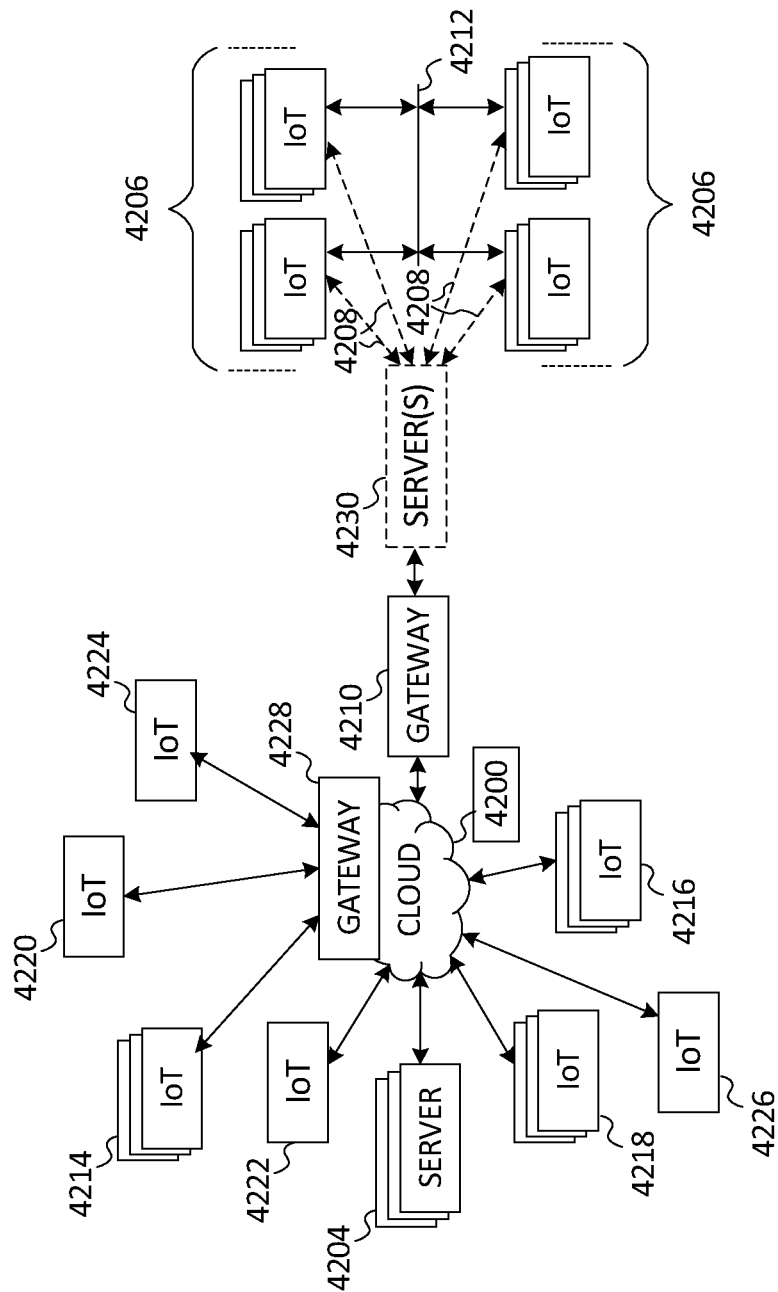
FIG. 42 is a simplified block diagram of a system including example devices in accordance with at least some embodiments.

For instance, FIG. 42 illustrates a drawing of a cloud computing network, or cloud 4200, in communication with a number of Internet of Things (IoT) devices. The cloud 4200 may represent the Internet, or may be a local area network (LAN), or a wide area network (WAN), such as a proprietary network for a company. The IoT devices may include any number of different types of devices, grouped in various combinations. For example, a traffic control group 4206 may include IoT devices along streets in a city. These IoT devices may include stoplights, traffic flow monitors, cameras, weather sensors, and the like. The traffic control group 4206, or other subgroups, may be in communication with the cloud 4200 through wired or wireless links 4208, such as LPWA links, optical links, and the like. Further, a wired or wireless sub-network 4212 may allow the IoT devices to communicate with each other, such as through a local area network, a wireless local area network, and the like. The IoT devices may use another device, such as a gateway 4210 or 4228 to communicate with remote locations such as the cloud 4200; the IoT devices may also use one or more servers 4230 to facilitate communication with the cloud 4200 or with the gateway 4210. For example, the one or more servers 4230 may operate as an intermediate network node to support a local edge cloud or fog implementation among a local area network. Further, the gateway 4228 that is depicted may operate in a cloud-to-gateway-to-many edge devices configuration, such as with the various IoT devices 4214, 4220, 4224 being constrained or dynamic to an assignment and use of resources in the cloud 4200.

Other example groups of IoT devices may include remote weather stations 4214, local information terminals 4216, alarm systems 4218, automated teller machines 4220, alarm panels 4222, or moving vehicles, such as emergency vehicles 4224 or other vehicles 4226, among many others. Each of these IoT devices may be in communication with other IoT devices, with servers 4204, with another IoT fog device or system (not shown, but depicted in FIG. 41), or a combination therein. The groups of IoT devices may be deployed in various residential, commercial, and industrial settings (including in both private or public environments).

As can be seen from FIG. 42, a large number of IoT devices may be communicating through the cloud 4200. This may allow different IoT devices to request or provide information to other devices autonomously. For example, a group of IoT devices (e.g., the traffic control group 4206) may request a current weather forecast from a group of remote weather stations 4214, which may provide the forecast without human intervention. Further, an emergency vehicle 4224 may be alerted by an automated teller machine 4220 that a burglary is in progress. As the emergency vehicle 4224 proceeds towards the automated teller machine 4220, it may access the traffic control group 4206 to request clearance to the location, for example, by lights turning red to block cross traffic at an intersection in sufficient time for the emergency vehicle 4224 to have unimpeded access to the intersection.

Clusters of IoT devices, such as the remote weather stations 4214 or the traffic control group 4206, may be equipped to communicate with other IoT devices as well as with the cloud 4200. This may allow the IoT devices to form an ad-hoc network between the devices, allowing them to function as a single device, which may be termed a fog device or system (e.g., as described above with reference to FIG. 41).

Figure 43:
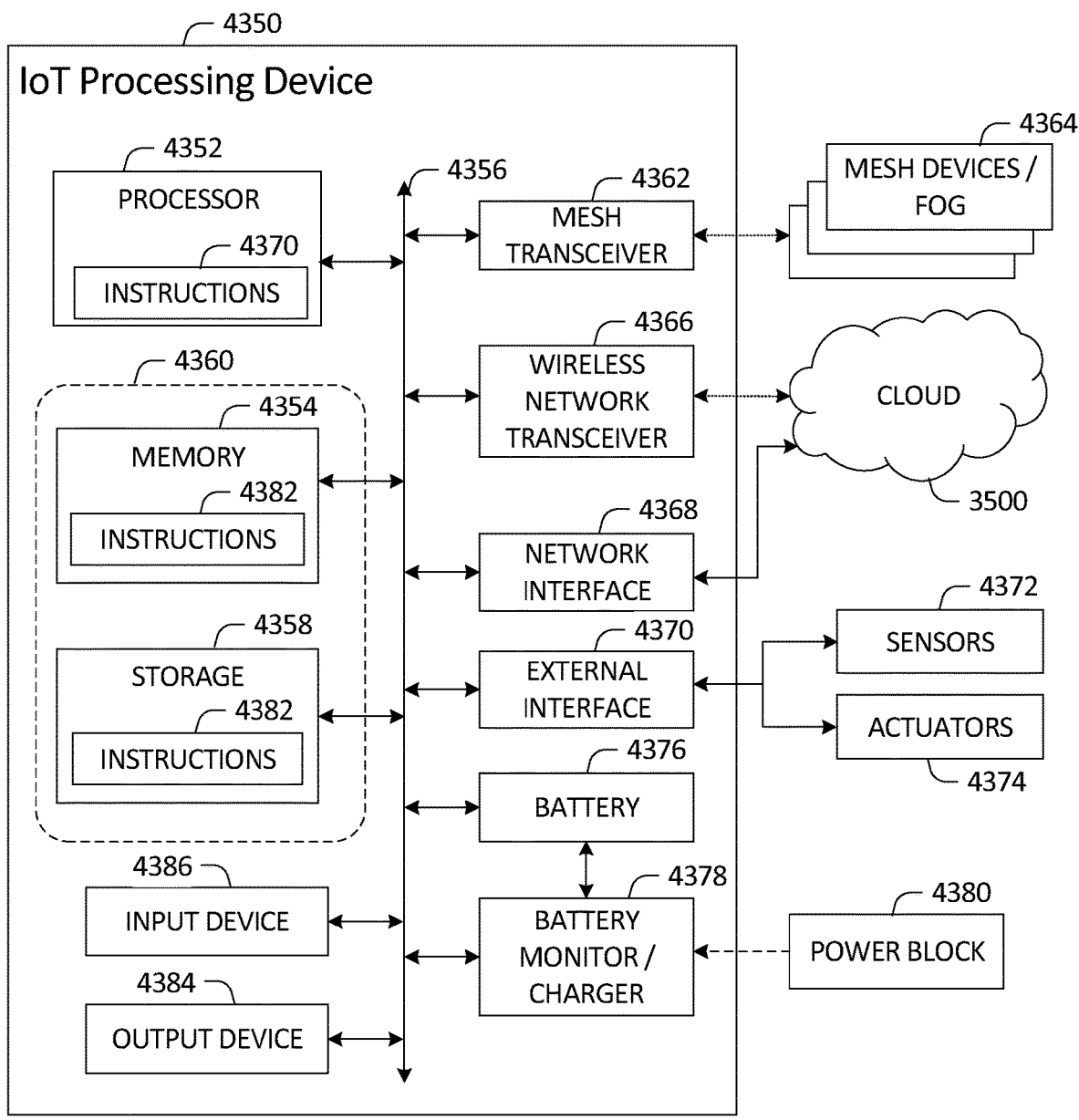
FIG. 43 is a simplified block diagram of an example processing device in accordance with at least some embodiments.

FIG. 43 is a block diagram of an example of components that may be present in an IoT device 4350 for implementing the techniques described herein. The IoT device 4350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 4350, or as components otherwise incorporated within a chassis of a larger system. Additionally, the block diagram of FIG. 43 is intended to depict a high-level view of components of the IoT device 4350. However, some of the components shown may be omitted, additional components may be present, and different arrangement of the components shown may occur in other implementations.

The IoT device 4350 may include a processor 4352, which may be a microprocessor, a multi-core processor, a multithreaded processor, an ultra-low voltage processor, an embedded processor, or other known processing element. The processor 4352 may be a part of a system on a chip (SoC) in which the processor 4352 and other components are formed into a single integrated circuit, or a single package, such as the Edison™ or Galileo™ SoC boards from Intel. As an example, the processor 4352 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 4352 may communicate with a system memory 4354 over an interconnect 4356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 4358 may also couple to the processor 4352 via the interconnect 4356. In an example the storage 4358 may be implemented via a solid state disk drive (SSDD). Other devices that may be used for the storage 4358 include flash memory cards, such as SD cards, microSD cards, xD picture cards, and the like, and USB flash drives. In low power implementations, the storage 4358 may be on-die memory or registers associated with the processor 4352. However, in some examples, the storage 4358 may be implemented using a micro hard disk drive (HDD). Further, any number of new technologies may be used for the storage 4358 in addition to, or instead of, the technologies described, such resistance change memories, phase change memories, holographic memories, or chemical memories, among others.

The components may communicate over the interconnect 4356. The interconnect 4356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 4356 may be a proprietary bus, for example, used in a SoC based system. Other bus systems may be included, such as an I2C interface, an SPI interface, point to point interfaces, and a power bus, among others.

The interconnect 4356 may couple the processor 4352 to a mesh transceiver 4362, for communications with other mesh devices 4364. The mesh transceiver 4362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 4364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 4362 may communicate using multiple standards or radios for communications at different range. For example, the IoT device 4350 may communicate with close devices, e.g., within about 10 meters, using a local transceiver based on BLE, or another low power radio, to save power. More distant mesh devices 4364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 4366 may be included to communicate with devices or services in the cloud 4300 via local or wide area network protocols. The wireless network transceiver 4366 may be a LPWA transceiver that follows the IEEE 802.15.4, or IEEE 802.15.4g standards, among others. The IoT device 4350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 4362 and wireless network transceiver 4366, as described herein. For example, the radio transceivers 4362 and 4366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 4362 and 4366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 4366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 4368 may be included to provide a wired communication to the cloud 4300 or to other devices, such as the mesh devices 4364. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 4368 may be included to allow connect to a second network, for example, a NIC 4368 providing communications to the cloud over Ethernet, and a second NIC 4368 providing communications to other devices over another type of network.

The interconnect 4356 may couple the processor 4352 to an external interface 4370 that is used to connect external devices or subsystems. The external devices may include sensors 4372, such as accelerometers, level sensors, flow sensors, optical light sensors, camera sensors, temperature sensors, a global positioning system (GPS) sensors, pressure sensors, barometric pressure sensors, and the like. The external interface 4370 further may be used to connect the IoT device 4350 to actuators 4374, such as power switches, valve actuators, an audible sound generator, a visual warning device, and the like.

In some optional examples, various input/output (I/O) devices may be present within, or connected to, the IoT device 4350. For example, a display or other output device 4384 may be included to show information, such as sensor readings or actuator position. An input device 4386, such as a touch screen or keypad may be included to accept input. An output device 4384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 4350.

A battery 4376 may power the IoT device 4350, although in examples in which the IoT device 4350 is mounted in a fixed location, it may have a power supply coupled to an electrical grid. The battery 4376 may be a lithium ion battery, or a metal-air battery, such as a zinc-air battery, an aluminum-air battery, a lithium-air battery, and the like.

A battery monitor/charger 4378 may be included in the IoT device 4350 to track the state of charge (SoCh) of the battery 4376. The battery monitor/charger 4378 may be used to monitor other parameters of the battery 4376 to provide failure predictions, such as the state of health (SoH) and the state of function (SoF) of the battery 4376. The battery monitor/charger 4378 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 4378 may communicate the information on the battery 4376 to the processor 4352 over the interconnect 4356. The battery monitor/charger 4378 may also include an analog-to-digital (ADC) convertor that allows the processor 4352 to directly monitor the voltage of the battery 4376 or the current flow from the battery 4376. The battery parameters may be used to determine actions that the IoT device 4350 may perform, such as transmission frequency, mesh network operation, sensing frequency, and the like.

A power block 4380, or other power supply coupled to a grid, may be coupled with the battery monitor/charger 4378 to charge the battery 4376. In some examples, the power block 4380 may be replaced with a wireless power receiver to obtain the power wirelessly, for example, through a loop antenna in the IoT device 4350. A wireless battery charging circuit, such as an LTC4020 chip from Linear Technologies of Milpitas, Calif., among others, may be included in the battery monitor/charger 4378. The specific charging circuits chosen depend on the size of the battery 4376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 4358 may include instructions 4382 in the form of software, firmware, or hardware commands to implement the techniques described herein. Although such instructions 4382 are shown as code blocks included in the memory 4354 and the storage 4358, it may be understood that any of the code blocks may be replaced with hardwired circuits, for example, built into an application specific integrated circuit (ASIC).

In an example, the instructions 4382 provided via the memory 4354, the storage 4358, or the processor 4352 may be embodied as a non-transitory, machine readable medium 4360 including code to direct the processor 4352 to perform electronic operations in the IoT device 4350. The processor 4352 may access the non-transitory, machine readable medium 4360 over the interconnect 4356. For instance, the non-transitory, machine readable medium 4360 may be embodied by devices described for the storage 4358 of FIG. 43 or may include specific storage units such as optical disks, flash drives, or any number of other hardware devices. The non-transitory, machine readable medium 4360 may include instructions to direct the processor 4352 to perform a specific sequence or flow of actions, for example, as described with respect to the flowchart(s) and block diagram(s) of operations and functionality depicted above.

Figure 44:
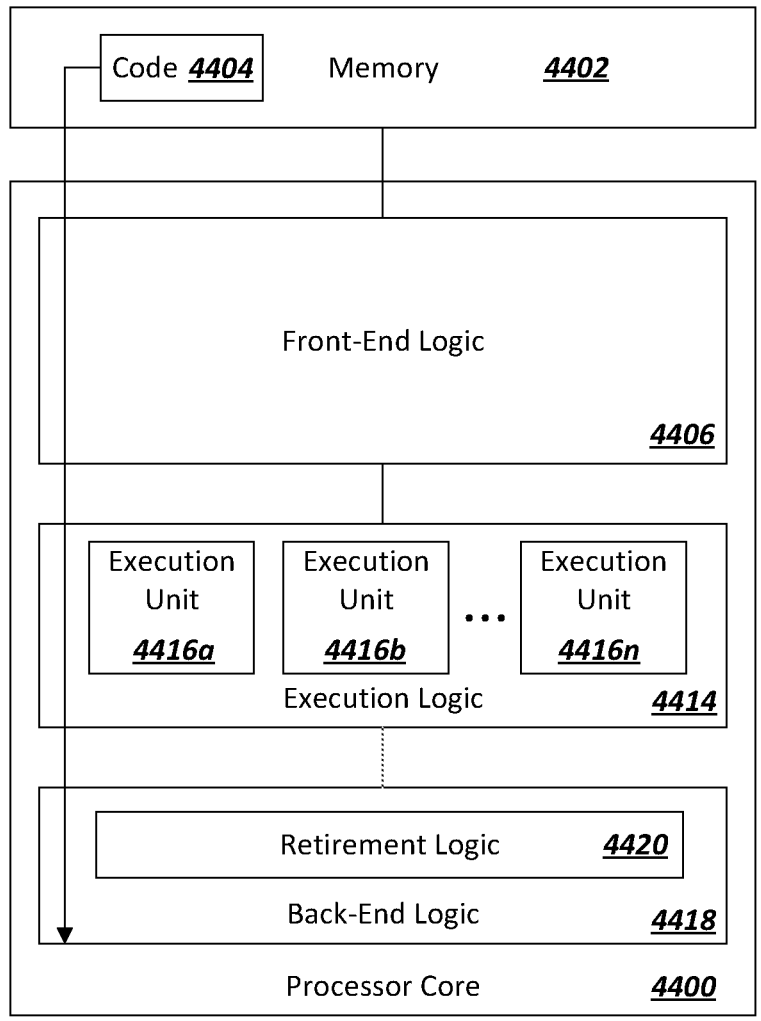
FIG. 44 is a block diagram of an exemplary processor in accordance with at least some embodiments.

FIG. 44 is an example illustration of a processor according to an embodiment. Processor 4400 is an example of a type of hardware device that can be used in connection with the implementations above. Processor 4400 may be any type of processor, such as a microprocessor, an embedded processor, a digital signal processor (DSP), a network processor, a multi-core processor, a single core processor, or other device to execute code. Although only one processor 4400 is illustrated in FIG. 44, a processing element may alternatively include more than one of processor 4400 illustrated in FIG. 44. Processor 4400 may be a single-threaded core or, for at least one embodiment, the processor 4400 may be multi-threaded in that it may include more than one hardware thread context (or "logical processor") per core.

FIG. 44 also illustrates a memory 4402 coupled to processor 4400 in accordance with an embodiment. Memory 4402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 4400 can execute any type of instructions associated with algorithms, processes, or operations detailed herein. Generally, processor 4400 can transform an element or an article (e.g., data) from one state or thing to another state or thing.

Code 4404, which may be one or more instructions to be executed by processor 4400, may be stored in memory 4402, or may be stored in software, hardware, firmware, or any suitable combination thereof, or in any other internal or external component, device, element, or object where appropriate and based on particular needs. In one example, processor 4400 can follow a program sequence of instructions indicated by code 4404. Each instruction enters a front-end logic 4406 and is processed by one or more decoders 4408. The decoder may generate, as its output, a micro operation such as a fixed width micro operation in a predefined format, or may generate other instructions, microinstructions, or control signals that reflect the original code instruction. Front-end logic 4406 also includes register renaming logic 4410 and scheduling logic 4412, which generally allocate resources and queue the operation corresponding to the instruction for execution.

Processor 4400 can also include execution logic 4414 having a set of execution units 4416a, 4416b, 4416n, etc. Some embodiments may include a number of execution units dedicated to specific functions or sets of functions. Other embodiments may include only one execution unit or one execution unit that can perform a particular function. Execution logic 4414 performs the operations specified by code instructions.

After completion of execution of the operations specified by the code instructions, back-end logic 4418 can retire the instructions of code 4404. In one embodiment, processor 4400 allows out of order execution but requires in order retirement of instructions. Retirement logic 4420 may take a variety of known forms (e.g., re-order buffers or the like). In this manner, processor 4400 is transformed during execution of code 4404, at least in terms of the output generated by the decoder, hardware registers and tables utilized by register renaming logic 4410, and any registers (not shown) modified by execution logic 4414.

Although not shown in FIG. 44, a processing element may include other elements on a chip with processor 4400. For example, a processing element may include memory control logic along with processor 4400. The processing element may include I/O control logic and/or may include I/O control logic integrated with memory control logic. The processing element may also include one or more caches. In some embodiments, non-volatile memory (such as flash memory or fuses) may also be included on the chip with processor 4400.

Figure 45:
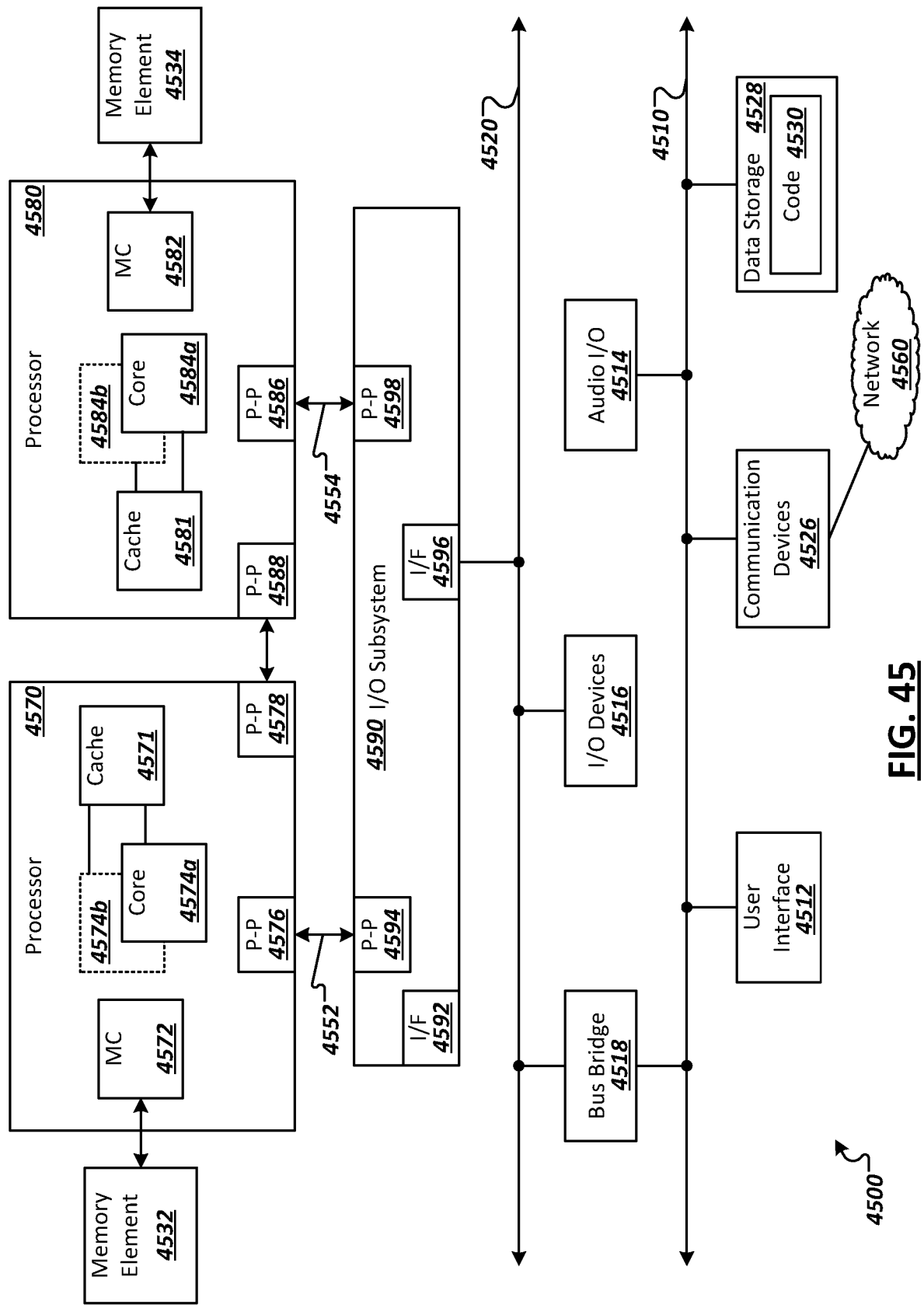
FIG. 45 is a block diagram of an exemplary computing system in accordance with at least some embodiments.

FIG. 45 illustrates a computing system 4500 that is arranged in a point-to-point (PtP) configuration according to an embodiment. In particular, FIG. 45 shows a system where processors, memory, and input/output devices are interconnected by a number of point-to-point interfaces. Generally, one or more of the computing systems described herein may be configured in the same or similar manner as computing system 4500.

Processors 4570 and 4580 may also each include integrated memory controller logic (MC) 4572 and 4582 to communicate with memory elements 4532 and 4534. In alternative embodiments, memory controller logic 4572 and 4582 may be discrete logic separate from processors 4570 and 4580. Memory elements 4532 and/or 4534 may store various data to be used by processors 4570 and 4580 in achieving operations and functionality outlined herein.

Processors 4570 and 4580 may be any type of processor, such as those discussed in connection with other figures. Processors 4570 and 4580 may exchange data via a point-to-point (PtP) interface 4550 using point-to-point interface circuits 4578 and 4588, respectively. Processors 4570 and 4580 may each exchange data with a chipset 4590 via individual point-to-point interfaces 4552 and 4554 using point-to-point interface circuits 4576, 4586, 4594, and 4598. Chipset 4590 may also exchange data with a high-performance graphics circuit 4538 via a high-performance graphics interface 4539, using an interface circuit 4592, which could be a PtP interface circuit. In alternative embodiments, any or all of the PtP links illustrated in FIG. 45 could be implemented as a multi-drop bus rather than a PtP link.

Chipset 4590 may be in communication with a bus 4520 via an interface circuit 4596. Bus 4520 may have one or more devices that communicate over it, such as a bus bridge 4518 and I/O devices 4516. Via a bus 4510, bus bridge 4518 may be in communication with other devices such as a user interface 4512 (such as a keyboard, mouse, touchscreen, or other input devices), communication devices 4526 (such as modems, network interface devices, or other types of communication devices that may communicate through a computer network 4560), audio I/O devices 4514, and/or a data storage device 4528. Data storage device 4528 may store code 4530, which may be executed by processors 4570 and/or 4580. In alternative embodiments, any portions of the bus architectures could be implemented with one or more PtP links.

The computer system depicted in FIG. 45 is a schematic illustration of an embodiment of a computing system that may be utilized to implement various embodiments discussed herein. It will be appreciated that various components of the system depicted in FIG. 45 may be combined in a system-on-a-chip (SoC) architecture or in any other suitable configuration capable of achieving the functionality and features of examples and implementations provided herein.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is an apparatus including: a data processing apparatus; a memory to store a volumetric data structure to represent a three-dimensional (3D) volume, where the volumetric data structure includes a sparse hierarchical volumetric data structure, and the volumetric data structure includes a set of higher-level voxels, where each higher-level voxel represents a respective sub-volumes in the 3D volume at a first resolution, each higher-level voxel includes a set of lower-level voxels to represent sub-volumes of the respective higher-level voxel at a second, higher resolution; and a raycaster, executable by the data processing apparatus to perform a raycasting algorithm, where the raycasting algorithm takes, as an input, the volumetric data structure and performing the raycasting algorithm includes: casting a plurality of rays from a reference point into the 3D volume; for each of the plurality of rays, traversing the ray to determine whether voxels in the set of voxels are intersected by the ray and are occupied, where the ray is to be traversed according to an approximate traversal.

Example 2 includes the subject matter of example 1, where traversing the ray includes determining, from the volumetric data structure, that only a subset of the set of higher-level voxels contain respective lower-level voxels occupied with geometry.

Example 3 includes the subject matter of example 2, where traversing the ray further includes: determining a subset of the lower-level voxels intersected by the ray, where less than all of the lower-level voxels intersected by the ray are in the subset based on the approximate traversal.

Example 4 includes the subject matter of any one of examples 2-3, where traversing the ray includes skipping analysis of lower-level voxels in each of the higher-level voxels determined not to contain occupied lower-level voxels based on the volumetric data structure.

Example 5 includes the subject matter of example 4, where the analysis includes checking at multiple points on the ray corresponding to the subset of higher-level voxels, whether a lower-level voxel within one of the subset of higher-level voxels and intersected by the ray is occupied or not, where a subset of the lower-level voxels within the subset of higher-level voxels and intersected by the ray are not checked based on the approximate traversal.

Example 6 includes the subject matter of example 5, where the multiple points correspond to a defined interval based on the approximate traversal.

Example 7 includes the subject matter of example 6, where the defined interval includes a distance associated with a length of a lower-level voxel in a particular dimension.

Example 8 includes the subject matter of example 7, where the raycaster is further to determine the particular direction, where the particular dimension includes the main directional component of the ray.

Example 9 includes the subject matter of any one of examples 4-8, where analysis of lower-level voxels in each of the subset of higher-level voxels includes accessing memory to retrieve a corresponding portion of the volumetric data structure, where portions of the volumetric data structure corresponding to the higher-level voxels determined not to contain occupied lower-level voxels are not retrieved from memory.

Example 10 includes the subject matter of any one of examples 1-9, where the raycasting algorithm is a portion of a SLAM pipeline implemented using the circuitry.

Example 11 includes the subject matter of any one of examples 1-9, where the raycasting algorithm is performed in connection with a graphic rendering application.

Example 12 includes the subject matter of any one of example 1-10, where the volumetric data structure includes a first entry to represent presence of geometry in each of the higher-level voxels, and further includes a set of second entries, where each of the second entries represents the respective lower-level voxels of one of the subset of higher-level voxels.

Example 13 includes the subject matter of example 12, where the first and second entries include binary values for each voxel described in the respective entry, and the respective binary values indicate whether the corresponding voxel is occupied or not.

Example 14 includes the subject matter of any one of examples 1-13, where the data processing apparatus includes a visual processing unit (VPU).

Example 15 includes the subject matter of any one of examples 1-14, where the apparatus includes one of a robot or a drone.

Example 16 is a method including: access, from computer memory, a volumetric data structure, where the volumetric data structure represents a three-dimensional (3D) volume, the volumetric data structure includes a sparse hierarchical volumetric data structure, and the volumetric data structure includes a set of higher-level voxels, where each higher-level voxel represents a respective sub-volume in the 3D volume at a first resolution, each higher-level voxel includes a set of lower-level voxels to represent sub-volumes of the respective higher-level voxel at a second, higher resolution; and performing a raycasting algorithm, where the raycasting algorithm takes, as an input, the volumetric data structure, and performing the raycasting algorithm includes: casting a plurality of rays from a reference point into the 3D volume; and for each of the plurality of rays, traversing the ray to determine whether voxels in the set of voxels are intersected by the ray and are occupied, where the ray is to be traversed according to an approximate traversal.

Example 17 includes the subject matter of example 16, where traversing the ray includes determining, from the volumetric data structure, that only a subset of the set of higher-level voxels contain respective lower-level voxels occupied with geometry.

Example 18 includes the subject matter of example 17, where traversing the ray further includes: determining a subset of the lower-level voxels intersected by the ray, where less than all of the lower-level voxels intersected by the ray are in the subset based on the approximate traversal.

Example 19 includes the subject matter of any one of examples 17-18, where traversing the ray includes skipping analysis of lower-level voxels in each of the higher-level voxels determined not to contain occupied lower-level voxels based on the volumetric data structure.

Example 20 includes the subject matter of example 19, where the analysis includes checking at multiple points on the ray corresponding to the subset of higher-level voxels, whether a lower-level voxel within one of the subset of higher-level voxels and intersected by the ray is occupied or not, where a subset of the lower-level voxels within the subset of higher-level voxels and intersected by the ray are not checked based on the approximate traversal.

Example 21 includes the subject matter of example 20, where the multiple points correspond to a defined interval based on the approximate traversal.

Example 22 includes the subject matter of example 21, where the defined interval includes a distance associated with a length of a lower-level voxel in a particular dimension.

Example 23 includes the subject matter of example 22, where the raycaster is further to determine the particular direction, where the particular dimension includes the main directional component of the ray.

Example 24 includes the subject matter of any one of examples 19-23, where analysis of lower-level voxels in each of the subset of higher-level voxels includes accessing memory to retrieve a corresponding portion of the volumetric data structure, where portions of the volumetric data structure corresponding to the higher-level voxels determined not to contain occupied lower-level voxels are not retrieved from memory.

Example 25 includes the subject matter of any one of examples 16-24, where the raycasting algorithm is a portion of a SLAM pipeline implemented using the circuitry.

Example 26 includes the subject matter of any one of examples 16-24, where the raycasting algorithm is performed in connection with a graphic rendering application.

Example 27 includes the subject matter of any one of example 16-26, where the volumetric data structure includes a first entry to represent presence of geometry in each of the higher-level voxels, and further includes a set of second entries, where each of the second entries represents the respective lower-level voxels of one of the subset of higher-level voxels.

Example 28 includes the subject matter of example 27, where the first and second entries include binary values for each voxel described in the respective entry, and the respective binary values indicate whether the corresponding voxel is occupied or not.

Example 29 is a system including means to perform the method of any one of examples 16-28.

Example 30 includes the subject matter of example 29, where the means include a machine-readable storage medium with instructions stored thereon, where the instructions are executable by a machine to perform at least a portion of the method of any one of examples 16-28.

Example 32 is an apparatus including: a data processing apparatus; a memory; and an odometry engine, executable by the data processing apparatus, to: input visual data to a first network portion of a neural network model, where the first network portion generates a first value based on the visual data; input inertial data to a second portion of the neural network model, where the second network portion generates a second value based on the inertial data; provide the first value and second values as an input to a set of fully-connected layers of the neural network model; and generate an output of the neural network model from the fully-connected layers, where the output includes a pose value based on both the visual data and inertial data.

Example 32 includes the subject matter of example 31, where the first network portion includes a visual odometry neural network portion and the second network portion includes an inertial odometry neural network portion.

Example 33 includes the subject matter of any one of examples 31-32, where the first network portion includes a plurality of convolutional neural network layers and a first set of fully-connected layers.

Example 34 includes the subject matter of example 33, where the first network portion includes layers of a FlowNetS-based convolutional neural network (CNN).

Example 35 includes the subject matter of any one of examples 31-34, where the second network portion includes a long short-term memory (LSTM)-based neural network and a second set of fully-connected layers.

Example 36 includes the subject matter of any one of examples 31-35, where the visual data includes a pair of consecutive RGB images.

Example 37 includes the subject matter of any one of examples 31-36, where the inertial data includes a subsequence of inertia data generated by an inertial measurement unit (IMU) device.

Example 38 includes the subject matter of any one of examples 31-37, where the odometry engine is further to concatenate the first and second values to generate the input for the set of fully-connected layers.

Example 39 includes the subject matter of any one of examples 31-38, further including a controller to determine a direction of movement for an autonomous device based on the pose value.

Example 40 includes the subject matter of example 39, where the autonomous device includes one of a robot or a drone.

Example 41 includes the subject matter of any one of claims 39-40, further including the autonomous device.

Example 42 is a method including: receiving visual data describing an environment; receiving inertial data describing movement of a device; providing the visual data as an input to a first network portion of a neural network model, where the first network portion generates a first value based on the visual data; providing the inertial data as an input to a second portion of the neural network model, where the second network portion generates a second value based on the inertial data; providing the first value and second values as an input to a set of fully-connected layers of the neural network model; and generating an output of the neural network model from the fully-connected layers, where the output includes a pose value based on both the visual data and inertial data.

Example 43 includes the subject matter of example 42, where the first network portion includes a visual odometry neural network portion and the second network portion includes an inertial odometry neural network portion.

Example 44 includes the subject matter of any one of examples 42-43, where the first network portion includes a plurality of convolutional neural network layers and a first set of fully-connected layers.

Example 45 includes the subject matter of example 44, where the first network portion includes layers of a FlowNetS-based convolutional neural network (CNN).

Example 46 includes the subject matter of any one of examples 42-45, where the second network portion includes a long short-term memory (LSTM)-based neural network and a second set of fully-connected layers.

Example 47 includes the subject matter of any one of examples 42-46, where the visual data includes a pair of consecutive RGB images.

Example 48 includes the subject matter of any one of examples 42-47, where the inertial data includes a subsequence of inertia data generated by an inertial measurement unit (IMU) device.

Example 49 includes the subject matter of any one of examples 42-48, further including concatenating the first and second values to generate the input for the set of fully-connected layers.

Example 50 includes the subject matter of any one of examples 42-49, further including determining a direction of movement for the device based on the pose value.

Example 51 includes the subject matter of example 50, further including actuating movement of the device in the direction.

Example 52 is a system including means to perform the method of any one of examples 42-51.

Example 53 includes the subject matter of example 22, where the means include a machine-readable storage medium with instructions stored thereon, where the instructions are executable by a machine to perform at least a portion of the method of any one of examples 42-51.

Example 54 is a system including: an autonomous device including: a processor; an inertial measurement unit (IMU) device to generate inertial data; a camera sensor to generate visual data; an odometry engine to: provide the visual data as an input to a first network portion of a neural network model, where the first network portion generates a first value based on the visual data; provide the inertial data as an input to a second portion of the neural network model, where the second network portion generates a second value based on the inertial data; provide the first and second values as an input to a set of fully-connected layers of the neural network model; and generate an output of the neural network model from the fully-connected layers, where the output includes a pose value based on both the visual data and inertial data.

Example 55 includes the subject matter of example 54, further including a controller to determine a direction of movement for the autonomous device based on the pose value.

Example 56 includes the subject matter of example 55, further including an actuator to cause the autonomous device to autonomously move in the direction based at least in part on the pose value.

Example 57 includes the subject matter of any one of examples 54-55, where the first network portion includes a visual odometry neural network portion and the second network portion includes an inertial odometry neural network portion.

Example 58 includes the subject matter of any one of examples 54-57, where the first network portion includes a plurality of convolutional neural network layers and a first set of fully-connected layers.

Example 59 includes the subject matter of example 58, where the first network portion includes layers of a FlowNetS-based convolutional neural network (CNN).

Example 60 includes the subject matter of any one of examples 54-59, where the second network portion includes a long short-term memory (LSTM)-based neural network and a second set of fully-connected layers.

Example 61 includes the subject matter of any one of examples 54-60, where the visual data includes a pair of consecutive RGB images.

Example 62 includes the subject matter of any one of examples 54-61, where the inertial data includes a subsequence of inertia data generated by an inertial measurement unit (IMU) device.

Example 63 includes the subject matter of any one of examples 54-62, where the odometry engine is further to concatenate the first and second values to generate the input for the set of fully-connected layers.

Example 64 includes the subject matter of any one of examples 54-63, further including a controller to determine a direction of movement for an autonomous device based on the pose value.

Example 65 includes the subject matter of example 64, where the autonomous device includes one of a robot or a drone.

Example 66 is an apparatus including: a data processing apparatus; a memory to store a first volumetric data structure to represent a first 3D volume and a second volumetric data structure to represent a second 3D volume; and a relative pose estimation tool, executable by the data processing apparatus, to: convert the first volumetric data structure into a first set of 2D grids; convert the second volumetric data structure into a second set of 2D grids; provide a pair of voxel grids as inputs to a convolutional neural network (CNN), where the pair of voxel grids include one of the first set of 2D grids and one of the second set of 2D grids; and generate a relative pose value for the pair of voxel grids using the CNN.

Example 67 includes the subject matter of example 66, where the relative pose estimation tool is further to determine a loss function for the CNN, where the loss function is to be applied in the generation of the relative pose value.

Example 68 includes the subject matter of any one of examples 66-67, where the relative pose value is determined for a set of pairs of 2D grids from the first and second sets of 2D grids to determine a relative pose estimation of the first and second 3D volumes.

Example 69 includes the subject matter of any one of examples 66-68, where the first volumetric data structure represents a point cloud for the first 3D volume and the second volumetric data structure represents a point cloud for the second 3D volume.

Example 70 includes the subject matter of any one of example 66-69, where the CNN includes a 2D CNN.

Example 71 includes the subject matter of any one of examples 66-70, where the CNN includes a representation part and regression part, the pair of voxel grids is provided as input to the representation part, the representation part generates a feature vector based on the pair of voxel grids, the feature vector is provided as an input to the regression part, and the relative pose value includes an output of the regression part.

Example 72 includes the subject matter of example 71, where the representation part includes a Siamese network and the regression part includes fully connected layers.

Example 73 includes the subject matter of any one of examples 66-72, further including an autonomous device.

Example 74 includes the subject matter of example 73, where the autonomous device includes one of a robot or a drone.

Example 75 is a method including: accessing, from computer memory, a first volumetric data structure to represent a first 3D volume and a second volumetric data structure to represent a second 3D volume; converting the first volumetric data structure into a first set of 2D grids; converting the second volumetric data structure into a second set of 2D grids; providing the first and second set of 2D grids as inputs to a convolutional neural network (CNN); and generating a relative pose value based on the first and second 3D volumes using the CNN.

Example 76 includes the subject matter of example 75, further including: determining a loss function for the CNN; and applying the loss function to the generation of the relative pose value.

Example 77 includes the subject matter of any one of example 75-76, where the CNN includes a 2D convolutional layers.

Example 78 includes the subject matter of any one of examples 75-77, where the CNN includes a representation part and regression part, the first and second set of 2D grids are provided as inputs to the representation part, the representation part generates a feature vector as an output, the feature vector is provided as an input to the regression part, and the relative pose value includes an output of the regression part.

Example 79 includes the subject matter of example 78, where the representation part includes a Siamese network and the regression part includes fully connected layers.

Example 80 is a system including means to perform the method of any one of examples 75-79.

Example 81 is a non-transitory machine-readable storage medium with instructions stored thereon, where the instructions are executable by a machine to cause the machine to: accessing, from computer memory, a first volumetric data structure to represent a first 3D volume and a second volumetric data structure to represent a second 3D volume; converting the first volumetric data structure into a first set of 2D grids; converting the second volumetric data structure into a second set of 2D grids; providing the first and second set of 2D grids as inputs to a convolutional neural network (CNN); and generating a relative pose value based on the first and second 3D volumes using the CNN.

Example 82 includes the subject matter of example 81, further including: determining a loss function for the CNN; and applying the loss function to the generation of the relative pose value.

Example 83 includes the subject matter of any one of example 81-82, where the CNN includes a 2D convolutional layers.

Example 84 includes the subject matter of any one of examples 81-83, where the CNN includes a representation part and regression part, the first and second set of 2D grids are provided as inputs to the representation part, the representation part generates a feature vector as an output, the feature vector is provided as an input to the regression part, and the relative pose value includes an output of the regression part.

Example 85 includes the subject matter of example 84, where the representation part includes a Siamese network and the regression part includes fully connected layers.

Example 86 includes the subject matter of any one of examples 81-85, where one or both of the first and second volumetric data structures is generated from voxelization of corresponding point cloud data.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory, machine-readable storage medium with instructions stored thereon, the instructions executable by a machine to cause the machine to:
   receive visual data describing an environment;
   receive inertial data describing movement of a device;
   provide the visual data as an input to a first network portion of a neural network model, wherein:
      the first network portion comprises one or more convolutional layers and one or more first fully connected layers,
      the one or more convolutional layers receive the visual data and generate a first intermediate output, and
      the one or more first fully connected layers receive the first intermediate output and generate a first output based on the first intermediate output;
   provide the inertial data as an input to a second network portion of the neural network model, wherein:
      the second network portion comprises a long short-term memory (LSTM) layer and one or more second fully connected layer subsequent to the LSTM layer,
      the LSTM layer receives the inertial data and generates a second intermediate output, and
      the one or more second fully connected layers receive the second intermediate output and generate a second output; and
   generate an output of the neural network model by combining the first output and the second output, wherein the output comprises a pose value determined based on both the visual data and inertial data.

2. The storage medium of claim 1, wherein the first network portion comprises a visual odometry neural network portion and the second network portion comprises an inertial odometry neural network portion.

3. The storage medium of claim 1, wherein the first network portion comprises layers of a FlowNetS-based convolutional neural network (CNN).

4. The storage medium of claim 1, wherein the visual data comprises a pair of consecutive RGB images.

5. The storage medium of claim 1, wherein the inertial data comprises a subsequence of inertia data generated by an inertial measurement unit (IMU) device.

6. The storage medium of claim 1, wherein combining the first output and the second output comprises the first output and the second output.

7. The storage medium of claim 1, wherein the instructions are further executable to cause the machine to determine a direction of movement for the device based on the pose value.

8. The storage medium of claim 7, wherein the instructions are further executable to cause the machine to actuate movement of the device in the direction.

9. A method comprising:
   receiving visual data describing an environment; receiving inertial data describing movement of a device;
   providing the visual data as an input to a first network portion of a neural network model, wherein:
      the first network portion comprises one or more convolutional layers and one or more first fully connected layers,
      the one or more convolutional layers receive the visual data and generate a first intermediate output, and
      the one or more first fully connected layers receive the first intermediate output and generate a first output based on the first intermediate output;
   providing the inertial data as an input to a second network portion of the neural network model, wherein:
      the second network portion comprises a long short-term memory (LSTM) layer and one or more second fully connected layer subsequent to the LSTM layer,
      the LSTM layer receives the inertial data and generates a second intermediate output, and
      the one or more second fully connected layers receive the second intermediate output and generate a second output; and
   generating an output of the neural network model by combining the first output and the second output, wherein the output comprises a pose value determined based on both the visual data and inertial data.

10. A system comprising:
   an autonomous device comprising:
      a processor;
      an inertial measurement unit (IMU) device to generate inertial data;
      a camera sensor to generate visual data; and
      an odometry engine to:
         provide the visual data as an input to a first network portion of a neural network model, wherein:
            the first network portion comprises one or more convolutional layers and one or more first fully connected layers,
            the one or more convolutional layers receive the visual data and generate a first intermediate output, and
            the one or more first fully connected layers receive the first intermediate output and generate a first output based on the first intermediate output;
         provide the inertial data as an input to a second network portion of the neural network model, wherein:
            the second network portion comprises a long short-term memory (LSTM) layer and one or more second fully connected layer subsequent to the LSTM layer,
            the LSTM layer receives the inertial data and generates a second intermediate output, and
            the one or more second fully connected layers receive the second intermediate output and generate a second output; and
         generate an output of the neural network model by combining the first output and the second output, wherein the output comprises a pose value determined based on both the visual data and inertial data.

11. The system of claim 10, further comprising a controller to determine a direction of movement for the autonomous device based on the pose value.

12. The system of claim 11, further comprising an actuator to cause the autonomous device to autonomously move in the direction based at least in part on the pose value.

13. The system of claim 10, wherein the first network portion comprises a visual odometry neural network portion and the second network portion comprises an inertial odometry neural network portion.

14. The system of claim 10, wherein the visual data comprises a pair of consecutive RGB images.

15. The system of claim 10, wherein the inertial data comprises a subsequence of inertia data generated by an inertial measurement unit (IMU) device.

16. The method of claim 9, wherein the visual data comprises a pair of consecutive RGB images.

17. The method of claim 9, wherein the inertial data comprises a subsequence of inertia data generated by an inertial measurement unit (IMU) device.

18. The method of claim 9, wherein combining the first output and the second output comprises concatenating the first output and the second output.

19. The method of claim 9, further comprising:
  causing the machine to determine a direction of movement for the device based on the pose value.

20. The system of claim 10, wherein combining the first output and the second output comprises concatenating the first output and the second output.

\* \* \* \* \*

UNITED STATES PATENT AND TRADEMARK OFFICE
CERTIFICATE OF CORRECTION

PATENT NO. : 12,122,420 B2
APPLICATION NO. : 17/272324
DATED : October 22, 2024
INVENTOR(S) : Dexmont Alejandro Carillo Peña et al.

It is certified that error appears in the above-identified patent and that said Letters Patent is hereby corrected as shown below:

In the Claims

In Column 65, Claim 6, Line 66, delete "comprises" and insert -- comprises concatenating --, therefor.

Signed and Sealed this
Twenty-sixth Day of November, 2024

Katherine Kelly Vidal
*Director of the United States Patent and Trademark Office*